United States Patent
Pan et al.

(10) Patent No.: US 9,680,515 B2
(45) Date of Patent: Jun. 13, 2017

(54) MOBILE DEVICE CASE AND ARMBAND WITH FLUID CHAMBER

(71) Applicant: Superior Communications, Inc., Irwindale, CA (US)

(72) Inventors: Jason Pan, Los Angeles, CA (US); Ming-Shiuan Li, Changhua (TW); Alexander Greenough, Ross-On-Wye (GB); Adam Cho, Brea, CA (US); Timothy Ng, Monrovia, CA (US)

(73) Assignee: Superior Communications, Inc., Irwindale, CA (US)

( * ) Notice: Subject to any disclaimer, the term of this patent is extended or adjusted under 35 U.S.C. 154(b) by 8 days.

(21) Appl. No.: 14/798,411

(22) Filed: Jul. 13, 2015

(65) Prior Publication Data

US 2016/0013826 A1    Jan. 14, 2016

Related U.S. Application Data

(60) Provisional application No. 62/023,733, filed on Jul. 11, 2014.

(51) Int. Cl.
| | |
|---|---|
| *H04M 1/00* | (2006.01) |
| *H04B 1/3827* | (2015.01) |
| *H04B 1/3888* | (2015.01) |
| *H04M 1/18* | (2006.01) |
| *H04M 1/04* | (2006.01) |

(52) U.S. Cl.
CPC .......... *H04B 1/385* (2013.01); *H04B 1/3888* (2013.01); *H04M 1/185* (2013.01); *H04B 2001/3861* (2013.01); *H04M 1/04* (2013.01)

(58) Field of Classification Search
CPC ..... H04B 1/385; H04B 1/3888; H04M 1/185; H04M 1/04
USPC ....................................... 455/575.6
See application file for complete search history.

(56) References Cited

U.S. PATENT DOCUMENTS

| | | | | |
|---|---|---|---|---|
| 4,210,154 A | * | 7/1980 | Klein | A61B 5/0235 600/498 |
| 4,500,019 A | * | 2/1985 | Curley, Jr. | A45F 5/00 224/222 |
| 5,610,979 A | * | 3/1997 | Yu | A45F 5/02 379/426 |
| 5,938,089 A | * | 8/1999 | Abreu-Marston | A45F 3/20 215/382 |
| 2002/0173734 A1 | * | 11/2002 | Oomori | A44C 5/00 601/105 |
| 2012/0261973 A1 | * | 10/2012 | Vazquez | B60N 2/4415 297/452.41 |

* cited by examiner

*Primary Examiner* — Charles Appiah
*Assistant Examiner* — Alexander Yi
(74) *Attorney, Agent, or Firm* — Snell & Wilmer LLP

(57) ABSTRACT

A case for a mobile device including a body with a fluid chamber configured to retain fluid therein. An armband for a mobile device includes a band with a fluid chamber configured to retain fluid therein. The fluid chamber may serve to cushion the mobile device or wearer's arm when in use.

18 Claims, 52 Drawing Sheets

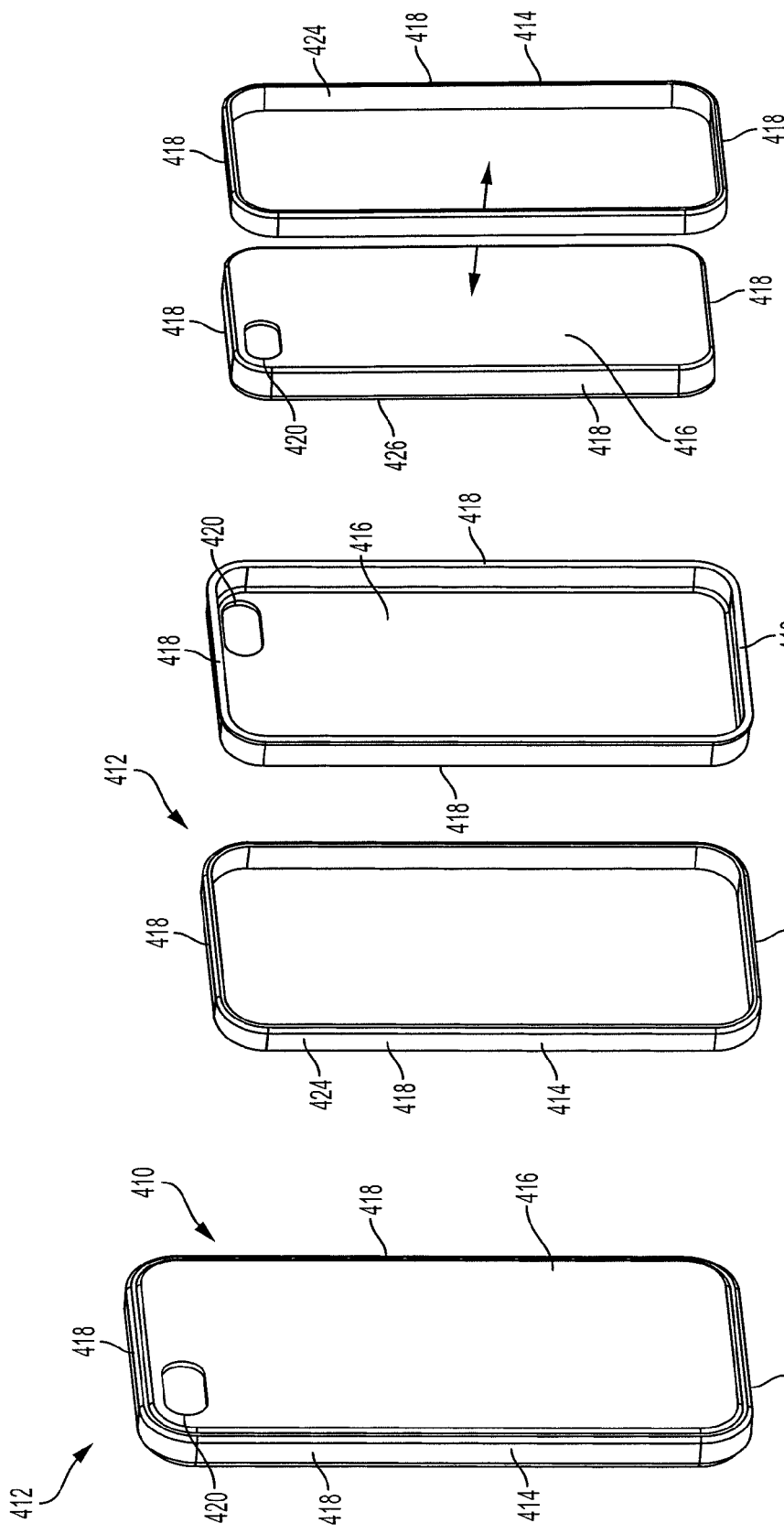

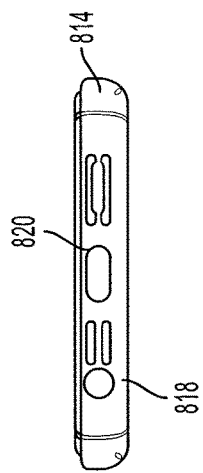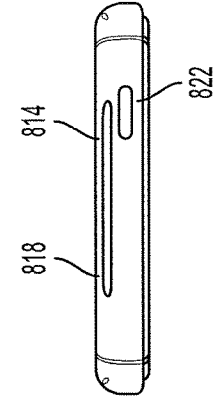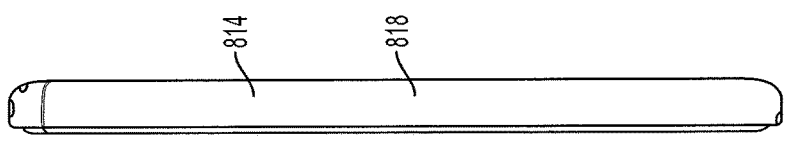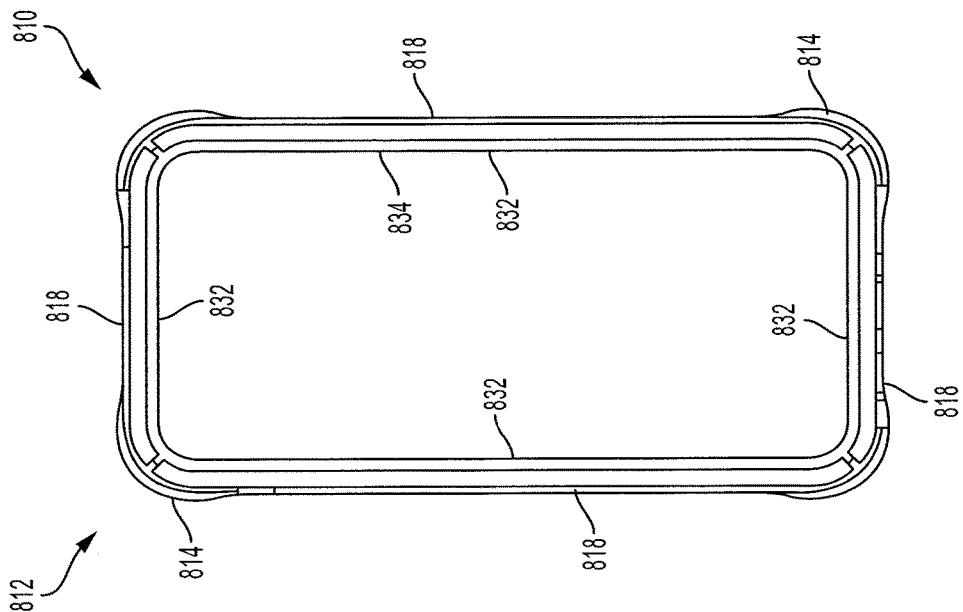

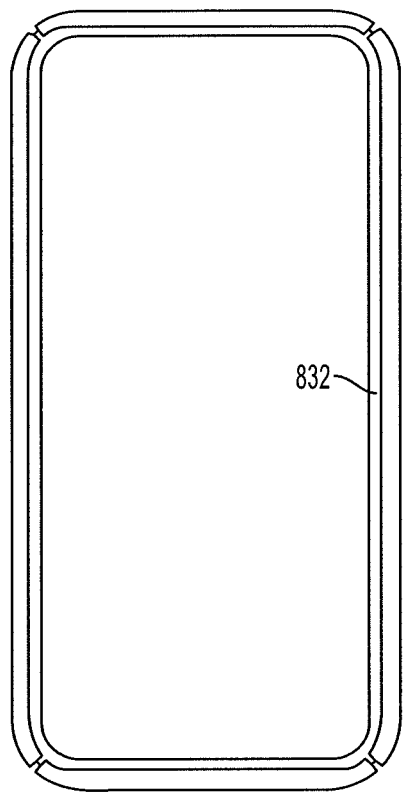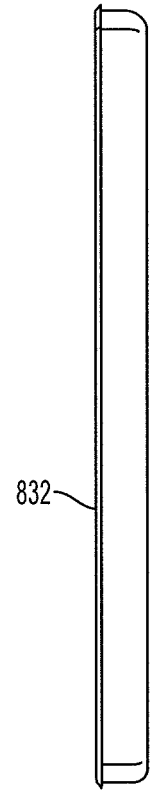
FIG. 8F   FIG. 8G
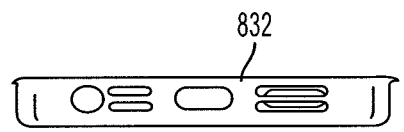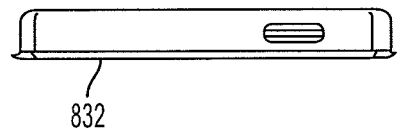
FIG. 8H   FIG. 8I

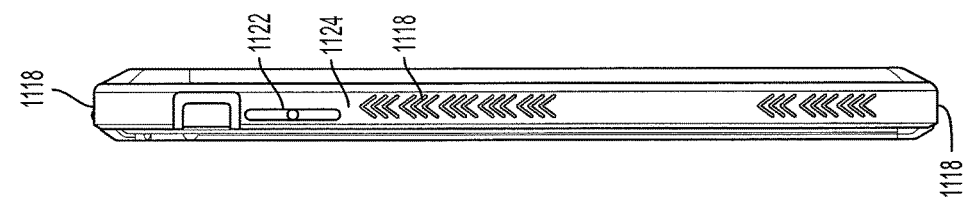
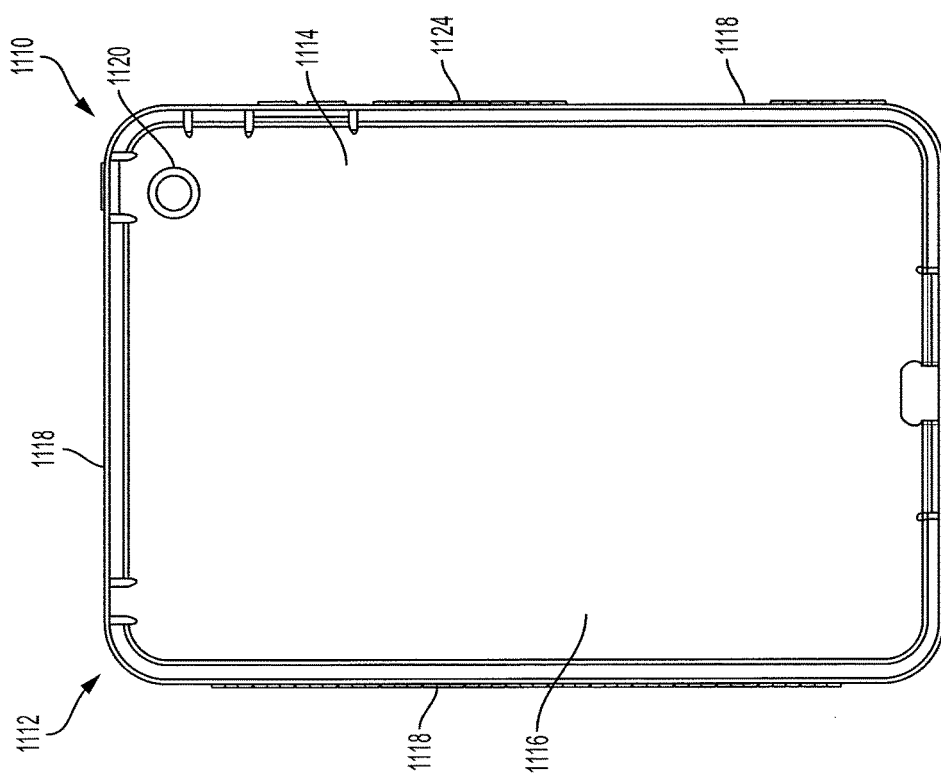

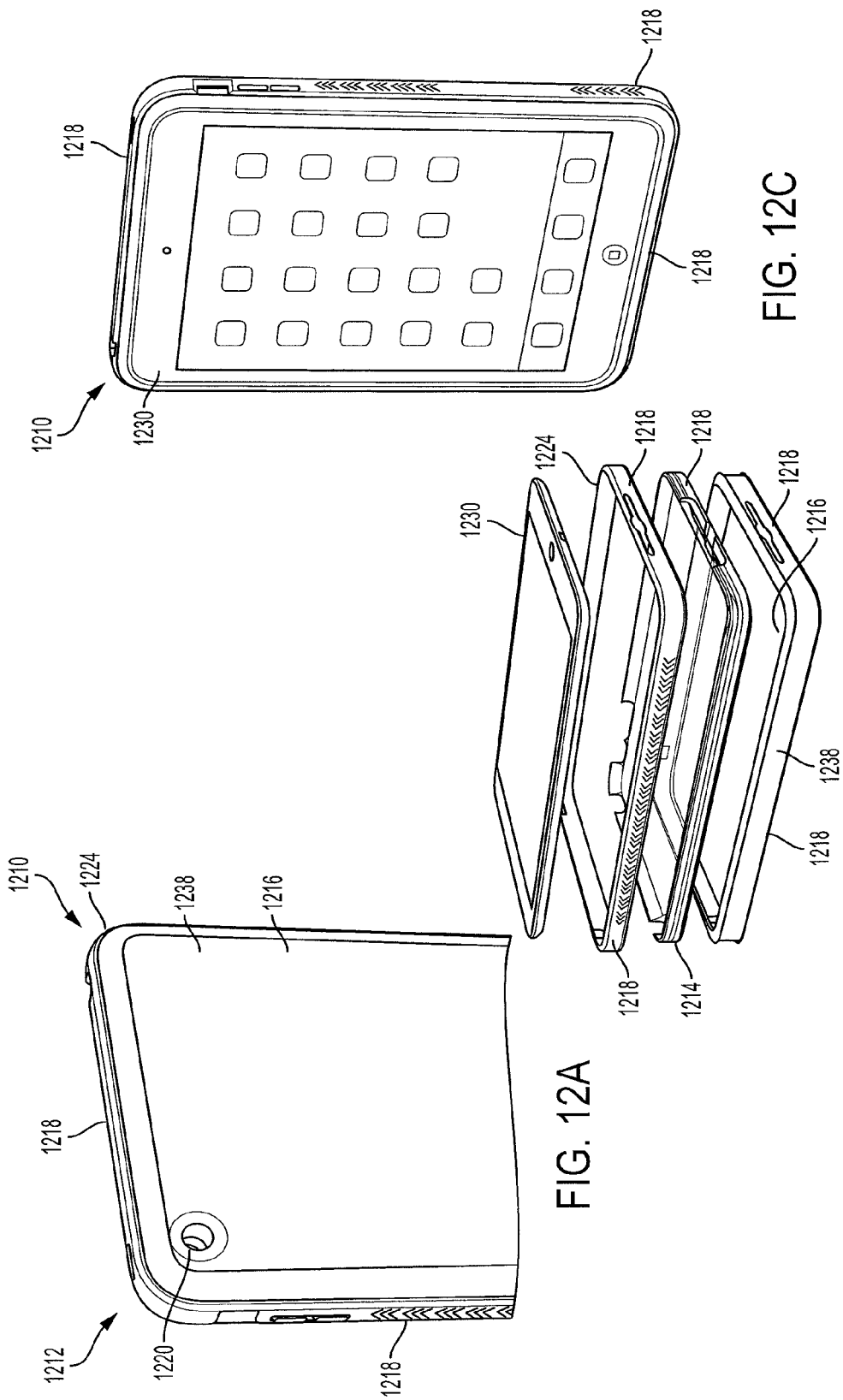

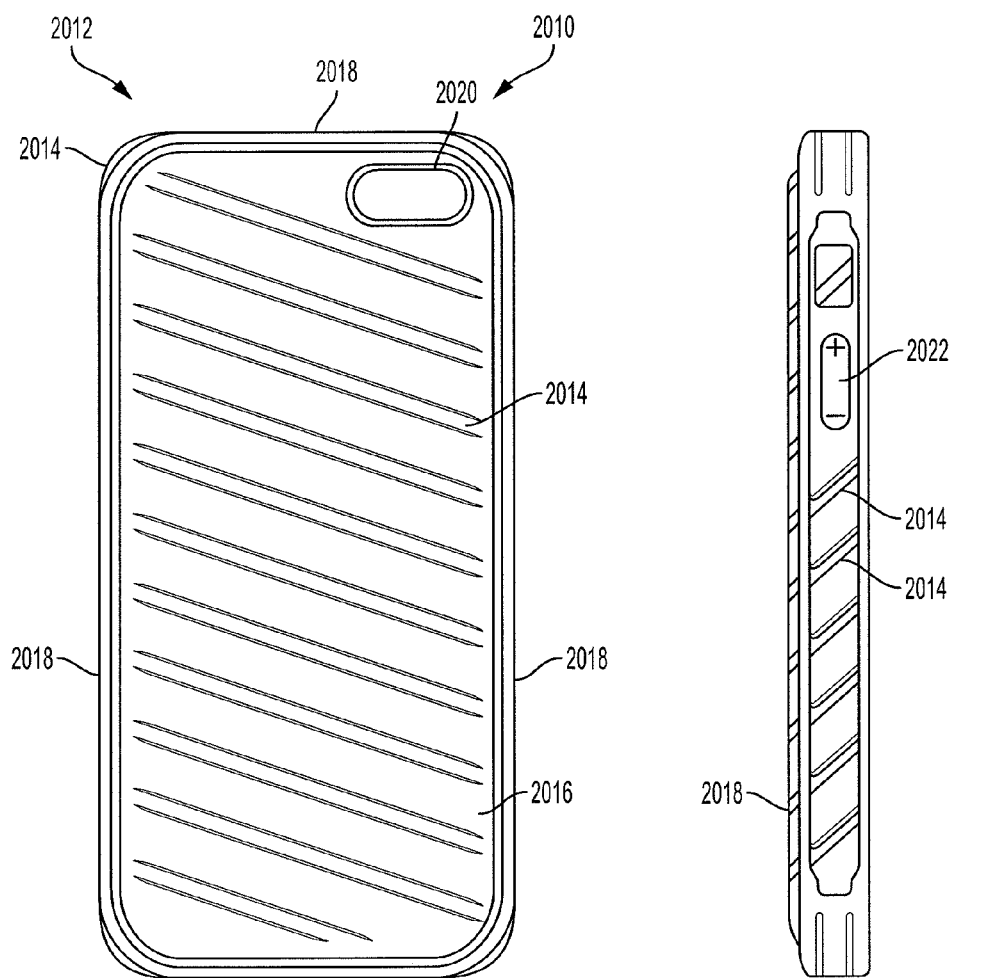
FIG. 20A
FIG. 20B
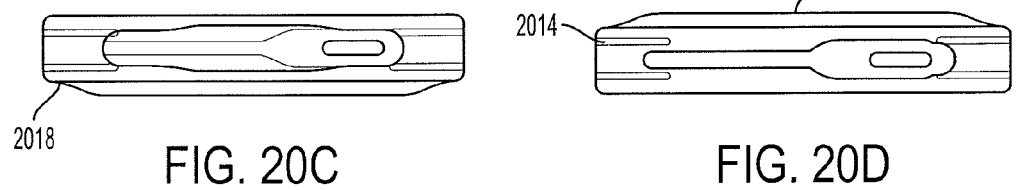
FIG. 20C
FIG. 20D

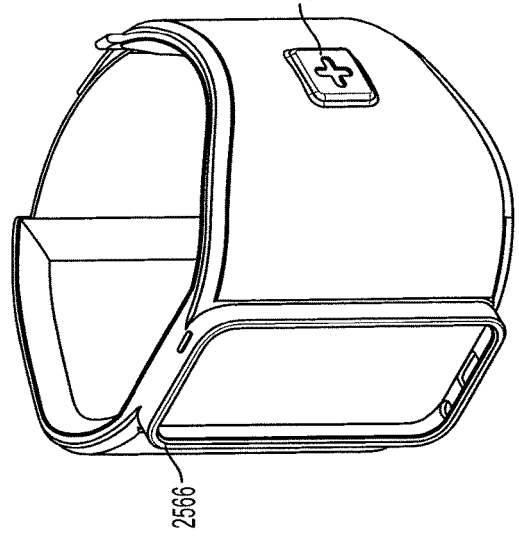
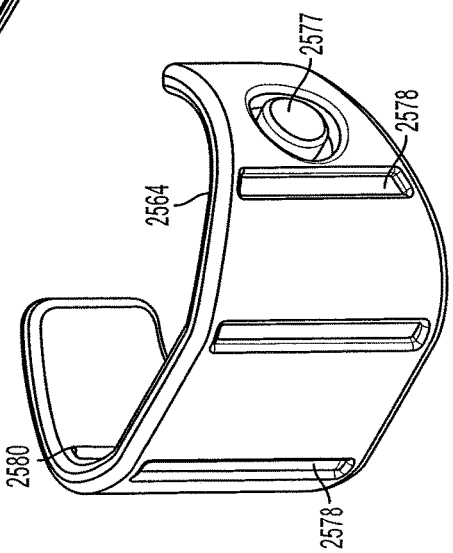
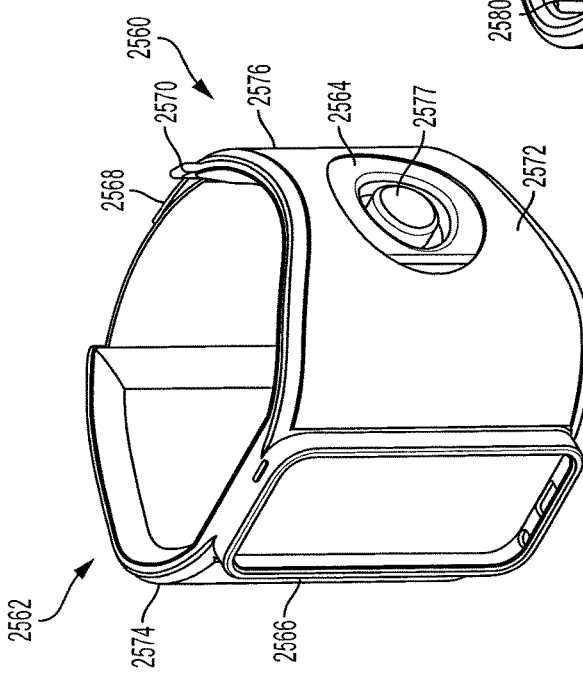

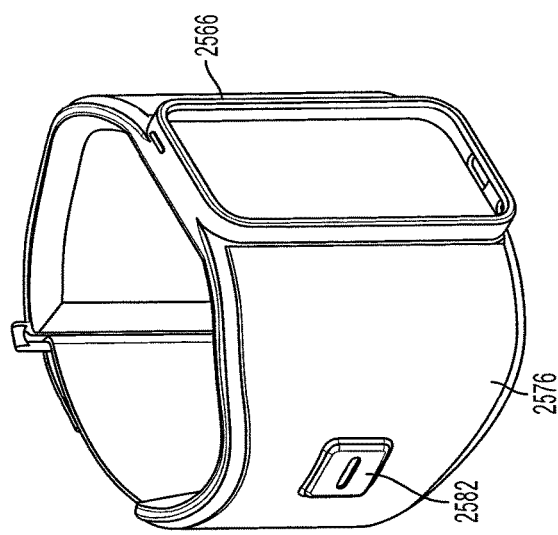
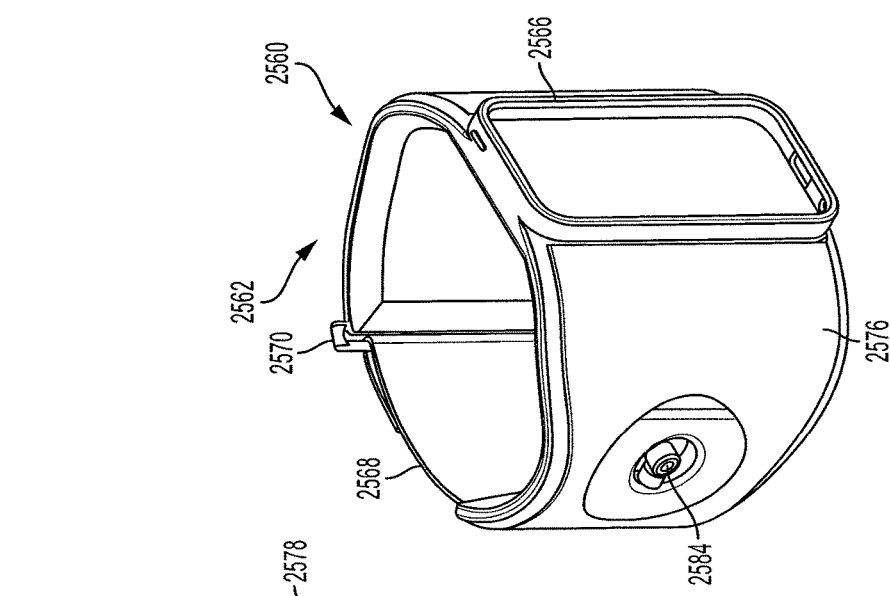
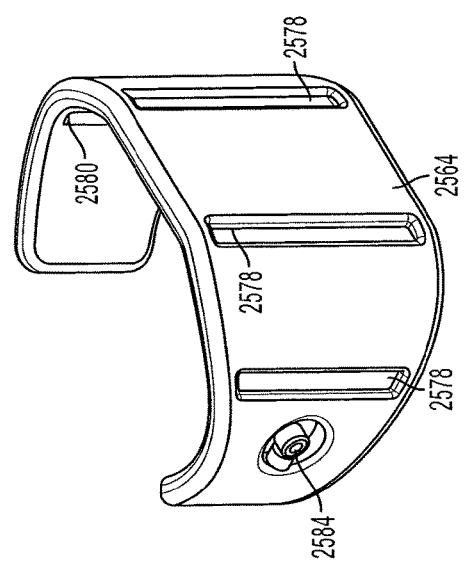

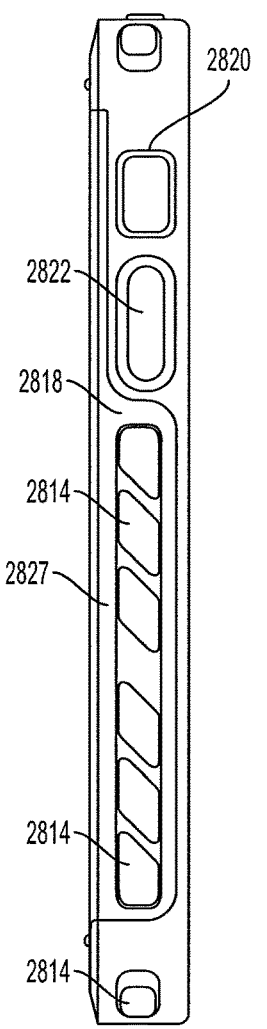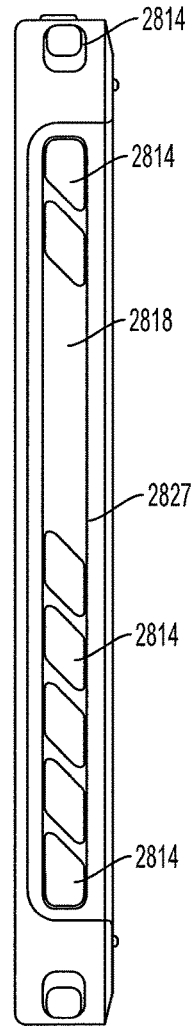
FIG. 28C  FIG. 28D
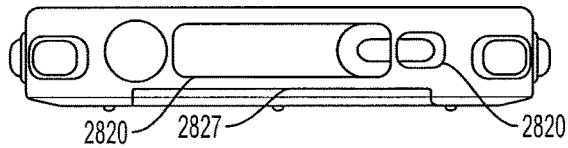
FIG. 28E
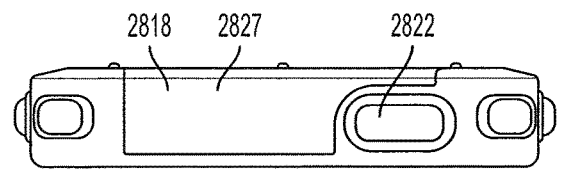
FIG. 28F

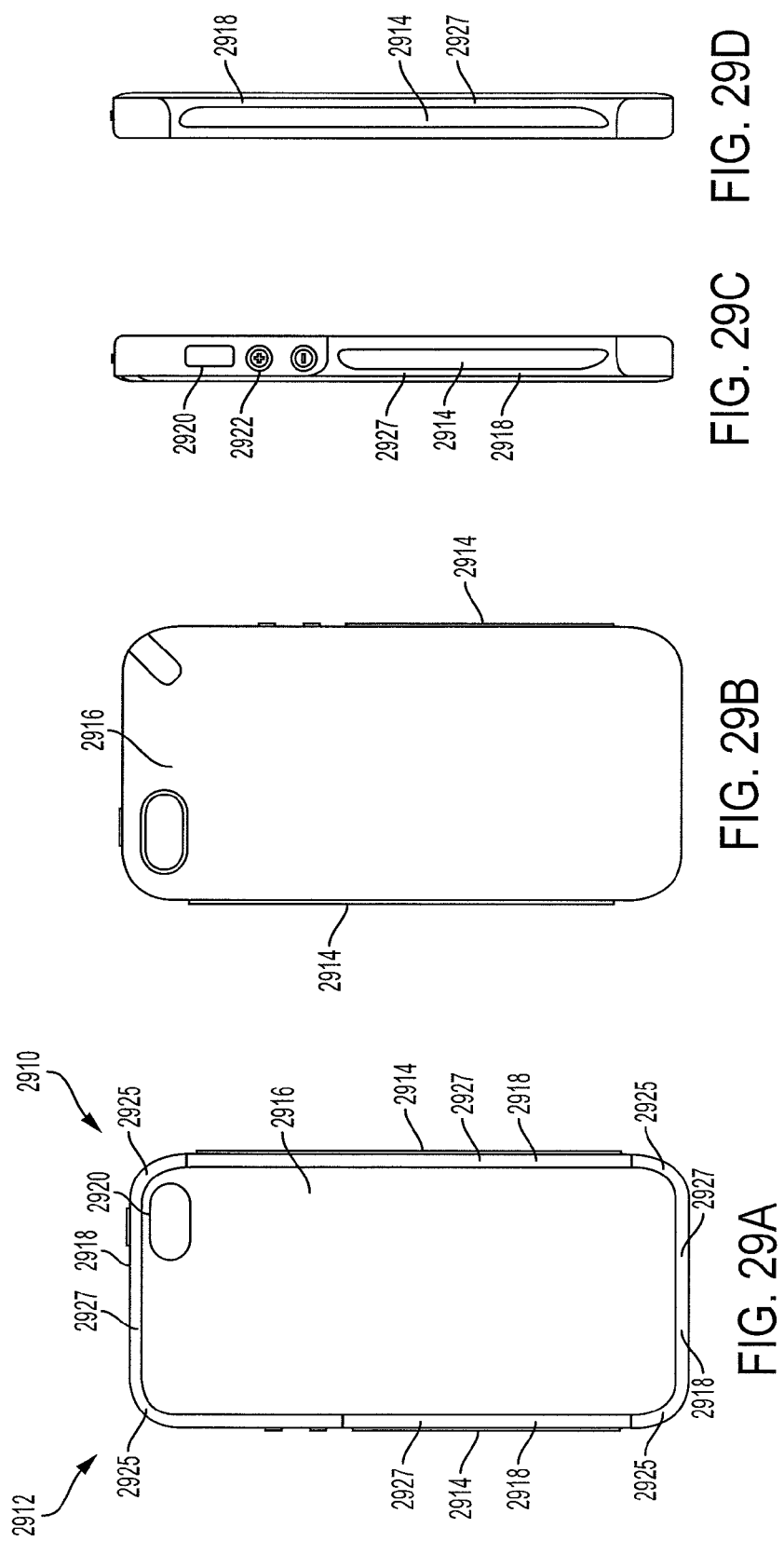

MOBILE DEVICE CASE AND ARMBAND WITH FLUID CHAMBER

RELATED APPLICATIONS

The present application claims the benefit of U.S. Provisional Application No. 62/023,733, filed Jul. 11, 2014, the entire disclosure of which is incorporated herein by reference.

FIELD OF THE INVENTION

The present disclosure relates to cases and armbands for mobile devices.

BACKGROUND OF THE INVENTION

Mobile devices, in the form of phones, computers, digital assistants, and hand held devices have become commonplace in society. Cellular phones, for example, are now carried by individuals at work, at home, at play, and in a variety of other environments. The increased range of wireless communication coverage enhances the variety of environments in which wireless-enabled mobile devices may be used. It may not be unusual to see a mobile device used while an individual is at the beach, at the mall, near a river, walking over a rocky surface, or hiking up a mountain.

In addition, the increased amount of time that an individual spends holding a mobile device may increase the probability that the individual drops a mobile device. Armbands and mobile device cases that merely protect mobile devices from dirt and scratches may be insufficient to protect the device from impact applied directly to the armband or case. The strength of such an impact may be great because users are now more likely to carry mobile devices over hard surfaces like concrete, asphalt, rocks, or the like. In addition, the variety of environments in which mobile devices are used may increase the probability that the individual's hands are slick, which allows the mobile device to more easily slip out of the user's hand (e.g., at the beach, at the gym). Such impact may crack, disengage, or otherwise damage electronic components within the mobile device, or may shatter a view screen or touch screen on the device, or may cause the mobile device to fall into water.

SUMMARY OF THE INVENTION

The cases and armbands disclosed herein are intended to address the need in the art identified by the inventors for greater impact resistance for a mobile device. The variety of environments that mobile devices are now used in may demand greater protection for a mobile device when used with a mobile device case or armband. In addition, the variety of environments may demand a lighter weight case than is normally used, or case that may float upon a liquid such as water. In addition, an improved fit of the case to the mobile device, or an improved fit of the armband to the wearer's arm may be desired.

In one embodiment, a case for a mobile device may include a body configured to couple to the mobile device and cover at least a portion of the mobile device. The body may include a fluid chamber that is configured to retain fluid therein and be positioned upon the mobile device when the mobile device is coupled to the body.

In one embodiment, a case for mobile device may include a base wall configured to cover a surface of the mobile device. The case may include a plurality of side walls each configured to cover a respective side surface of the mobile device and form at least two corners of the case and extend from the base wall such that the plurality of side walls and the base wall form a recess for receiving the mobile device. One of the plurality of side walls may include a plurality of fluid chambers each configured to retain fluid therein and be positioned between two of the at least two corners.

In one embodiment, a case for a mobile device may include a base wall configured to cover a surface of the mobile device. The case may include a plurality of side walls each configured to cover a respective side surface of the mobile device and form at least two corners of the case. One of the plurality of side walls may include a fluid chamber configured to retain fluid therein and be positioned between two of the at least two corners.

In one embodiment, a case for a mobile device may include a base wall configured to cover a surface of the mobile device and may include a fluid chamber. The case may include a plurality of side walls each configured to cover a respective side surface of the mobile device and extend from the base wall such that the plurality of side walls and the base wall form a recess for receiving the mobile device.

In one embodiment, an armband for a mobile device may include a band configured to extend around at least a portion of a wearer's arm and be held to the wearer's arm. The band may include a fluid chamber that is configured to retain fluid therein. The armband may include a coupler configured to couple the mobile device to the band.

In one embodiment, an armband for a mobile device may include a housing configured to receive the mobile device. The armband may include a first arm coupled to the housing and configured to extend around at least a portion of the wearer's arm, and a second arm coupled to the housing and configured to extend around at least a portion of the wearer's arm. The armband may include a fluid chamber configured to retain fluid therein, and being coupled to the housing and positioned such that the fluid chamber is positioned between the housing and the wearer's arm when the armband is held to the wearer's arm.

In one embodiment, a method may include coupling a mobile device to a mobile device case body that includes a fluid chamber configured to retain fluid therein. The method may include activating a pump positioned on the mobile device case body to provide fluid to or withdraw fluid from the fluid chamber.

In one embodiment, a method may include coupling an armband to a wearer's arm. The armband may include a fluid chamber configured to retain fluid therein, and a coupler configured to couple a mobile device to the armband. The method may include activating a pump positioned on the armband to provide fluid to or withdraw fluid from the fluid chamber.

BRIEF DESCRIPTION OF THE DRAWINGS

Features and advantages of the present invention will become appreciated as the same become better understood with reference to the specification, claims, and appended drawings wherein:

FIG. 4A illustrates a rear perspective view of a case for a mobile device, according to an embodiment of the present disclosure.

FIG. 4B illustrates a front perspective view of a case for a mobile device, according to an embodiment of the present disclosure.

FIG. 4C illustrates a rear perspective view of a case for a mobile device, according to an embodiment of the present disclosure.

FIG. 8A illustrates a front view of a case for a mobile device, according to an embodiment of the present disclosure.

FIG. 8B illustrates a right side view of a case for a mobile device, according to an embodiment of the present disclosure.

FIG. 8C illustrates a bottom view of a case for a mobile device, according to an embodiment of the present disclosure.

FIG. 8D illustrates a top view of a case for a mobile device, according to an embodiment of the present disclosure.

FIG. 8F illustrates a front view of an inner wall for a case for a mobile device, according to an embodiment of the present disclosure.

FIG. 8G illustrates a right side view of an inner wall for a case for a mobile device, according to an embodiment of the present disclosure.

FIG. 8H illustrates a bottom view of an inner wall for a case for a mobile device, according to an embodiment of the present disclosure.

FIG. 8I illustrates a top view of an inner wall for a case for a mobile device, according to an embodiment of the present disclosure.

FIG. 11A illustrates a front view of a case for a mobile device, according to an embodiment of the present disclosure.

FIG. 11B illustrates a right side view of a case for a mobile device, according to an embodiment of the present disclosure.

FIG. 12A illustrates a rear perspective view of a case for a mobile device, according to an embodiment of the present disclosure.

FIG. 12B illustrates a front perspective view of a case for a mobile device, according to an embodiment of the present disclosure.

FIG. 12C illustrates a front perspective view of a case for a mobile device, according to an embodiment of the present disclosure.

FIG. 20A illustrates a front view of a case for a mobile device, according to an embodiment of the present disclosure.

FIG. 20B illustrates a left side view of a case for a mobile device, according to an embodiment of the present disclosure.

FIG. 20C illustrates a bottom view of a case for a mobile device, according to an embodiment of the present disclosure.

FIG. 20D illustrates a top view of a case for a mobile device, according to an embodiment of the present disclosure.

FIG. 25A illustrates a front right perspective view of an armband for a mobile device with a portion cut-away, according to an embodiment of the present disclosure.

FIG. 25B illustrates a front right perspective view of a fluid chamber for an armband for a mobile device, according to an embodiment of the present disclosure.

FIG. 25C illustrates a front right perspective view of an armband for a mobile device, according to an embodiment of the present disclosure.

FIG. 25D illustrates a front left perspective view of a fluid chamber for an armband for a mobile device, according to an embodiment of the present disclosure.

FIG. 25E illustrates a front left perspective view of an armband for a mobile device with a portion cut-away, according to an embodiment of the present disclosure.

FIG. 25F illustrates a front left perspective view of an armband for a mobile device, according to an embodiment of the present disclosure.

FIG. 28C illustrates a left side view of a case for a mobile device, according to an embodiment of the present disclosure.

FIG. 28D illustrates a right side view of a case for a mobile device, according to an embodiment of the present disclosure.

FIG. 28E illustrates a bottom view of a case for a mobile device, according to an embodiment of the present disclosure.

FIG. 28F illustrates a top view of a case for a mobile device, according to an embodiment of the present disclosure.

FIG. 29A illustrates a front view of a case for a mobile device, according to an embodiment of the present disclosure.

FIG. 29B illustrates a rear view of a case for a mobile device, according to an embodiment of the present disclosure.

FIG. 29C illustrates a left side view of a case for a mobile device, according to an embodiment of the present disclosure.

FIG. 29D illustrates a right side view of a case for a mobile device, according to an embodiment of the present disclosure.

FIG. 29E illustrates a bottom view of a case for a mobile device, according to an embodiment of the present disclosure.

FIG. 29F illustrates a top view of a case for a mobile device, according to an embodiment of the present disclosure.

DETAILED DESCRIPTION OF THE PREFERRED EMBODIMENTS

Figure 1B:
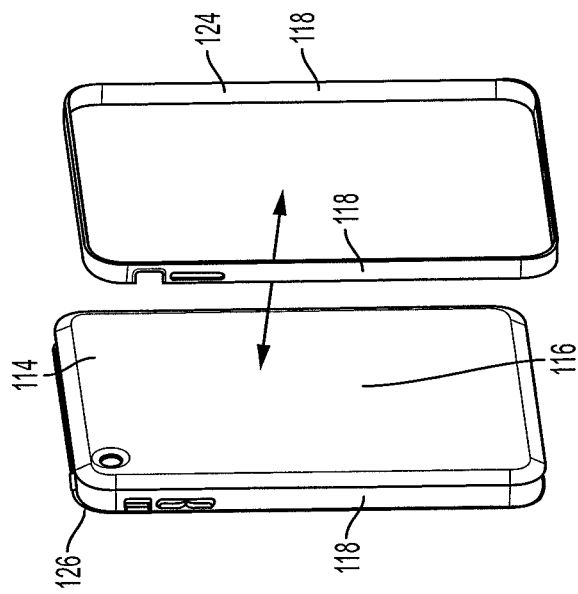
FIG. 1B illustrates a rear perspective view of a case for a mobile device, according to an embodiment of the present disclosure.
Figure 1A:
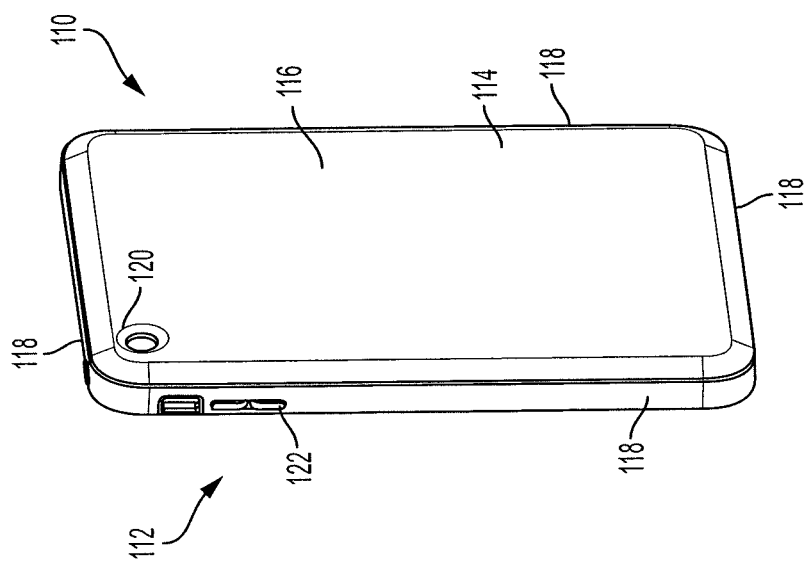
FIG. 1A illustrates a rear perspective view of a case for a mobile device, according to an embodiment of the present disclosure.

FIG. 1A illustrates an embodiment of a case 110 for a mobile device. The case 110 includes a body 112 that includes a fluid chamber 114. The fluid chamber 114 is configured to retain fluid therein and be positioned upon the mobile device when the mobile device is coupled to the body 112.

The body 112 includes a base wall 116 and a plurality of side walls 118 that extend from the base wall 116. The base wall 116 is configured to cover a surface, or back surface, of a mobile device that may be coupled to the body 112. The side walls 118 are each configured to cover a respective side surface of the mobile device that may be coupled to the body 112.

The side walls 118 may extend from the base wall 116 such that the plurality of side walls 118 and the base wall 116 form a recess for receiving the mobile device. The mobile device is positioned in the recess for the mobile device to couple to the body 112. The recess may have a similar configuration as the recess 217 shown in FIGS. 2A and 2D for example. The base wall 116 and side walls 118 may define the shape of the recess. The base wall 116 and side walls 118 may be configured such that the body 112 forms a form fit around the mobile device. The recess may substantially have the shape of the mobile device. The mobile device may couple to the body 112 by merely being placed within the recess, or a small lip of the body 112 may extend over a portion of the mobile device, or another form of attachment device may be used to couple the mobile device to the body 112.

In the embodiment shown in FIG. 1A, the fluid chamber 114 is included in the base wall 116. The fluid chamber 114 is configured to retain fluid therein. The fluid may be a gas, a liquid, a gel, or combinations thereof. The gas may be air or another form of gas. In other embodiments, other forms of fluids may be used within the fluid chamber 114. The fluid chamber 114 may be positioned on the base wall 116 such that the fluid chamber 114 is positioned upon the mobile device when the mobile device is coupled to the body 112.

The fluid chamber 114 may be configured to cushion the mobile device from a force applied to the body 112. The fluid chamber 114 may be configured to cushion the mobile device based on the force being absorbed by the fluid. In an embodiment in which the fluid is a gas, the force may be absorbed by the gas compressing in response to the force. The fluid chamber 114 may beneficially be a compressible fluid chamber 114 in an embodiment in which a gas, for example air, is used in the chamber 114. The compression properties of the fluid chamber 114 increase the ability of the fluid chamber 114 to absorb the force. In an embodiment in which the fluid is a liquid or gel, the force may be absorbed by the force being transmitted through the liquid or gel. In other embodiments, the fluid chamber 114 may cushion the force through another manner. In one embodiment, the fluid chamber 114 may include flexible side walls. The flexible side walls may flex or have a shape that varies in response to the force to enhance the ability of the fluid chamber 114 to cushion the mobile device from the force.

The fluid chamber 114 may be configured to be sealed fluid-tight such that no fluid may enter or escape the fluid chamber 114 during use of the case 110. In one embodiment, the fluid chamber 114 may be configured such that the seal may be broken by a user inserting fluid to or withdrawing fluid from the fluid chamber 114. In one embodiment, the fluid chamber 114 may be pre-filled with all or only a portion of the fluid chamber 114 filled with the fluid. The pre-filled fluid chamber 114 may be coupled to the mobile device. In one embodiment, the fluid chamber 114 may be configured to be entirely or partially filled with a fluid after the fluid chamber 114 is coupled to the mobile device. In such an embodiment, the fluid chamber 114 may have increased flexibility to be positioned upon the mobile device in the manner desired, and is then later entirely or partially filled with the fluid.

In one embodiment, the fluid may be configured to have a density that is less than the density of water. The density of the fluid in the fluid chamber 114 may assist the body 112 to float if the body 112 is dropped in water. The fluid chamber 114 may be configured to retain a sufficient amount of fluid to allow the body 112 and attached mobile device to float upon water.

In the embodiment shown in FIG. 1A, the fluid chamber 114 may form the entirety of the base wall 116 or only a portion of the base wall 116. The fluid chamber 114 may be positioned between two walls of the base wall 116, the walls being either flexible walls or rigid walls. The base wall 116 may include a surface that is configured to face towards the mobile device when the mobile device is received in the recess, and the fluid chamber 114 may be positioned upon the surface. The base wall 116 may include a rigid or flexible wall that is configured to cover at least one surface of the mobile device, with the fluid chamber 114 being positioned between the rigid or flexible wall and the mobile device when the mobile device is coupled to the body 112.

In one embodiment, a plurality of fluid chambers 114 may be included in the base wall 116. The plurality of fluid chambers 114 may be either in fluid communication with each other or in fluid isolation from each other. In one embodiment, the plurality of fluid chambers 114 may be included in both the base wall 116 and at least one of the side walls 118, which may include all of the side walls 118. In one embodiment, the plurality of fluid chambers 114 may be included solely in at least one of the side walls 118, which may include all of the side walls 118. In one embodiment, a single fluid chamber 114 may be included in both the base wall 116 and at least one of the side walls 118, which may include all of the side walls 118. In one embodiment, a single fluid chamber 114 may be included solely in at least one of the side walls 118, which may include all of the side walls 118.

The body 112 may include an opening 120 or other openings that provide access to a feature of the mobile device. As shown in FIG. 1A, an opening 120 may be positioned on the base wall 116 to allow access to a feature such as a camera of the mobile device. The side walls 118 of the body 112 may include flexible portions 122 that allow access to features of the mobile device. As shown in FIG. 1A, the flexible portions 122 may allow access to a rocker switch of the mobile device.

The body 112 may be made of a single piece or multiple pieces. In the embodiment shown in FIG. 1A, the body 112 includes a base wall 116 with multilayered side walls 118. The side walls 118 include an inner layer that is integral with the base wall 116 and an outer layer that forms a bumper 124 that is separable from the base wall 116. The bumper 124 separated from the base wall 116 is shown in FIG. 1B. The bumper 124 may form a band that extends over the inner layer of the side walls 118 shown in FIG. 1B. In one embodiment, the bumper 124 may extend over only a portion of the inner layer of the side walls 118.

The base wall 116 and the inner layer of the side walls 118 may be made of a flexible material to allow these portions of the body 112 to more easily fit over the mobile device. The bumper 124 may be made of a more rigid material to add support to the body 112. In one embodiment, the base wall 116 and the inner layer of the side walls 118, and the bumper 124, may be made of the same material, or materials having a similar degree of flexibility. In one embodiment, the base wall 116 and the inner layer of the side walls 118, and the bumper 124 may be integral with one another. For example, in one embodiment, these portions of the body 112 may be dual injection molded together.

FIG. 1B displays the movement of the bumper 124 to be placed upon or withdrawn from the base wall 116 and the inner layer of the side walls 118. The base wall 116 and the inner layer of the side walls 118 may be coupled to the mobile device first and then the bumper 124 may be added afterwards. A lip 126 extending from the edge of the side wall 118 may impede the movement of the bumper 124 as it is added. The body 112 is removed from the mobile device in a reverse operation.

The body 112 as shown in FIGS. 1A and 1B has a substantially rectangular shape. The substantially rectangular shape may conform to the shape of the mobile device to be coupled to the body 112. The recess of the body 112 may have a substantially rectangular shape to conform to the shape of the mobile device. In one embodiment, the body 112 may have a different shape that conforms to the shape of the mobile device to be coupled to the body, for example an oval or oblong shape, or another shape, as desired. In one embodiment, the base wall 116, and/or the side walls 118 may have a greater or fewer number of pieces than shown in FIGS. 1A and 1B. For example, the base wall 116 may be made of multiple pieces that couple together.

In one embodiment, the base wall 116 and the inner layer of the side walls 118 may be made of a flexible material such as an elastomer. The elastomer may be a thermoplastic elastomer or the like. Other flexible materials or elastomers may be utilized as desired. The bumper 124 may be made of a more rigid material such as a rigid thermoplastic polyurethane, polycarbonate, or the like. In one embodiment, the portions of the body 112 may be made of the same material or materials having similar properties such as flexibility.

Figures 2A, 2B:
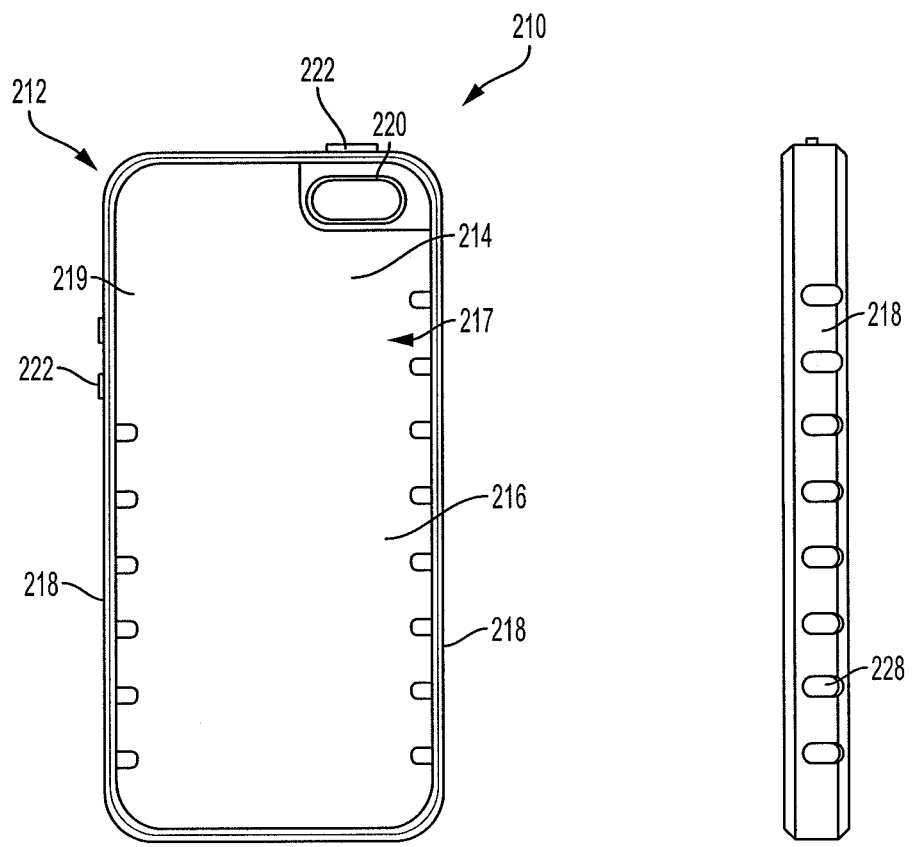
FIG. 2A illustrates a front view of a case for a mobile device, according to an embodiment of the present disclosure.
FIG. 2B illustrates a right side view of a case for a mobile device, according to an embodiment of the present disclosure.

FIG. 2A illustrates an embodiment of a case 210 for a mobile device. The case 210 includes a body 212 that includes a fluid chamber 214. The fluid chamber 214 is configured to retain fluid therein and be positioned upon the mobile device when the mobile device is coupled to the body 212. Elements that include the same last two digits of a reference number in this application, for the various embodiments of cases or armbands in this application, are similar elements and the description of these elements applies across the embodiments, unless otherwise stated. The elements of any of the embodiments of cases or armbands in this application may be interchanged with one another or included with one another to produce a desired result.

Figure 2C:
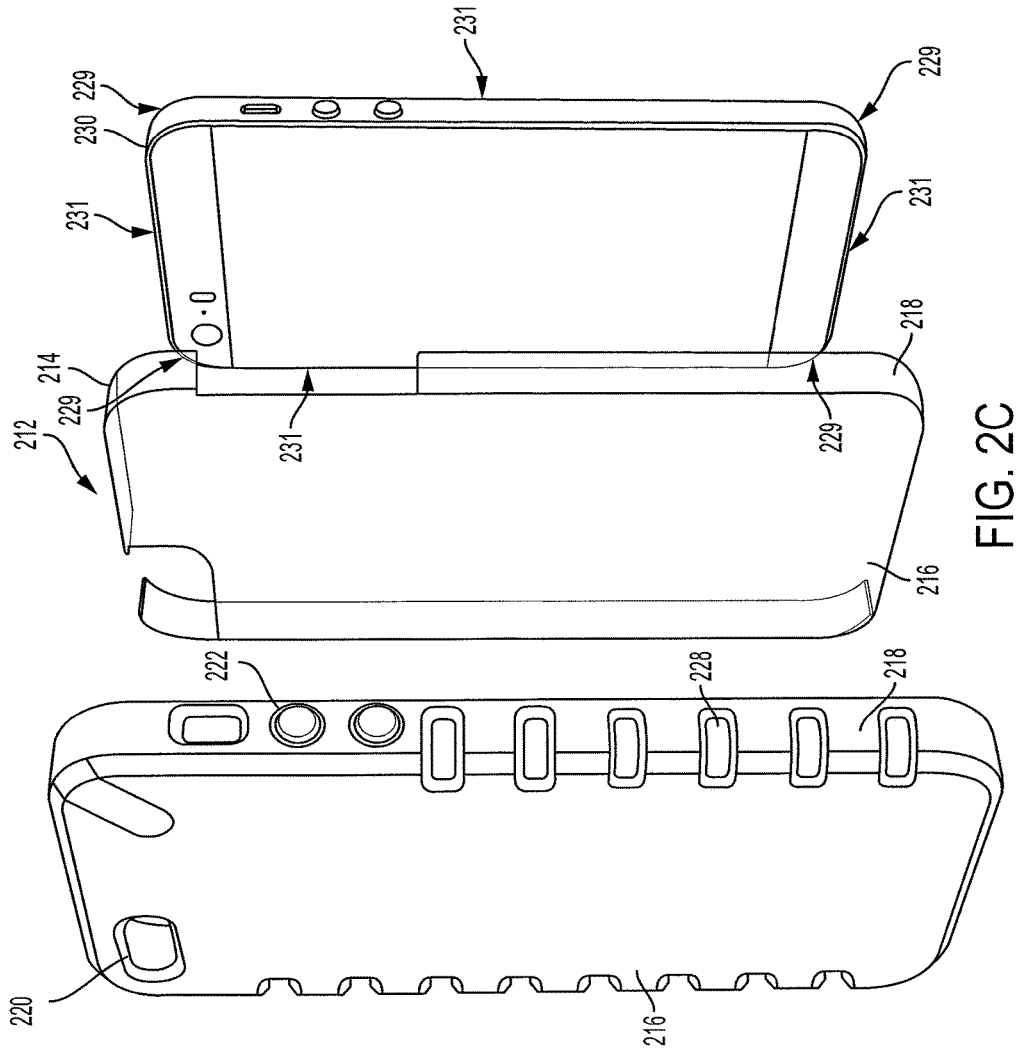
FIG. 2C illustrates a rear perspective view of a case for a mobile device, according to an embodiment of the present disclosure.

In the embodiment shown in FIG. 2A, the fluid chamber 214 forms an inner layer of the base wall 216. The fluid chamber 214 forms a lining of an outer layer of the base wall 216. The base wall 216 includes a surface that is configured to face towards the mobile device when the mobile device is received by the recess 217. The fluid chamber 214 is positioned upon this surface 219, which is visible through the fluid chamber 214 in FIG. 2A. The side walls 218 each include a surface that is configured to face towards the mobile device when the mobile device is received by the recess 217. The fluid chamber 214 is positioned upon these surfaces, which are the interior surfaces of the outer layer of the side walls, as shown by reference number 221 in FIG. 2D. The fluid chamber 214 separated from these surfaces is shown in FIG. 2C. The fluid chamber 214 may cover the entirety of the interior surfaces of the outer layer of the base wall 216 and/or side walls 218, or only a portion of the interior surfaces of the outer layer of the base wall 216 and/or side walls 218, which may include a majority of the interior surfaces of the outer layer of the base wall 216 and/or side walls 218.

The outer layer of the base wall 216 or side walls 218 that the fluid chamber 214 is positioned upon may be either flexible or rigid. In an embodiment in which the outer layers are rigid, the outer layers may form a rigid wall that is configured to cover at least one surface of the mobile device as shown in FIG. 2A. The fluid chamber 214 is positioned between the rigid wall and the mobile device when the mobile device is coupled to the body 212. The fluid chamber 214 may be similarly positioned in an embodiment in which outer layers of the side walls 218 form rigid walls. The fluid chamber 214 may be similarly positioned in an embodiment in which the base wall 216 and/or side walls 218 form flexible walls.

A portion of the base wall 216 and/or side walls 218 may include an opening 228 that exposes at least a portion of the fluid chamber 214. The opening 228 may be in an outer layer of the base wall 216 and/or side walls 218, which may be rigid (as shown in FIG. 2A) or flexible walls. Openings may be positioned on the bottom of the body 212 and allow access to features of the mobile device. A flexible portion 222 on the top of the body may allow access to a feature of the mobile device.

The fluid chamber 214 may be configured to be separably coupled to the outer wall, or may be integrally coupled to the wall. The fluid chamber 214 may be configured to be transparent or translucent.

FIG. 2B illustrates a right side view of the body 212. Openings 228 are visible in the rigid outer wall that expose at least a portion of the fluid chamber 214.

FIG. 2C illustrates a view with the fluid chamber 214 separated from the outer layer of the base wall 216 and side walls 218. Flexible portions 222 allow access to features of the mobile device. A plurality of openings 228 in the base wall 216 expose at least a portion of the fluid chamber 214. The openings 228 in the base wall 216 may also form a grip structure for a user's hand. An opening 220 may be positioned on the base wall 216 to allow access to a feature such as a camera of the mobile device.

A mobile device 230 for use with any of the embodiments of cases or armbands shown or discussed in this application is shown in FIG. 2C. The mobile device 230 as shown in FIG. 2C is a phone, however in other embodiments the mobile device 230 may be a computer, tablet, or combination of phone, computer, or tablet. In one embodiment, the mobile device 230 may be an iPod® or iPhone® as sold by Apple®, including any version of an iPhone® such as an iPhone 3® or iPhone 3S®, iPhone 4® or 4S®, iPhone 5® or 5S®, or iPhone 6®. In one embodiment, the mobile device 230 may be an iPad® as sold by Apple®, including any version of an iPad® such as an iPad Mini®, iPad Air®, iPad®, or iPad 2®. In one embodiment, the mobile device 230 may be a mobile device sold by Samsung® such as a version of a Samsung Galaxy®, or a mobile device sold by another manufacturer such a version of an HTC One®, a Google Nexus®, a Nokia Lumia®, or mobile devices sold by other manufacturers.

In the embodiment shown in FIG. 2C, the mobile device 230 has a rectangular shape, although in other embodiments alternative shapes may be used if desired. In the embodiment shown in FIG. 2C, the mobile device 230 includes corner surfaces 229, and side surfaces 231 that are positioned between the respective corner surfaces 229. Any of the embodiments of cases shown or discussed in this application may cover the respective corner surfaces 229 and/or side surfaces 231 of a mobile device unless otherwise stated. The side walls at the corners of the embodiments of cases shown or discussed in this application are configured to be positioned upon a respective corner surface of the mobile device, unless otherwise stated. The portions of the side walls between the corners of the embodiments of cases shown or discussed in this application are side portions of the side walls and are configured to be positioned upon respective side surfaces of the mobile device, unless otherwise stated.

In one embodiment, the outer layer of the base wall 216 or side walls 218 that the fluid chamber 214 is positioned upon may be made of a flexible material such as an elastomer. The fluid chamber 214 may also be made from a flexible material such as an elastomer. The elastomer may be a thermoplastic elastomer or the like. Other flexible materials or elastomers may be utilized as desired. In one embodiment, the outer layer of the base wall 216 or side walls 218 that the fluid chamber 214 is positioned upon, or the fluid chamber 214 may be made of a more rigid material such as a rigid thermoplastic polyurethane, polycarbonate, or the like. In one embodiment, the portions of the body 212 may be made of the same material or materials having similar properties such as flexibility. In one embodiment, the portions of the body 212 may be made of different material or materials having different properties such as flexibility.

Figure 2D:
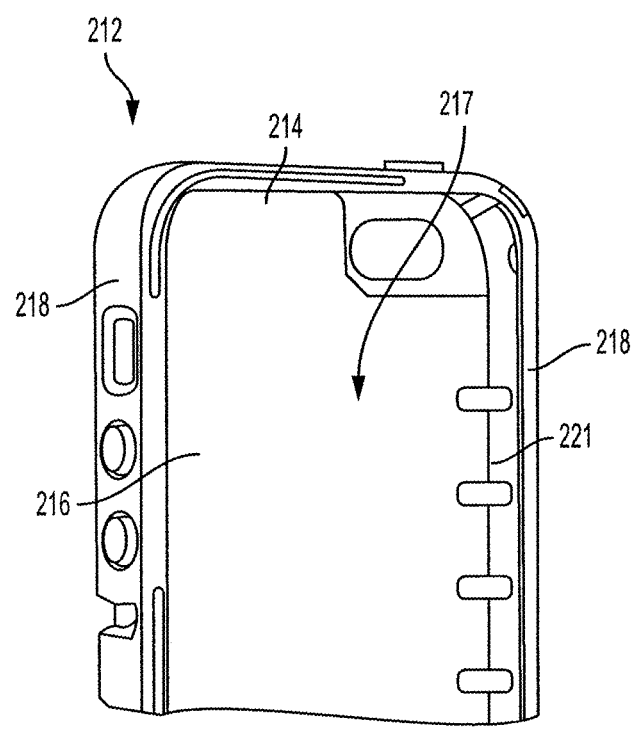
FIG. 2D illustrates a front perspective view of a portion of a case for a mobile device, according to an embodiment of the present disclosure.

FIG. 2D illustrates a front perspective view of the fluid chamber 214 in position within the body, forming a layer on the interior surfaces 221 of the outer layer of the side walls and the base wall 216.

Figures 3A, 3B:
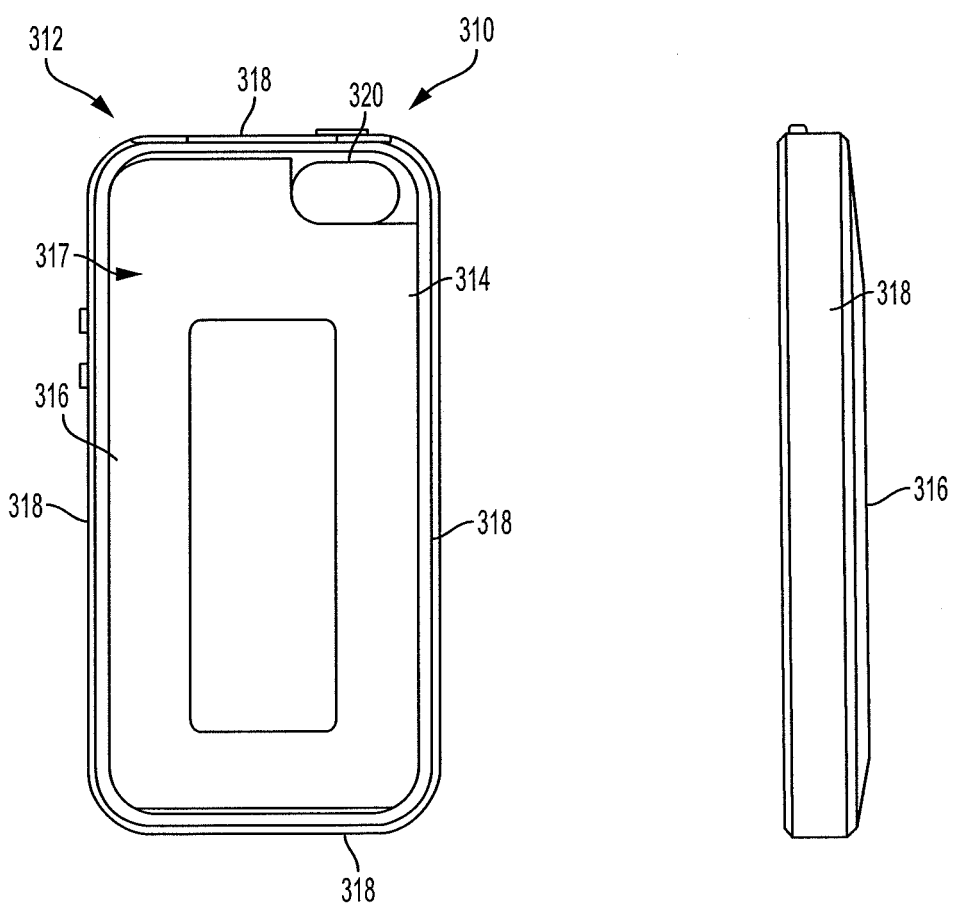
FIG. 3A illustrates a front view of a case for a mobile device, according to an embodiment of the present disclosure.
FIG. 3B illustrates a right side view of a case for a mobile device, according to an embodiment of the present disclosure.

FIG. 3A illustrates an embodiment of a case 310 for a mobile device. The case 310 includes a body 312 that includes a fluid chamber 314. The fluid chamber 314 is configured to retain fluid therein and be positioned upon the mobile device when the mobile device is coupled to the body 312. The mobile device may be positioned in and received by the recess 317. A small lip may extend over the mobile device from the side walls 318 to hold the mobile device 330 to the body 312.

In the embodiment shown in FIG. 3A, the fluid chamber 314 forms an inner layer of the base wall 316, similar to the configuration of the fluid chamber 214 shown in FIG. 2A. The outer layer of the base wall 316, may be a rigid wall, similar to the configuration of the outer layer of the base wall 216 shown in FIG. 2C. The outer layer of the base wall 316, however, includes a central opening 328 (marked in FIGS. 3C and 3D) that exposes at least a portion of the fluid chamber 314. The opening 328 may have a rectangular shape as shown and may expose more than about 25% and less than about 35% of the portion of the fluid chamber 314 that lines the outer layer of the base wall 316. In other embodiments, the size of the opening 328 may be varied as desired. In one embodiment, the outer layer of the base wall 316 or side walls 318 that the fluid chamber 314 is positioned upon may be flexible.

FIG. 3B illustrates a right side view of the case 310. The outer layer of the base wall 316 may be angled in a direction away from the front of the case 310 as shown.

Figure 3C:
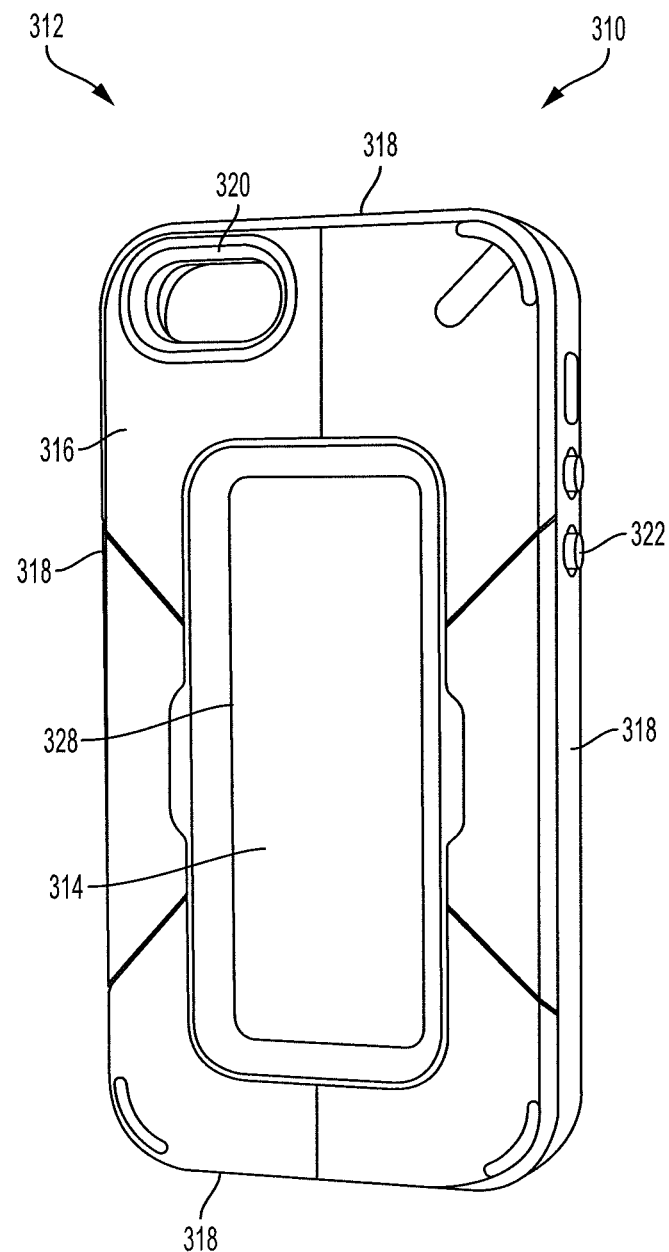
FIG. 3C illustrates a rear perspective view of a case for a mobile device, according to an embodiment of the present disclosure.

FIG. 3C illustrates a rear perspective view of the case 310. The fluid chamber 314 is visible through the opening 328.

Figure 3D:
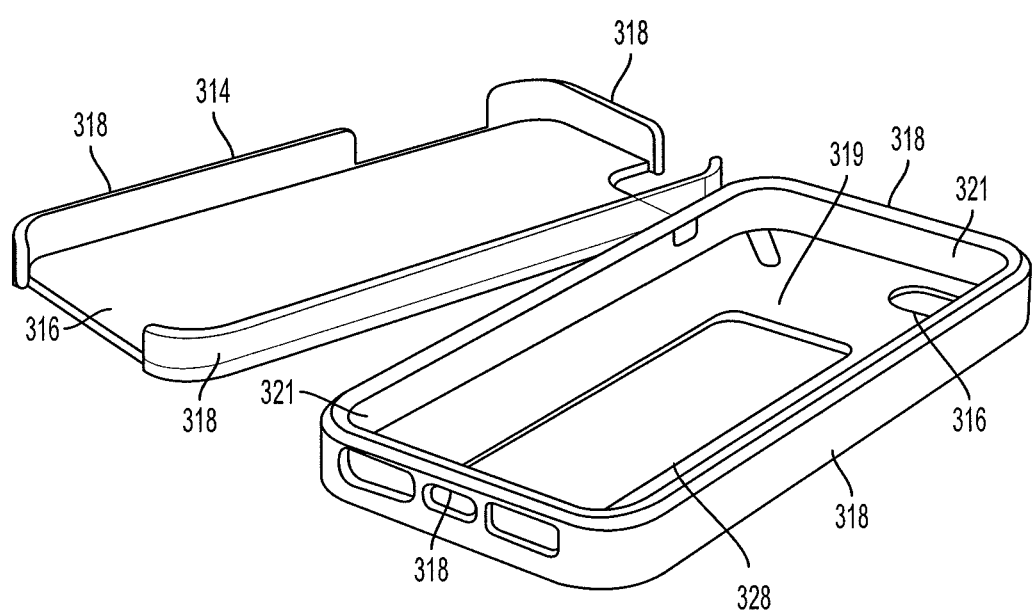
FIG. 3D illustrates a front perspective view of a case for a mobile device, according to an embodiment of the present disclosure.

FIG. 3D illustrates a front perspective view of the case with the fluid chamber 314 removed. Similar to the fluid chamber shown in FIG. 2A, the fluid chamber 314 may be separable from the outer layer of the base wall 316 and side walls 318. In one embodiment, the fluid chamber 314 may be integral with the outer layer of the base wall 316 and side walls 318.

In one embodiment, the outer layer of the base wall 316 or side walls 318 that the fluid chamber 314 is positioned upon may be made of a flexible material such as an elastomer. The fluid chamber 314 may also be made from a flexible material such as an elastomer. The elastomer may be a thermoplastic elastomer or the like. Other flexible materials or elastomers may be utilized as desired. In one embodiment, the outer layer of the base wall 316 or side walls 318 that the fluid chamber 314 is positioned upon, or the fluid chamber 314 may be made of a more rigid material such as a rigid thermoplastic polyurethane, polycarbonate, or the like. In one embodiment, the portions of the body 312 may be made of the same material or materials having similar properties such as flexibility. In one embodiment, the portions of the body 312 may be made of different material or materials having different properties such as flexibility.

FIG. 4A illustrates an embodiment of a case 410 for a mobile device. The case 410 includes a body 412 that includes a fluid chamber 414. The fluid chamber 414 is configured to retain fluid therein and be positioned upon the mobile device when the mobile device is coupled to the body 412.

In the embodiment shown in FIG. 4A, the fluid chamber 414 is included in the outer layer of the side walls 418. The outer layer forms a bumper 424 that is separable from the base wall 416. The bumper 424 separated from the base wall 416 is shown in FIG. 4B. The bumper 424 may form a band that extends over the inner layer of the side walls 418 shown in FIG. 4B. The bumper 424 is configured to be positioned upon at least a portion of a side surface of the mobile device. In one embodiment, the bumper 424 may extend over only a portion of the inner layer of the side walls 418.

In one embodiment, a plurality of fluid chambers 414 may be included in the bumper 424. The plurality of fluid chambers 414 may be either in fluid communication with each other or in fluid isolation from each other. In one embodiment, the plurality of fluid chambers 414 may be included in the bumper 424 and/or the base wall 416 and/or a remaining portion of the side walls 418, which may include all of the side walls.

The base wall 416 and the inner layer of the side walls 418 may be made of a flexible material to allow these portions of the body 412 to more easily fit over the mobile device. The bumper 424 may be made of a more rigid material to add support to the body 412. In one embodiment, the base wall 416 and the inner layer of the side walls 418, and the bumper 424, may be made of the same material, or materials having a similar degree of flexibility. In one embodiment, the base wall 416 and the inner layer of the side walls 418, and the bumper 424 may be integral with one another. For example, in one embodiment, these portions of the body 412 may be dual injection molded together.

FIG. 4C displays the movement of the bumper 424 to be placed upon or withdrawn from the base wall 416 and the inner layer of the side walls 418. The base wall 416 and the inner layer of the side walls 418 may be coupled to the mobile device first and then the bumper 424 may be added afterwards. A lip 426 extending from the edge of the side wall 418 may impede the movement of the bumper 424 as it is added. The body 412 is removed from the mobile device in a reverse operation.

In one embodiment, the base wall 416 or inner layer of the side walls 418 that the fluid chamber 414 is positioned upon may be made of a flexible material such as an elastomer. The fluid chamber 414 may also be made from a flexible material such as an elastomer. The elastomer may be a thermoplastic elastomer or the like. Other flexible materials or elastomers may be utilized as desired. In one embodiment, the base wall 416 or inner layer of the side walls 418 that the fluid chamber 414 is positioned upon, or the fluid chamber 414 may be made of a more rigid material such as a rigid thermoplastic polyurethane, polycarbonate, or the like. In one embodiment, the portions of the body 412 may be made of the same material or materials having similar properties such as flexibility. In one embodiment, the portions of the body 412 may be made of different material or materials having different properties such as flexibility.

Figure 5A:
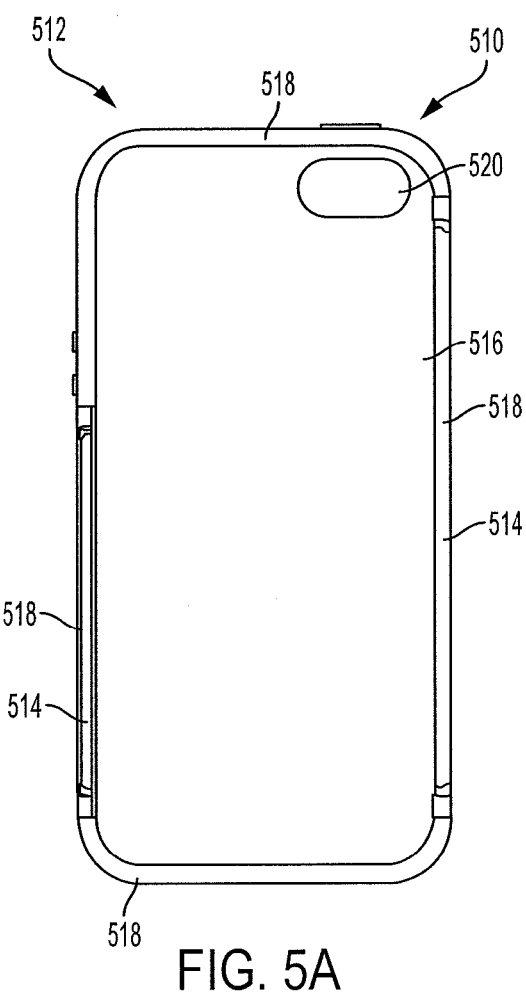
FIG. 5A illustrates a front view of a case for a mobile device, according to an embodiment of the present disclosure.

FIG. 5A illustrates an embodiment of a case 510 for a mobile device. The case 510 includes a body 512 that includes a fluid chamber 514. The fluid chamber 514 is configured to retain fluid therein and be positioned upon the mobile device when the mobile device is coupled to the body 512.

In the embodiment shown in FIG. 5A, the fluid chamber 514 is included as a portion of the side wall 518. The fluid chamber 514 is positioned in a cut out portion of the side wall 518. One fluid chamber 514 is on a left side wall 518 and another fluid chamber 514 is on a right side wall 518. These fluid chambers 514 are in line with the rest of the respective side walls 518 such that the fluid chamber 514 and side walls form a single layer structure of the side walls 518.

Figure 5B:
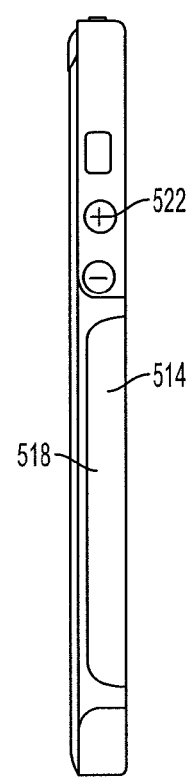
FIG. 5B illustrates a left side view of a case for a mobile device, according to an embodiment of the present disclosure.
Figure 5C:
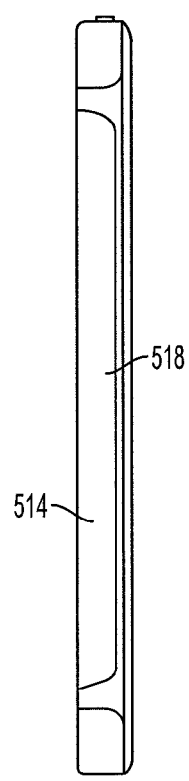
FIG. 5C illustrates a right side view of a case for a mobile device, according to an embodiment of the present disclosure.

FIG. 5B illustrates a left side view of the case. The fluid chamber 514 forms a portion of the side walls 518. FIG. 5C illustrates a right side view of the case 510. The fluid chamber 514 forms a portion of the side walls 518.

Figure 5D:
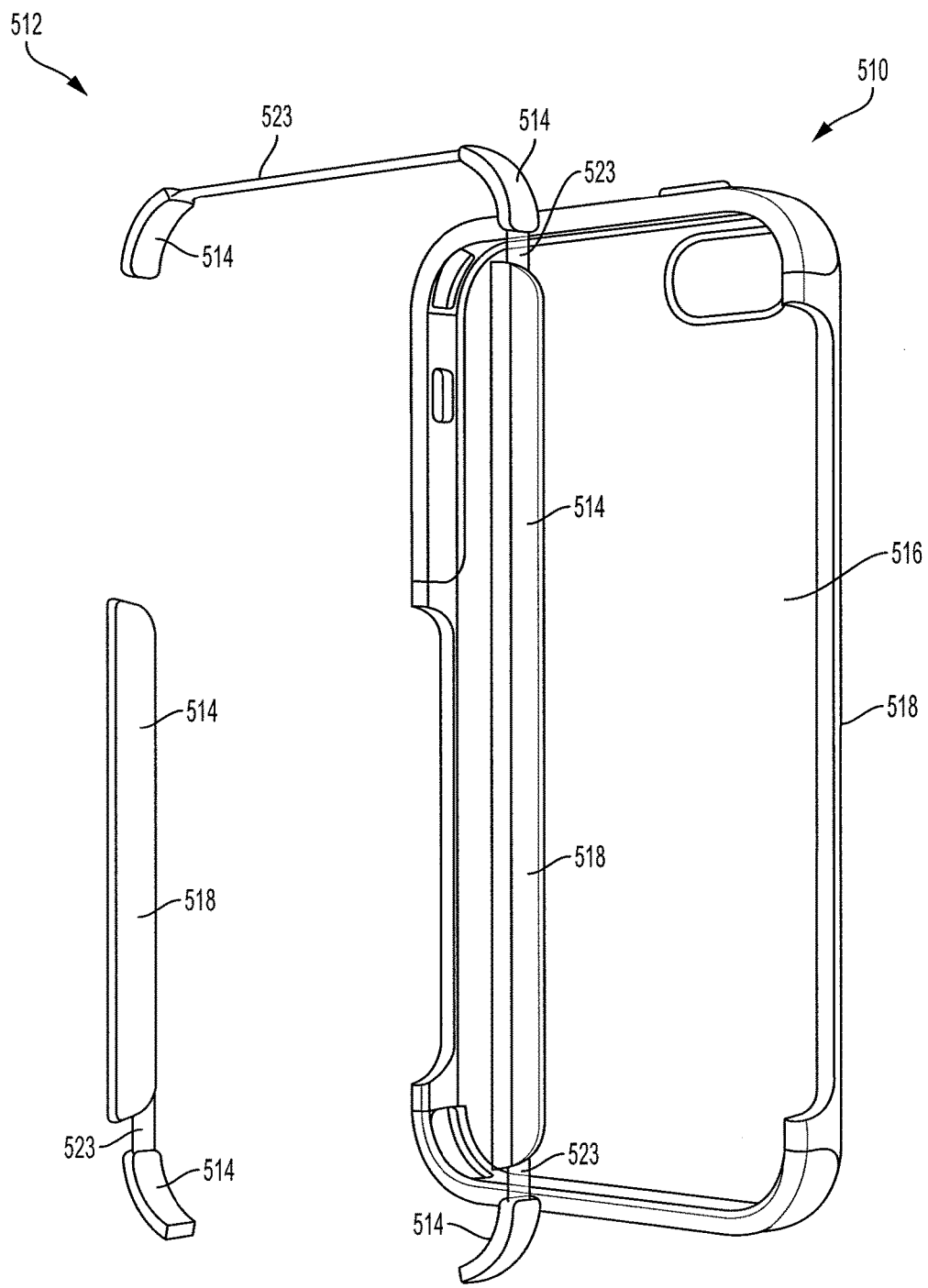
FIG. 5D illustrates a front perspective view of a case for a mobile device, according to an embodiment of the present disclosure.

FIG. 5D illustrates a front perspective view of the case 510 with the plurality of fluid chambers 514 separated from the base wall 516 and the remaining portions of the side walls 518. The fluid chambers 514 may be configured to be separably coupled to the base wall 516 and the remaining portions of the side walls 518. In one embodiment, the fluid chambers 514 may be configured to be integrally coupled to the base wall 516 and the remaining portions of the side walls 518.

As shown in FIG. 5D, fluid chambers 514 may form a multilayer structure, with the fluid chambers 514 forming an inner layer of the side walls 518 at the corners of the case 510. The fluid chamber 514 at the corners of the case 510 form an inner layer covered by an outer layer of the side walls 518. Connector portions 523 join the fluid chambers 514 to each other, yet are not configured to retain fluid. In one embodiment, the fluid chambers 514 may form an inner or outer layer that extends over all or a portion of the side walls 518.

The fluid chambers 514 may be made of a flexible material to allow these portions of the body 512 to more easily fit over the mobile device. The base wall 516 and remaining portions of the side walls 518 may be made of a more rigid material to add support to the body 512. In one embodiment, the fluid chambers 514 and the base wall 516 and remaining portions of the side walls 518 may be made of the same material, or materials having a similar degree of flexibility. In one embodiment, the fluid chambers 514 and the base wall 516 and remaining portions of the side walls 518 may be integral with one another. For example, in one embodiment, these portions of the body 512 may be dual injection molded together.

In one embodiment, the base wall 516 or portions of the side walls 518 that the fluid chamber 514 is coupled to may be made of a flexible material such as an elastomer. The fluid chamber 514 may also be made from a flexible material such as an elastomer. The elastomer may be a thermoplastic elastomer or the like. Other flexible materials or elastomers may be utilized as desired. In one embodiment, the base wall 516 or portions of the side walls 518 that the fluid chamber 514 is coupled to, or the fluid chambers 514 may be made of a more rigid material such as a rigid thermoplastic polyurethane, polycarbonate, or the like. In one embodiment, the portions of the body 512 may be made of the same material or materials having similar properties such as flexibility. In one embodiment, the portions of the body 512 may be made of different material or materials having different properties such as flexibility. In one embodiment, the portion of the side walls 518 forming the top side wall and bottom side wall may be may made of thermoplastic polyurethane, and the base wall 516 may be made of a polycarbonate.

Figure 6A:
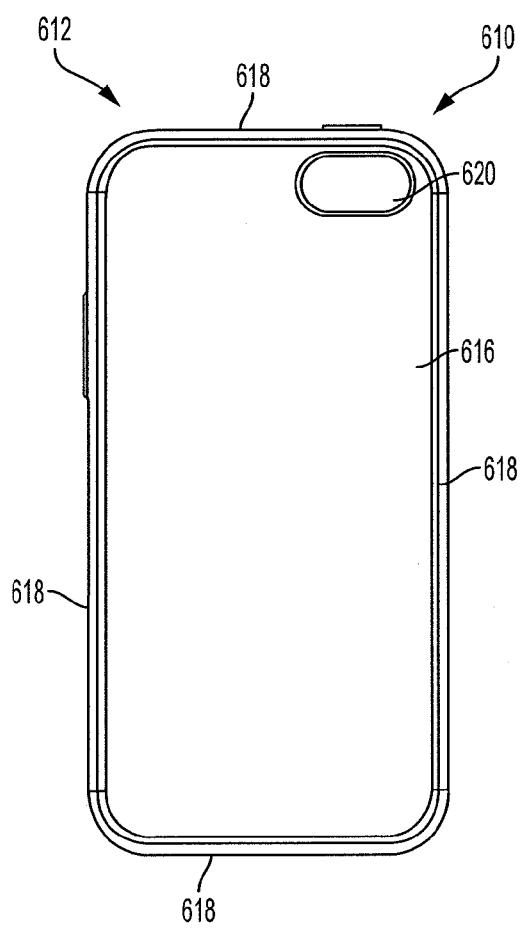
FIG. 6A illustrates a front view of a case for a mobile device, according to an embodiment of the present disclosure.

FIG. 6A illustrates an embodiment of a case 610 for a mobile device. The case 610 includes a body 612 that includes a fluid chamber 614. The fluid chamber 614 is configured to retain fluid therein and be positioned upon the mobile device when the mobile device is coupled to the body 612.

In the embodiment shown in FIG. 6A, the fluid chamber 614 is included as a portion of the side wall 618. The fluid chamber 614 is positioned in a cut out portion of the side wall 618, with the remaining portion of the side wall surrounding the fluid chamber 614. One fluid chamber 614 is on a left side wall 618 and another fluid chamber 614 is on a right side wall 618. These fluid chambers 614 are in line with the rest of the side walls 618 such that the fluid chamber 614 and side walls form a single layer structure of the side walls 618.

Figure 6B:
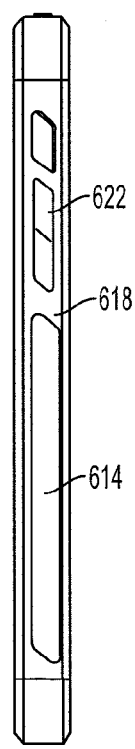
FIG. 6B illustrates a left side view of a case for a mobile device, according to an embodiment of the present disclosure.
Figure 6C:
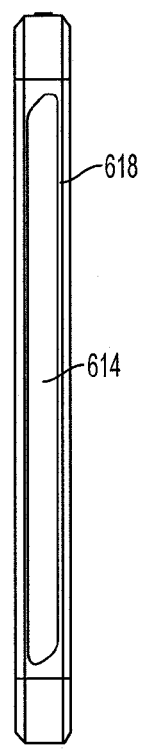
FIG. 6C illustrates a right side view of a case for a mobile device, according to an embodiment of the present disclosure.

FIG. 6B illustrates a left side view of the case. The fluid chamber 614 forms a portion of the side walls 618. FIG. 6C illustrates a right side view of the case 610. The fluid chamber 614 forms a portion of the side walls 618.

Figure 6D:
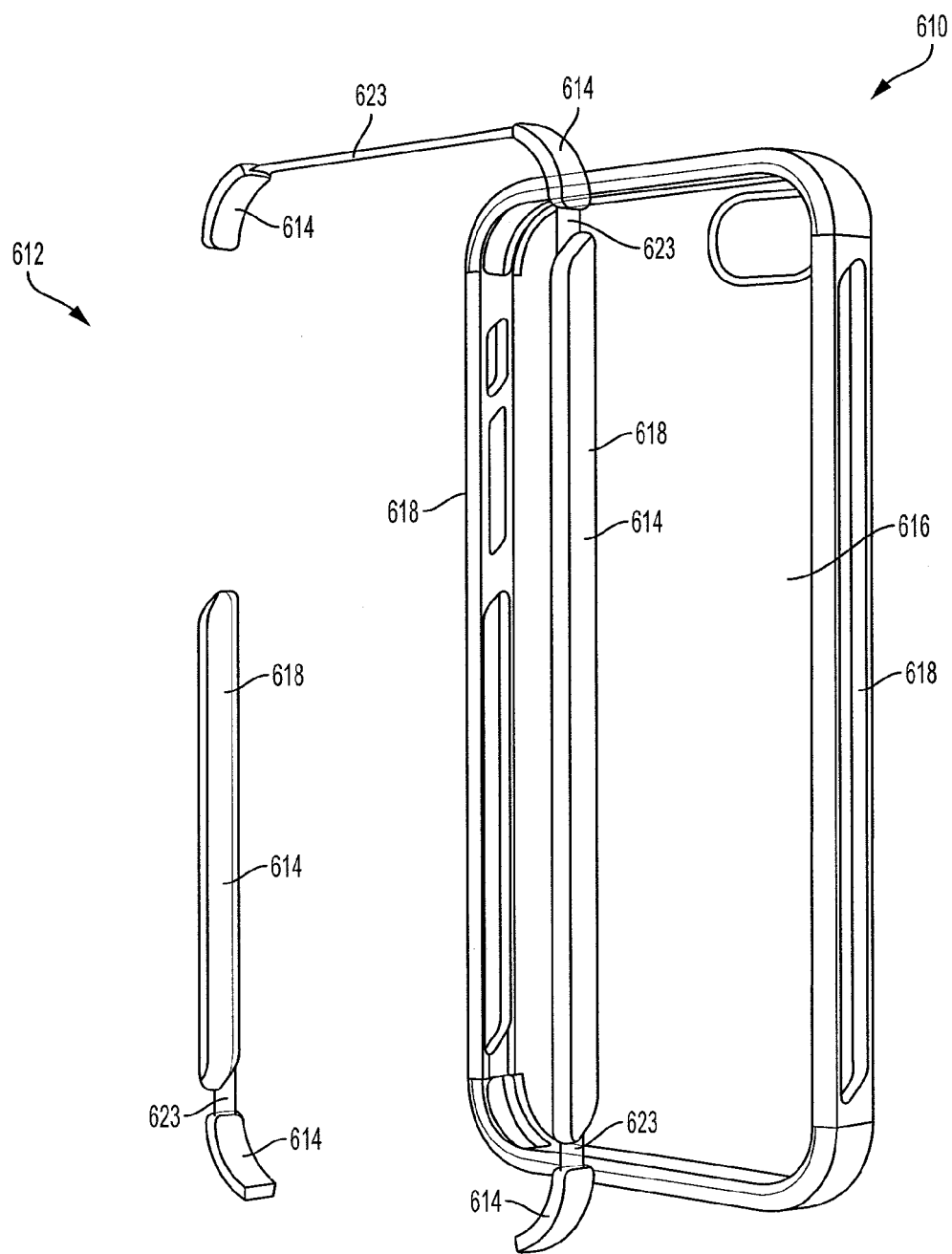
FIG. 6D illustrates a front perspective view of a case for a mobile device, according to an embodiment of the present disclosure.

FIG. 6D illustrates a front perspective view of the case 610 with the plurality of fluid chambers 614 separated from the base wall 616 and the remaining portions of the side walls 618. The fluid chambers 614 may be configured to be separably coupled to the base wall 616 and the remaining portions of the side walls 618. In one embodiment, the fluid chambers 614 may be configured to be integrally coupled to the base wall 616 and the remaining portions of the side walls 618.

As shown in FIG. 6D, fluid chambers 614 may form a multilayer structure, with the fluid chambers 614 forming an inner layer of the side walls 618 at the corners of the case 610. The fluid chamber 614 at the corners of the case 610 form an inner layer covered by an outer layer of the side walls 618. Connector portions 623 join the fluid chambers 614 to each other, yet are not configured to retain fluid. In one embodiment, the fluid chambers 614 may form an inner or outer layer that extends over all or a portion of the side walls 618.

The fluid chambers 614 may be made of a flexible material to allow these portions of the body 612 to more easily fit over the mobile device. The base wall 616 and remaining portions of the side walls 618 may be made of a more rigid material to add support to the body 612. In one embodiment, the fluid chambers 614 and the base wall 616 and remaining portions of the side walls 618 may be made of the same material, or materials having a similar degree of flexibility. In one embodiment, the fluid chambers 614 and the base wall 616 and remaining portions of the side walls 618 may be integral with one another. For example, in one embodiment, these portions of the body 612 may be dual injection molded together.

In one embodiment, the base wall 616 or portions of the side walls 618 that the fluid chamber 614 is coupled to may be made of a flexible material such as an elastomer. The fluid chamber 614 may also be made from a flexible material such as an elastomer. The elastomer may be a thermoplastic elastomer or the like. Other flexible materials or elastomers may be utilized as desired. In one embodiment, the base wall 616 or portions of the side walls 618 that the fluid chamber 614 is coupled to, or the fluid chambers 614 may be made of a more rigid material such as a rigid thermoplastic polyurethane, polycarbonate, or the like. In one embodiment, the portions of the body 612 may be made of the same material or materials having similar properties such as flexibility. In one embodiment, the portions of the body 612 may be made of different material or materials having different properties such as flexibility. In one embodiment, the portion of the side walls 618 forming the top side wall and bottom side wall may be may made of thermoplastic polyurethane, and the base wall 616 may be made of a polycarbonate.

Figure 7A:
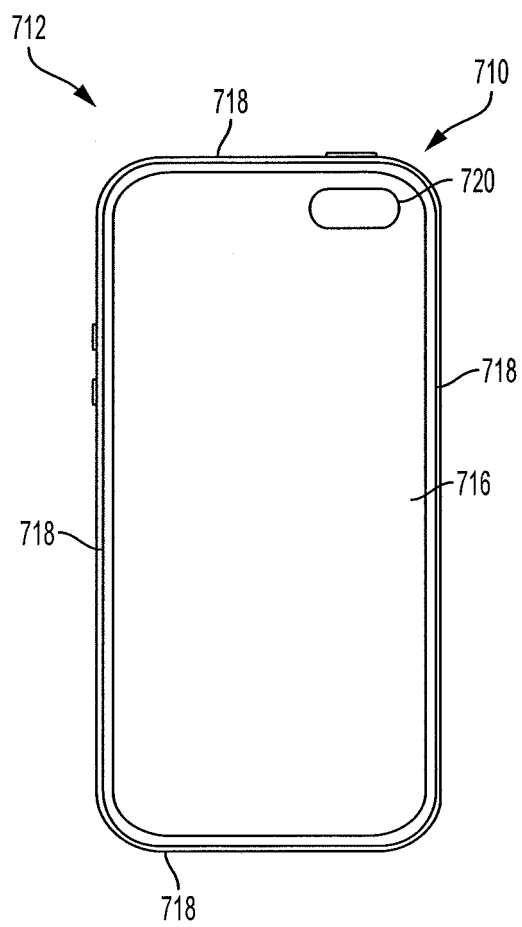
FIG. 7A illustrates a front view of a case for a mobile device, according to an embodiment of the present disclosure.

FIG. 7A illustrates an embodiment of a case 710 for a mobile device. The case 710 includes a body 712 that includes a fluid chamber 714. The fluid chamber 714 is configured to retain fluid therein and be positioned upon the mobile device when the mobile device is coupled to the body 712.

In the embodiment shown in FIG. 7A, the fluid chamber 714 is included as a portion of the side wall 718. The fluid chamber 714 forms a multilayered structure with the remaining portion of the side wall 718. The fluid chamber forms an inner layer of the side wall 718, with the remaining portion of the side wall 718 forming an outer layer of the side wall 718. An opening 728 exposes at least a portion of the fluid chamber 714. One fluid chamber 714 is on a left side wall 718 and another fluid chamber 714 is on a right side wall 718.

Figure 7B:
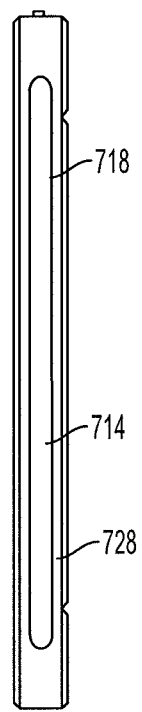
FIG. 7B illustrates a right side view of a case for a mobile device, according to an embodiment of the present disclosure.

FIG. 7B illustrates a right side view of the case 710. The fluid chamber 714 forms a portion of the side walls 718.

Figure 7C:
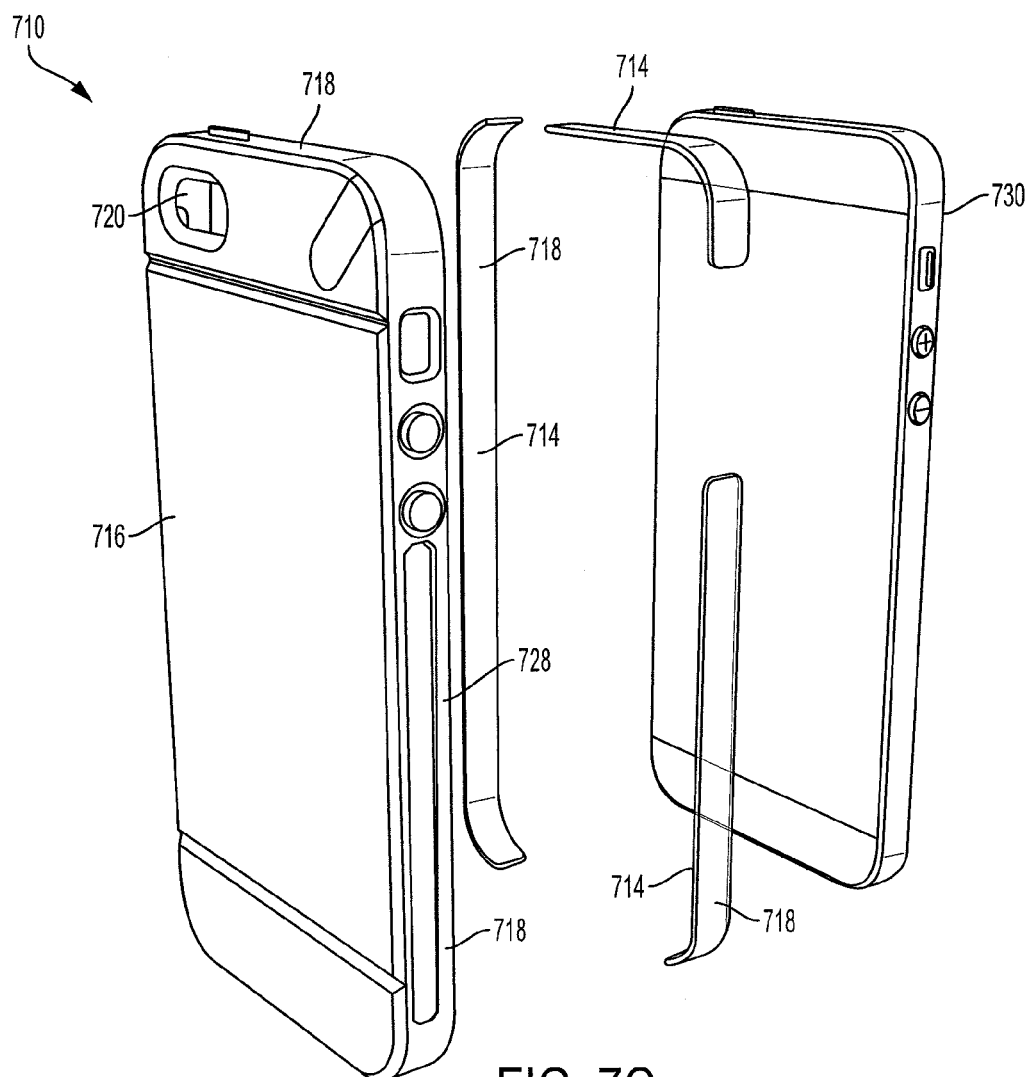
FIG. 7C illustrates a rear perspective view of a case for a mobile device, according to an embodiment of the present disclosure.

FIG. 7C illustrates a rear perspective view of the case 710 with the plurality of fluid chambers 714 separated from the base wall 716 and the remaining portions of the side walls 718. The fluid chambers 714 may be configured to be separably coupled to the base wall 716 and the remaining portions of the side walls 718. In one embodiment, the fluid chambers 714 may be configured to be integrally coupled to the base wall 716 and the remaining portions of the side walls 718.

As shown in FIG. 7C, fluid chambers 714 at the corners of the case may form a multilayer structure similar to the embodiments shown in FIGS. 5A and 6A. The fluid chambers 714 at the corners may form an inner layer of the side walls 718 covered by an outer layer of the side walls 718. In one embodiment, connector portions may join the fluid chambers 714 to each other, yet are not configured to retain fluid. In one embodiment, the fluid chambers 714 may form an inner or outer layer that extends over all or a portion of the side walls 718.

The fluid chambers 714 may be made of a flexible material to allow these portions of the body 712 to more easily fit over the mobile device. The base wall 716 and remaining portions of the side walls 718 may be made of a more rigid material to add support to the body 712. In one embodiment, the fluid chambers 714 and the base wall 716 and remaining portions of the side walls 718 may be made of the same material, or materials having a similar degree of flexibility. In one embodiment, the fluid chambers 714 and the base wall 716 and remaining portions of the side walls 718 may be integral with one another. For example, in one embodiment, these portions of the body 712 may be dual injection molded together.

In one embodiment, the base wall 716 or portions of the side walls 718 that the fluid chamber 714 is coupled to may be made of a flexible material such as an elastomer. The fluid chamber 714 may also be made from a flexible material such as an elastomer. The elastomer may be a thermoplastic elastomer or the like. Other flexible materials or elastomers may be utilized as desired. In one embodiment, the base wall 716 or portions of the side walls 718 that the fluid chamber 714 is coupled to, or the fluid chambers 714 may be made of a more rigid material such as a rigid thermoplastic polyurethane, polycarbonate, or the like. In one embodiment, the portions of the body 712 may be made of the same material or materials having similar properties such as flexibility. In one embodiment, the portions of the body 712 may be made of different material or materials having different properties such as flexibility.

FIG. 8A illustrates an embodiment of a case 810 for a mobile device. The case 810 includes a body 812 that includes a fluid chamber 814. The fluid chamber 814 is configured to retain fluid therein and be positioned upon the mobile device when the mobile device is coupled to the body 812.

In the embodiment shown in FIG. 8A, the body 812 forms a band configured to cover at least a portion of a side surface of a mobile device coupled thereto. The band includes an inner wall forming an inner layer 832 of the case 810, and a fluid chamber 814 that forms an outer layer of the case 810. The fluid chamber 814 forms at least a portion of the band. The fluid chamber 814 has a larger size at the corners of the case 810. The fluid chamber 814 at the corners forms corner cushions for the case 810. The fluid chamber 814 forms a bumper that is configured to be positioned on at least a portion of a side surface of the mobile device. The fluid chamber 814 extends around the inner layer 832. In the embodiment shown in FIG. 8A the fluid chamber 814 is configured to extend around the entirety of the mobile device. In one embodiment, the fluid chamber 814 may extend over only a portion of the side surface of the mobile device.

The case 810 includes an opening 834 that the mobile device extends through. The opening 834 is defined by the band. FIG. 8B illustrates a right side view of the case 810. FIG. 8C illustrates a bottom view of the case 810. FIG. 8D illustrates a top view of the case 810.

Figure 8E:
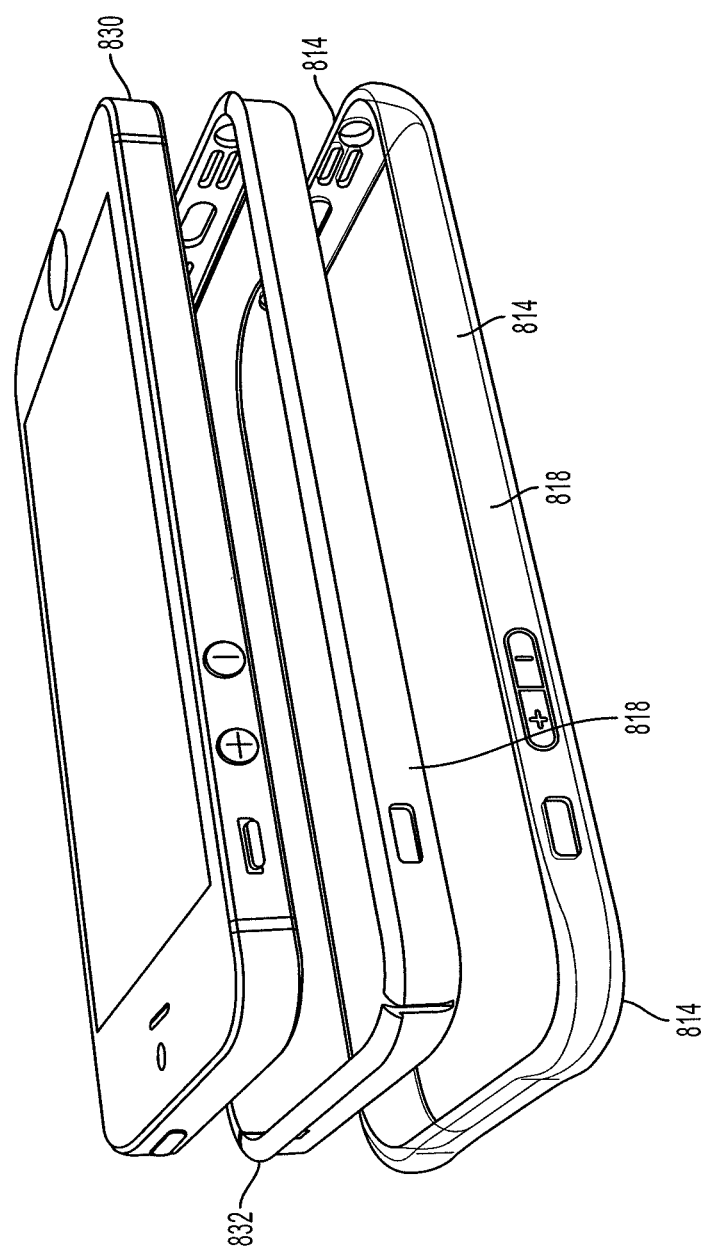
FIG. 8E illustrates a front perspective view of a case for a mobile device, according to an embodiment of the present disclosure.

FIG. 8E illustrates the inner layer 832 separate from the fluid chamber 814. The inner layer 832 may be separably coupled to the fluid chamber 814. In one embodiment, the inner layer may be integrally coupled to the fluid chamber 814.

FIG. 8F illustrates a front view of the inner wall that forms the inner layer 832. Cut out slots at the corners of the inner layer 832 may allow the mobile device to be snapped to the inner layer 832 more easily. FIG. 8G illustrates a right side view of the inner layer 832. FIG. 8H illustrates a bottom view of the inner layer 832. FIG. 8I illustrates a top view of the inner layer 832.

The fluid chamber 814 may be made of a flexible material to allow these portions of the body 812 to more easily fit over the mobile device. The inner layer 832 may be made of a more rigid material to add support to the body 812. In one embodiment, the fluid chamber 814 and the inner layer 832 may be made of the same material, or materials having a similar degree of flexibility. In one embodiment, the fluid chamber 814 and the inner layer 832 may be integral with one another. For example, in one embodiment, these portions of the body 812 may be dual injection molded together.

In one embodiment, the fluid chamber 814 and the inner layer 832 may be made of a flexible material such as an elastomer. The fluid chamber 814 may also be made from a flexible material such as an elastomer. The elastomer may be a thermoplastic elastomer or the like. Other flexible materials or elastomers may be utilized as desired. In one embodiment, the fluid chamber 814 and the inner layer 832 may be made of a more rigid material such as a rigid thermoplastic polyurethane, polycarbonate, or the like. In one embodiment, the portions of the body 812 may be made of the same material or materials having similar properties such as flexibility. In one embodiment, the portions of the body 812 may be made of different material or materials having different properties such as flexibility.

Figure 9A:
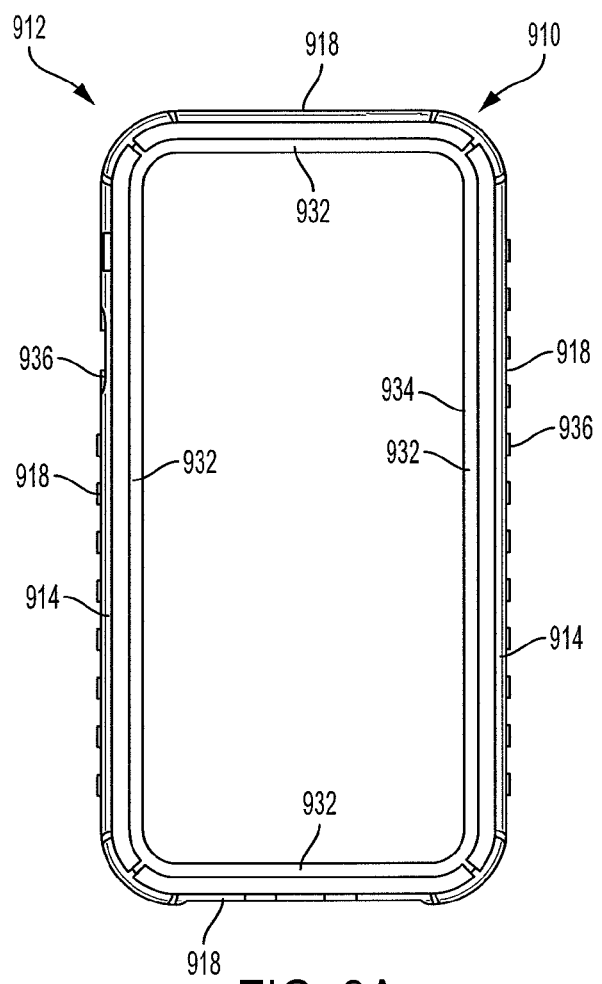
FIG. 9A illustrates a front view of a case for a mobile device, according to an embodiment of the present disclosure.

FIG. 9A illustrates an embodiment of a case 910 for a mobile device. The case 910 includes a body 912 that includes a fluid chamber 914. The fluid chamber 914 is configured to retain fluid therein and be positioned upon the mobile device when the mobile device is coupled to the body 912.

In the embodiment shown in FIG. 9A, the body 912 forms a band configured to cover at least a portion of a side surface of a mobile device coupled thereto. The band includes an inner wall forming an inner layer 932 of the case 910, and a fluid chamber 914 that forms an outer layer of the case 910. The fluid chamber 914 forms at least a portion of the band. The fluid chamber 914 is shaped to form a grip structure 936 on the fluid chamber 914, in the form of a plurality of raised portions for a user's hand to grip. The fluid chamber 914 has a larger size at the corners of the case 910. The fluid chamber 914 extends around the inner layer 932. The fluid chamber 914 at the corners forms corner cushions for the case 910. The fluid chamber 914 forms a bumper that is configured to be positioned on at least a portion of a side surface of the mobile device. In the embodiment shown in FIG. 9A the fluid chamber 914 is configured to extend around the entirety of the mobile device. In one embodiment, the fluid chamber 914 may extend over only a portion of the side surface of the mobile device.

Figure 9B:
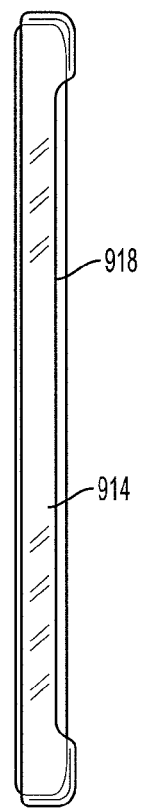
FIG. 9B illustrates a right side view of a case for a mobile device, according to an embodiment of the present disclosure.
Figure 9C:
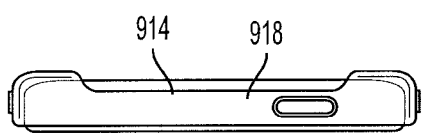
FIG. 9C illustrates a top view of a case for a mobile device, according to an embodiment of the present disclosure.

The case 910 includes an opening 934 that the mobile device extends through. The opening 934 is defined by the band. FIG. 9B illustrates a right side view of the case 910. FIG. 9C illustrates a top view of the case 810.

Figure 9D:
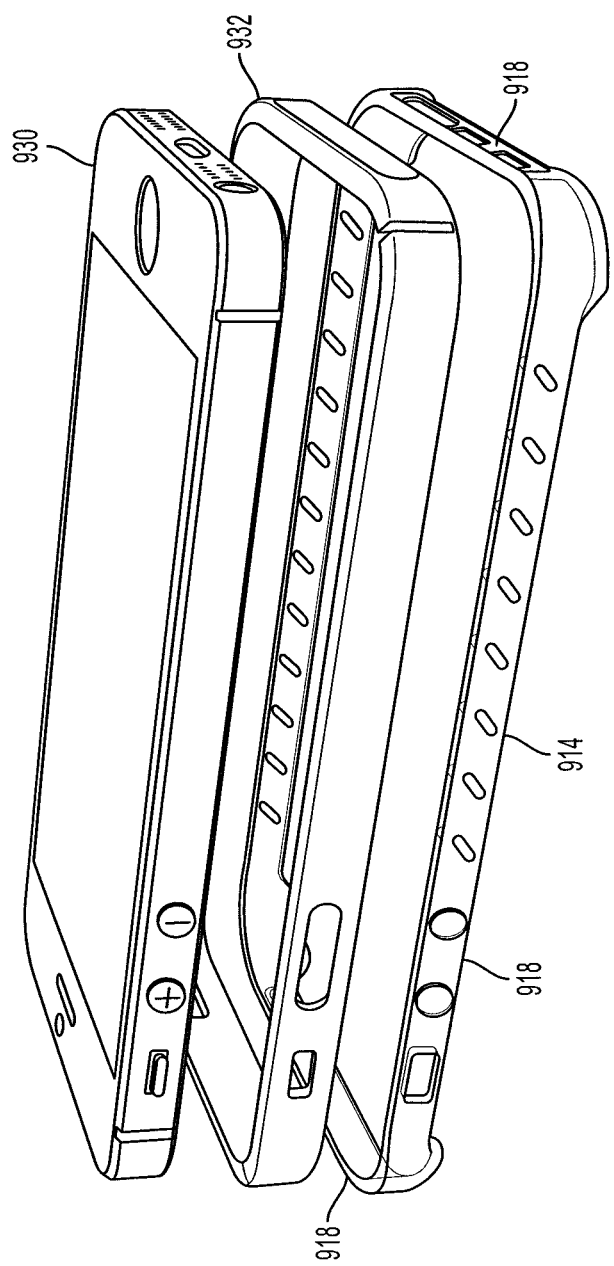
FIG. 9D illustrates a front perspective view of a case for a mobile device, according to an embodiment of the present disclosure.

FIG. 9D illustrates the inner layer 932 separate from the fluid chamber 914. The inner layer 932 may be separably coupled to the fluid chamber 914. In one embodiment, the inner layer may be integrally coupled to the fluid chamber 914.

The fluid chamber 914 may be made of a flexible material to allow these portions of the body 912 to more easily fit over the mobile device. The inner layer 932 may be made of a more rigid material to add support to the body 912. In one embodiment, the fluid chamber 914 and the inner layer 932 may be made of the same material, or materials having a similar degree of flexibility. In one embodiment, the fluid chamber 914 and the inner layer 932 may be integral with one another. For example, in one embodiment, these portions of the body 912 may be dual injection molded together.

In one embodiment, the fluid chamber 914 and the inner layer 932 may be made of a flexible material such as an elastomer. The fluid chamber 914 may also be made from a flexible material such as an elastomer. The elastomer may be a thermoplastic elastomer or the like. Other flexible materials or elastomers may be utilized as desired. In one embodiment, the fluid chamber 914 and the inner layer 932 may be made of a more rigid material such as a rigid thermoplastic polyurethane, polycarbonate, or the like. In one embodiment, the portions of the body 912 may be made of the same material or materials having similar properties such as flexibility. In one embodiment, the portions of the body 912 may be made of different material or materials having different properties such as flexibility.

Figure 10A:
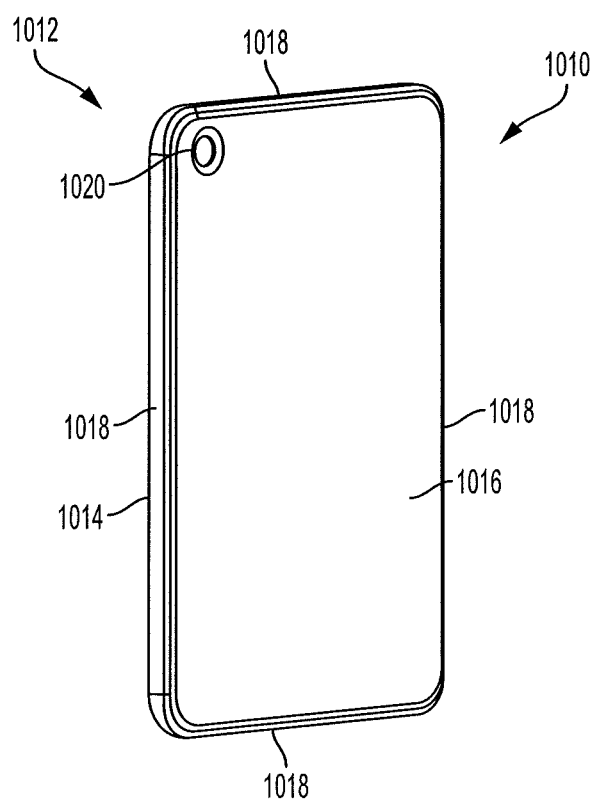
FIG. 10A illustrates a rear perspective view of a case for a mobile device, according to an embodiment of the present disclosure.

FIG. 10A illustrates an embodiment of a case 1010 for a mobile device. The case 1010 includes a body 1012 that includes a fluid chamber 1014. The fluid chamber 1014 is configured to retain fluid therein and be positioned upon the mobile device when the mobile device is coupled to the body 1012.

Figure 10B:
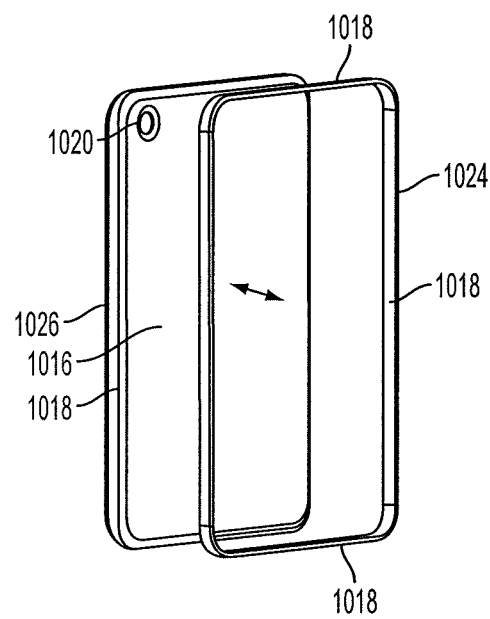
FIG. 10B illustrates a rear perspective view of a case for a mobile device, according to an embodiment of the present disclosure.

In the embodiment shown in FIG. 10A, the fluid chamber 1014 is included in the outer layer of the side walls 1018. The outer layer forms a bumper 1024 that is separable from the base wall 1016. The bumper 1024 separated from the base wall 1016 is shown in FIG. 10B. The bumper 1024 may form a band that extends over the inner layer of the side walls 1018 shown in FIG. 10B. In one embodiment, the bumper 1024 may extend over only a portion of the inner layer of the side walls 1018.

In one embodiment, a plurality of fluid chambers 1014 may be included in the bumper 1024. The plurality of fluid chambers 1014 may be either in fluid communication with each other or in fluid isolation from each other. In one embodiment, the plurality of fluid chambers 1014 may be included in the bumper 1024 and/or the base wall 1016 and/or a remaining portion of the side walls 1018, which may include all of the side walls.

The base wall 1016 and the inner layer of the side walls 1018 may be made of a flexible material to allow these portions of the body 1012 to more easily fit over the mobile device. The bumper 1024 may be made of a more rigid material to add support to the body 1012. In one embodiment, the base wall 1016 and the inner layer of the side walls 1018, and the bumper 1024, may be made of the same material, or materials having a similar degree of flexibility. In one embodiment, the base wall 1016 and the inner layer of the side walls 1018, and the bumper 1024 may be integral with one another. For example, in one embodiment, these portions of the body 1012 may be dual injection molded together.

FIG. 10B displays the movement of the bumper 1024 to be placed upon or withdrawn from the base wall 1016 and the inner layer of the side walls 1018. The base wall 1016 and the inner layer of the side walls 1018 may be coupled to the mobile device first and then the bumper 1024 may be added afterwards. A lip 1026 extending from the edge of the side wall 1018 may impede the movement of the bumper 1024 as it is added. The body 1012 is removed from the mobile device in a reverse operation.

In one embodiment, the base wall 1016 or inner layer of the side walls 1018 that the fluid chamber 1014 is positioned upon may be made of a flexible material such as an elastomer. The fluid chamber 1014 may also be made from a flexible material such as an elastomer. The elastomer may be a thermoplastic elastomer or the like. Other flexible materials or elastomers may be utilized as desired. In one embodiment, the base wall 1016 or inner layer of the side walls 1018 that the fluid chamber 1014 is positioned upon, or the fluid chamber 1014 may be made of a more rigid material such as a rigid thermoplastic polyurethane, polycarbonate, or the like. In one embodiment, the portions of the body 1012 may be made of the same material or materials having similar properties such as flexibility. In one embodiment, the portions of the body 1012 may be made of different material or materials having different properties such as flexibility.

FIG. 11A illustrates an embodiment of a case 1110 for a mobile device. The case 1110 includes a body 1112 that includes a fluid chamber 1114. The fluid chamber 1114 is configured to retain fluid therein and be positioned upon the mobile device when the mobile device is coupled to the body 1112.

In the embodiment shown in FIG. 11A, the fluid chamber 1114 forms a portion of the base wall and the side walls 1118. A bumper 1124 extends around the fluid chamber 1114 at the side walls 1118. The bumper 1124 forms an outer layer of the side walls 1118 and the fluid chamber 1114 forms an inner layer of the side walls 1118. The bumper 1124 forms a band that extends over the inner layer of the side walls 1118. In one embodiment, the fluid chamber 1114 may form a portion of the base wall 1116 or the side walls 1118.

FIG. 11B illustrates a right side view of the case 1110.

Figure 11C:
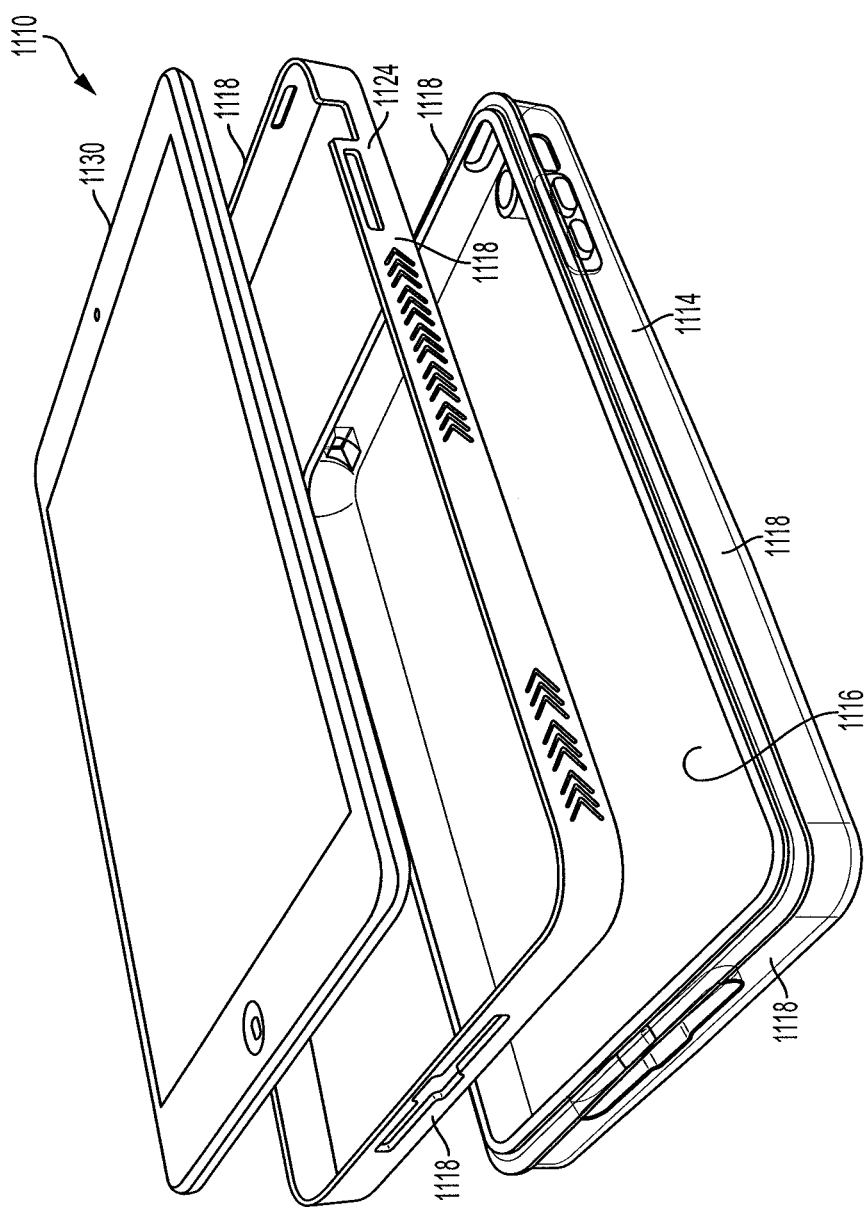
FIG. 11C illustrates a front perspective view of a case for a mobile device, according to an embodiment of the present disclosure.

FIG. 11C illustrates a front perspective view of the case 1110 with the bumper 1124 separated from the base wall 1116 and the remaining portions of the side walls 1118.

The fluid chamber 1114 may be made of a flexible material to allow these portions of the body 1112 to more easily fit over the mobile device. The bumper 1124 may be made of a more rigid material to add support to the body 1112. In one embodiment, the fluid chamber 1114 and the bumper 1124 may be made of the same material, or materials having a similar degree of flexibility. In one embodiment, the fluid chamber 1114 and the bumper 1124 may be integral with one another. For example, in one embodiment, these portions of the body 1112 may be dual injection molded together.

In one embodiment, the fluid chamber 1114 and the bumper 1124 may be made of a flexible material such as an elastomer. The fluid chamber 1114 may also be made from a flexible material such as an elastomer. The elastomer may be a thermoplastic elastomer or the like. Other flexible materials or elastomers may be utilized as desired. In one embodiment, the fluid chamber 1114 and the bumper 1124 may be made of a more rigid material such as a rigid thermoplastic polyurethane, polycarbonate, or the like. In one embodiment, the portions of the body 1112 may be made of the same material or materials having similar properties such as flexibility. In one embodiment, the portions of the body 1112 may be made of different material or materials having different properties such as flexibility.

FIG. 12A illustrates an embodiment of a case 1210 for a mobile device. The case 1210 includes a body 1212 that includes a fluid chamber 1214. The fluid chamber 1214 (marked in FIG. 12B) is configured to retain fluid therein and be positioned upon the mobile device when the mobile device is coupled to the body 1212.

The embodiment shown in FIG. 12A is similar to the embodiment shown in FIG. 11A, yet the embodiment shown in FIG. 12A includes a cover 1238 that extends over the fluid chamber 1214 and under the bumper 1224. The cover 1238 forms an intermediate layer of the side walls 1218, with the fluid chamber 1214 forming an inner layer and the bumper 1224 forming an outer layer of the side walls 1218. The cover 1238 covers the entirety of the fluid chamber 1214. In one embodiment, the cover 1238 may cover only a portion of the fluid chamber 1214 or may cover only a portion of the mobile device 1230.

FIG. 12B illustrates a front perspective view of the case 1210 with the cover 1238 separate from the fluid chamber 1214 and the bumper 1224. The fluid chamber 1214, bumper 1224 and cover 1238 may be separably coupled to each other.

FIG. 12C illustrates a front perspective view of the case 1210.

The fluid chamber 1214 and cover 1238 may be made of a flexible material to allow these portions of the body 1212 to more easily fit over the mobile device. The bumper 1224 may be made of a more rigid material to add support to the body 1212. In one embodiment, the fluid chamber 1214, cover 1238 and the bumper 1224 may be made of the same material, or materials having a similar degree of flexibility. In one embodiment, the fluid chamber 1214, cover 1238, and the bumper 1224 may be integral with one another. For example, in one embodiment, these portions of the body 1212 may be dual injection molded together.

In one embodiment, the fluid chamber 1214, the cover 1238, and the bumper 1224 may be made of a flexible material such as an elastomer. The fluid chamber 1214 may also be made from a flexible material such as an elastomer. The elastomer may be a thermoplastic elastomer or the like. Other flexible materials or elastomers may be utilized as desired. In one embodiment, the fluid chamber 1214, the cover 1238, and the bumper 1224 may be made of a more rigid material such as a rigid thermoplastic polyurethane, polycarbonate, or the like. In one embodiment, the portions of the body 1212 may be made of the same material or materials having similar properties such as flexibility. In one embodiment, the portions of the body 1212 may be made of different material or materials having different properties such as flexibility.

Figure 13A:
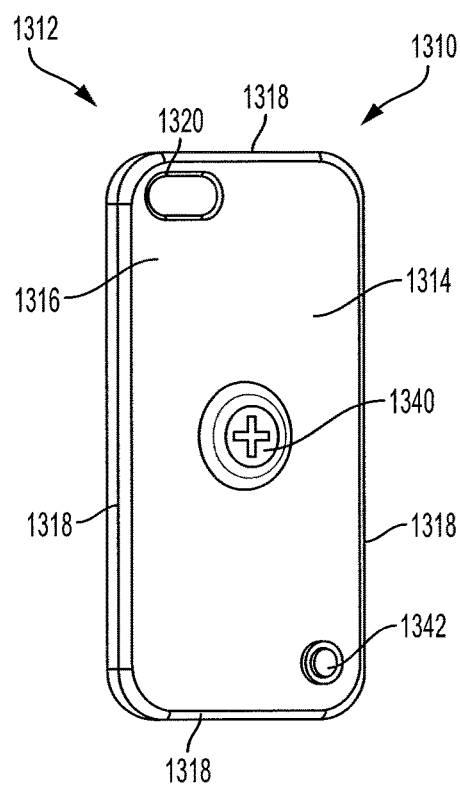
FIG. 13A illustrates a rear perspective view of a case for a mobile device, according to an embodiment of the present disclosure.

FIG. 13A illustrates an embodiment of a case 1310 for a mobile device. The case 1310 includes a body 1312 that includes a fluid chamber 1314. The fluid chamber 1314 is configured to retain fluid therein and be positioned upon the mobile device when the mobile device is coupled to the body 1312.

In the embodiment shown in FIG. 13A, the fluid chamber 1314 forms a portion of the base wall 1316 and the side wall 1318. The body 1312 includes a pump 1340 configured to provide fluid to or withdraw fluid from the fluid chamber 1314 when activated.

The pump 1340 as shown in FIG. 13A includes a bladder that is pressed by a user to provide fluid to the fluid chamber 1314. The pump 1340 may draw fluid from outside of the fluid chamber 1314 and case 1310 to be provided to the fluid chamber 1314. In an embodiment in which the fluid is air, the pump 1340 may draw air from outside of the case 1310. The pump 1340 may include a valve that opens to allow fluid to enter the fluid chamber 1314 upon activation of the pump 1340. The valve may form a fluid tight seal of the fluid chamber 1314 when the valve is closed. In the embodiment shown in FIG. 13A, the bladder of the pump 1340 may protrude from the outer surface of the base wall 1316. The protrusion may be more easily pressed by a user to provide fluid to the fluid chamber 1314. The pump 1340 may be positioned centrally on the base wall 1316 as shown in FIG. 13A. In one embodiment, the pump 1340 may be positioned on any part of the body 1312, for example on one of the side walls 1318 or a corner of the base wall 1316.

In one embodiment, the pump 1340 may include a different device than a bladder to be pressed. The pump 1340 may include a push button, a plunger, a rotary device, a diaphragm, or other device that operates as a pump. In one embodiment, the pump 1340 may be a fluid chamber 1314 configured to vary in size by being pressed, to draw fluid to or from a valve.

The body 1312 may include a release valve 1342 that is configured to allow fluid to be released from the fluid chamber 1314 when activated. The release valve 1342 may be positioned on the fluid chamber 1314. In one embodiment, the release valve 1342 may be positioned in a different location on the body 1312. The release valve 1342 may include a button that is pressed to open the release valve 1342. In one embodiment, the release valve 1342 may have a different structure than shown in FIG. 13A, for example, a plunger, pull tab, or other device for releasing fluid from a fluid chamber may be used.

The fluid chamber 1314 may be defined by the side walls of the base wall 1316 or may include a separate chamber positioned between the side walls. The fluid chamber 1314 may be configured to increase in size, or inflate, as fluid is provided to the fluid chamber 1314 from the pump 1340. In an embodiment in which the fluid chamber 1314 is configured to increase in size when the fluid chamber 1314 is provided with fluid, the fluid chamber 1314 may include flexible side walls. The flexible side walls may flex or have a shape that varies as fluid is provided to or withdrawn from the fluid chamber 1314.

The pump 1340 may be configured to provide fluid to or withdraw fluid from a single fluid chamber 1314 or a plurality of fluid chambers 1314. In one embodiment, a single fluid chamber 1314 may be included in the base wall 1316 or at least one of the plurality of side walls 1318, which may include all of the side walls 1318. In one embodiment, a plurality of fluid chambers 1314 may be included in the base wall 1316 or at least one of the plurality of side walls 1318, which may include all of the side walls 1318. In one embodiment, multiple pumps 1340 or release valves 1342 may be used in combination with a single fluid chamber 1314 or multiple fluid chambers 1314.

Figure 13B:
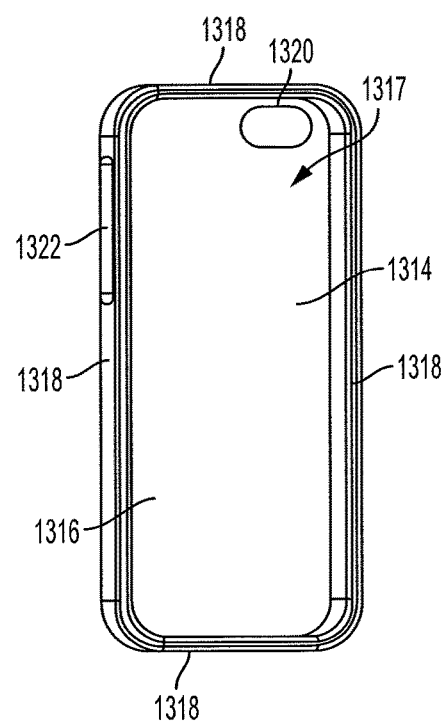
FIG. 13B illustrates a front perspective view of a case for a mobile device, according to an embodiment of the present disclosure.

FIG. 13B illustrates a front perspective view of the case 1310. The recess 1317 is configured to receive the mobile device.

The pump 1340 may be activated after the mobile device has been coupled to the body 1312 or before. In an embodiment in which the pump 1340 is activated after the mobile device has been coupled to the body 1312, the unpumped body 1312 may be more flexible prior to being coupled to the mobile device. The more flexible body 1312 may be more easily coupled to the mobile device. The fluid chamber 1314 may then be provided with fluid, which may increase the stiffness of the body 1312 and increase the ability of the body 1312 to cushion the mobile device.

The fluid chamber 1314 and remaining portions of the body 1312 may be made of a flexible material to allow the body 1312 to more easily fit over the mobile device. In one embodiment, the fluid chamber 1314 and remaining portions of the body 1312 may be made of a more rigid material. In one embodiment, the fluid chamber 1314 and remaining portions of the body 1312 may be made of a different material, or materials having a different degree of flexibility.

In one embodiment, the fluid chamber 1314 and remaining portions of the body 1312 may be made of a flexible material such as an elastomer. The elastomer may be a thermoplastic elastomer or the like. Other flexible materials or elastomers may be utilized as desired. In one embodiment, the fluid chamber 1314 and remaining portions of the body 1312 may be made of a more rigid material such as a rigid thermoplastic polyurethane, polycarbonate, or the like.

Figure 14B:
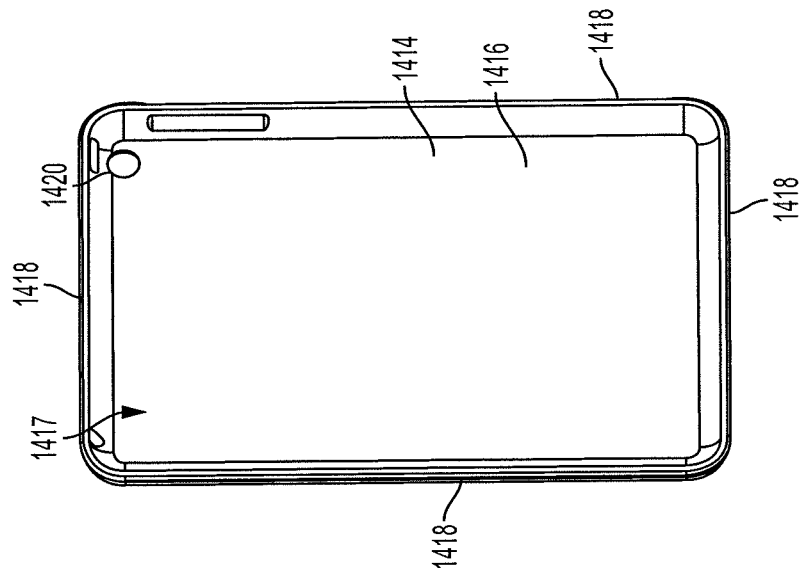
FIG. 14B illustrates a front perspective view of a case for a mobile device, according to an embodiment of the present disclosure.
Figure 14A:
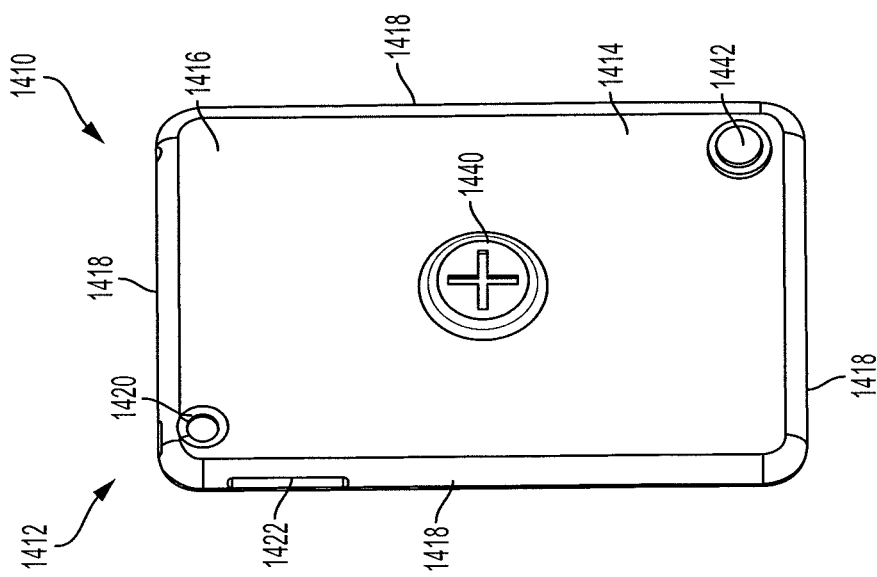
FIG. 14A illustrates a rear perspective view of a case for a mobile device, according to an embodiment of the present disclosure.

FIG. 14A illustrates an embodiment of a case 1410 for a mobile device. The case 1410 includes a body 1412 that includes a fluid chamber 1414. The fluid chamber 1414 is configured to retain fluid therein and be positioned upon the mobile device when the mobile device is coupled to the body 1412.

The embodiment shown in FIGS. 14A-14B is similar to the embodiment shown in FIGS. 13A-13B. The dimensions, however, of the case 1410 vary as it may be sized for a larger mobile device than the embodiment shown in FIGS. 13A-13B.

The dimensions of the case 1310 shown in FIGS. 13A-13B, for example, may have dimensions of between about 6 and 4 inches in length, and have a width of between about 3 and 2 inches. The case 1310 preferably has a length between about 5 and 4.5 inches in length, and a width of between about 2.5 and 2 inches. In one embodiment, the dimensions of the case 1310 may be varied as desired. Any of the embodiments of cases shown or discussed in this application may be sized in the manner discussed in regard to the case 1310.

The embodiment shown in FIGS. 14A-14B, for example, may be configured to couple to a "tablet" style mobile device. The case 1410 may have dimensions of between about 10 and 7 inches in length, and have a width of between about 8 and 5 inches. The case 1410 preferably has a length between about 9.5 and 7.5 inches, and a width of between about 7.5 and 5 inches. In one embodiment, the dimensions of the case 1410 may be varied as desired. Any of the embodiments of cases shown or discussed in this application may be sized in the manner discussed in regard to the case 1410.

Figure 15C:
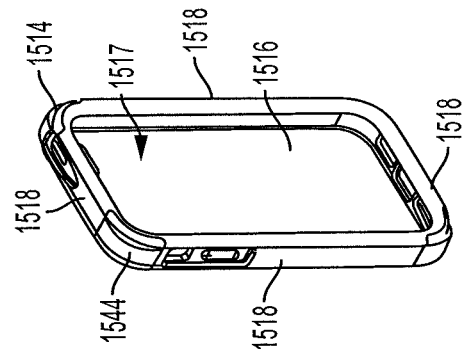
FIG. 15C illustrates a front perspective view of a case for a mobile device, according to an embodiment of the present disclosure.
Figure 15B:
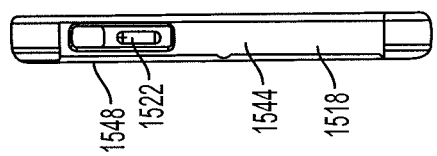
FIG. 15B illustrates a left side view of a case for a mobile device, according to an embodiment of the present disclosure.
Figure 15A:
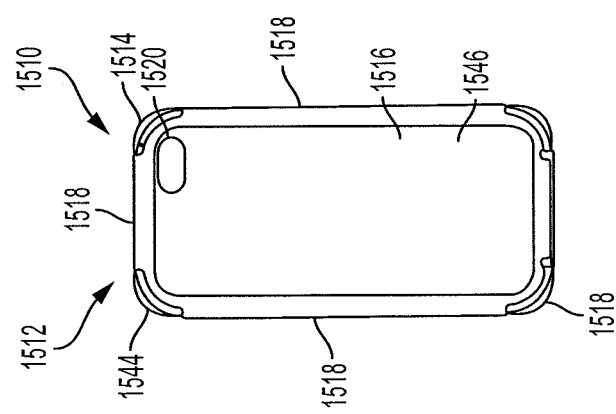
FIG. 15A illustrates a front view of a case for a mobile device, according to an embodiment of the present disclosure.

FIG. 15A illustrates an embodiment of a case 1510 for a mobile device. The case 1510 includes a body 1512 that includes a fluid chamber 1514. The fluid chamber 1514 is configured to retain fluid therein and be positioned upon the mobile device when the mobile device is coupled to the body 1512. The fluid chamber 1514 is configured to retain fluid therein and be positioned upon the mobile device when the mobile device is coupled to the body 1512. The fluid within the fluid chambers 1514 may have less density than water to allow the case 1510 to float.

Figure 15D:
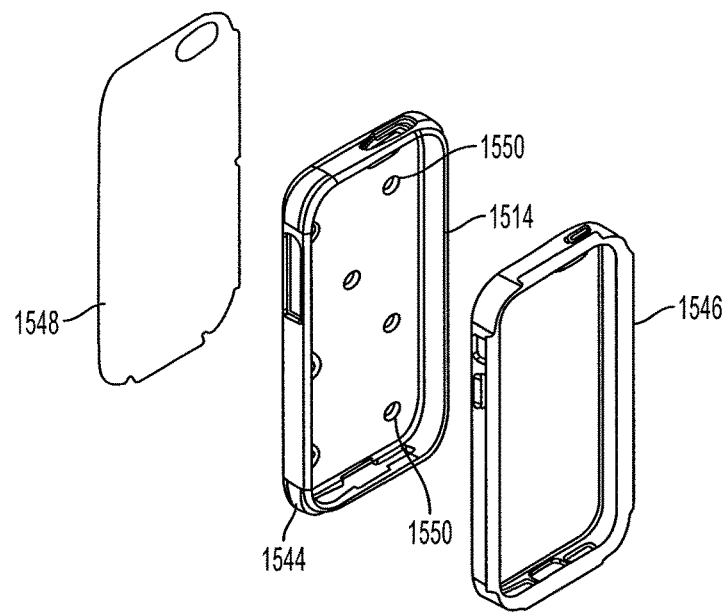
FIG. 15D illustrates a front perspective view of a case for a mobile device, according to an embodiment of the present disclosure.
Figure 15E:
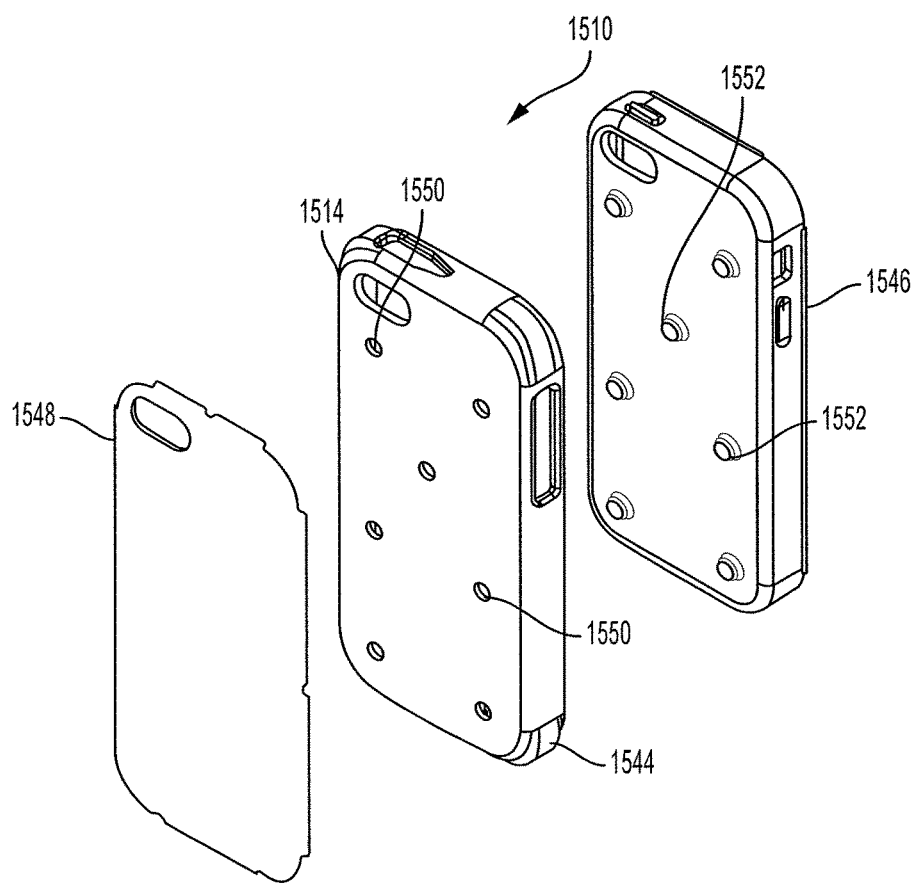
FIG. 15E illustrates a rear perspective view of a case for a mobile device, according to an embodiment of the present disclosure.

In the embodiment shown in FIG. 15A, the fluid chamber 1514 forms an intermediate layer 1544 positioned between an inner layer 1546 and an outer layer 1548 of the body 1512 (marked in FIGS. 15D and 15E). The intermediate layer 1544 forms an intermediate layer of the base wall 1516. In one embodiment, the fluid chamber 1514 may form an intermediate layer of only a portion of the base wall 1516 or only a portion of all of the side walls 1518.

The fluid chamber 1514 may be positioned on at least one of the four corners of the body 1512. The fluid chamber 1514 at the corners are exposed by the inner layer 1546 and the outer layer 1548.

FIG. 15B illustrates a left side view of the case 1510. FIG. 15C illustrates a front perspective view of the case 1510.

FIG. 15D illustrates a front perspective view of the case with the inner layer 1546 separate from the intermediate layer 1544 and the outer layer 1548. The inner layer 1546 may include substantially flattened surfaces that form a portion of the base wall 1516 and side walls 1518 and are configured to face towards the mobile device. The intermediate layer 1544 may include substantially flattened surfaces that extend over the inner layer 1546. Portions of the intermediate layer 1544 may extend into cutouts of the inner layer 1546 at the corners of the inner layer 1546. The intermediate layer 1544 may include openings 1550 to allow portions of the inner layer 1546 to pass therethrough. The outer layer 1548 may include a substantially flattened surface that covers the portion of the intermediate layer 1544 forming the base wall 1516 and that is configured to face opposite an interior surface of the inner layer 1544 that faces the mobile device. The outer layer 1548 may join to the inner layer 1546 by being coupled to the inner layer 1546.

FIG. 15E illustrates a rear perspective view of the case 1510 with the inner layer 1546 separate from the intermediate layer 1544 and the outer layer 1548. The inner layer 1546 may include protrusions 1552 configured to extend through openings 1550 of the intermediate layer 1544 to couple to the outer layer 1548. The protrusions 1552 may couple to the outer layer 1548 through use of an adhesive or a mechanical attachment or other coupling method. The inner layer 1546, intermediate layer 1544 and the outer layer 1548 may be separably coupled to one another. In one embodiment, the inner layer 1546, intermediate layer 1544 and the outer layer 1548 may be integrally coupled to one another.

The intermediate layer 1544 may be made of a flexible material to allow these portions of the body 1512 to more easily fit over the mobile device. The inner layer 1546 and outer layer 1548 may be made of a more rigid material to add support to the body 1512. In one embodiment, the intermediate layer 1544, inner layer 1546 and outer layer 1548 may be made of the same material, or materials having a similar degree of flexibility. In one embodiment, the intermediate layer 1544, inner layer 1546 and outer layer 1548 may be integral with one another. For example, in one embodiment, these portions of the body 1512 may be dual injection molded together.

In one embodiment, the intermediate layer 1544, inner layer 1546 and outer layer 1548 may be made of a flexible material such as an elastomer. The fluid chamber 1514 may also be made from a flexible material such as an elastomer. The elastomer may be a thermoplastic elastomer or the like. Other flexible materials or elastomers may be utilized as desired. In one embodiment, the intermediate layer 1544, inner layer 1546 and outer layer 1548 may be made of a more rigid material such as a rigid thermoplastic polyurethane, polycarbonate, or the like. In one embodiment, the portions of the body 1512 may be made of the same material or materials having similar properties such as flexibility. In one embodiment, the portions of the body 1512 may be made of different material or materials having different properties such as flexibility.

Figure 16A:
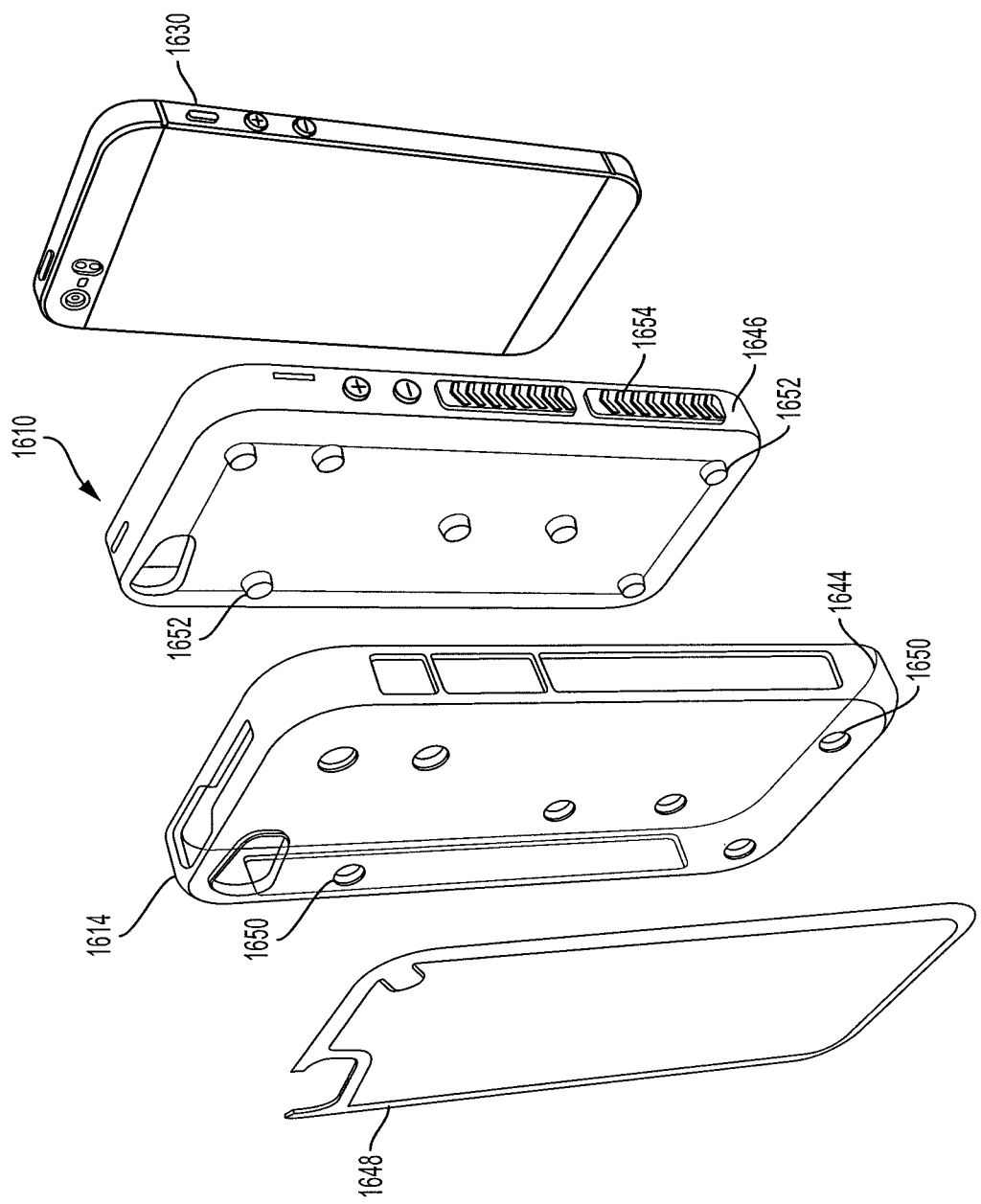
FIG. 16A illustrates a rear perspective view of a case for a mobile device, according to an embodiment of the present disclosure.

FIG. 16A illustrates an embodiment of a case 1610 for a mobile device. The case 1610 includes a body 1612 that includes a fluid chamber 1614. The fluid chamber 1614 is configured to retain fluid therein and be positioned upon the mobile device when the mobile device is coupled to the body 1612.

In the embodiment shown in FIG. 16A, the fluid chamber 1614 forms an intermediate layer 1644 positioned between an inner layer 1646 and an outer layer 1648 of the body 1612. The intermediate layer 1644 forms an intermediate layer of the base wall 1616. In one embodiment, the fluid chamber 1614 may form an intermediate layer of only a portion of the base wall 1616 or only a portion of all of the side walls 1618.

The fluid chamber 1614 may be positioned on at least one of the four corners of the body 1612. The fluid chamber 1614 at the corners are exposed by not being covered by the inner layer 1646 and the outer layer 1648.

FIG. 16A is a rear perspective view of the case with the inner layer 1646 separate from the intermediate layer 1644 and the outer layer 1648. The inner layer 1646 may include substantially flattened surfaces that form a portion of the base wall 1616 and side walls 1618. The intermediate layer 1644 may include substantially flattened surfaces that extend over the inner layer 1646. Portions of the intermediate layer 1644 may extend into cutouts of the inner layer 1646 at the corners of the inner layer 1646. The intermediate layer 1644 may include openings 1650 to allow portions of the inner layer 1646 to pass therethrough. The outer layer 1648 includes a substantially flattened surface that covers the portion of the intermediate layer 1644 forming the base wall 1616. The outer layer 1648 may join to the inner layer 1646 by being coupled to the inner layer 1646. The inner layer 1646 may include protrusions 1652 configured to extend through openings 1650 of the intermediate layer 1644 to couple to the outer layer 1648. The protrusions 1652 may couple to the outer layer 1648 through use of an adhesive or a mechanical attachment or other coupling method. The inner layer 1646, intermediate layer 1644 and the outer layer 1648 may be separably coupled to one another. In one embodiment, the inner layer 1646, intermediate layer 1644 and the outer layer 1648 may be integrally coupled to one another.

The intermediate layer 1644 may be made of a flexible material to allow these portions of the body 1612 to more easily fit over the mobile device. The inner layer 1646 and outer layer 1648 may be made of a more rigid material to add support to the body 1612. In one embodiment, the intermediate layer 1644, inner layer 1646 and outer layer 1648 may be made of the same material, or materials having a similar degree of flexibility. In one embodiment, the intermediate layer 1644, inner layer 1646 and outer layer 1648 may be integral with one another. For example, in one embodiment, these portions of the body 1612 may be dual injection molded together.

In one embodiment, the intermediate layer 1644, inner layer 1646 and outer layer 1648 may be made of a flexible material such as an elastomer. The fluid chamber 1614 may also be made from a flexible material such as an elastomer. The elastomer may be a thermoplastic elastomer or the like. Other flexible materials or elastomers may be utilized as desired. In one embodiment, the intermediate layer 1644, inner layer 1646 and outer layer 1648 may be made of a more rigid material such as a rigid thermoplastic polyurethane, polycarbonate, or the like. In one embodiment, the portions of the body 1612 may be made of the same material or materials having similar properties such as flexibility. In one embodiment, the portions of the body 1612 may be made of different material or materials having different properties such as flexibility.

Figures 17A, 17B:
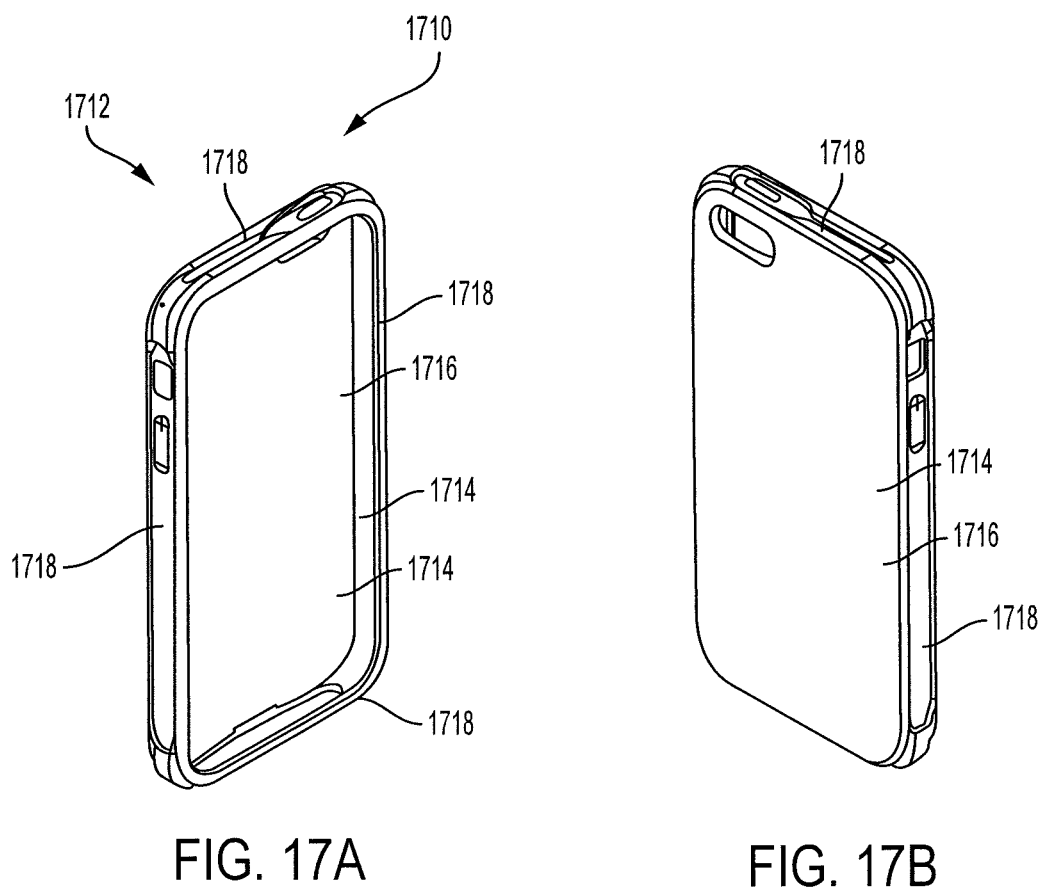
FIG. 17A illustrates a front perspective view of a case for a mobile device, according to an embodiment of the present disclosure.
FIG. 17B illustrates a rear perspective view of a case for a mobile device, according to an embodiment of the present disclosure.

FIG. 17A illustrates an embodiment of a case 1710 for a mobile device. The case 1710 includes a body 1712 that includes a fluid chamber 1714. The fluid chamber 1714 is configured to retain fluid therein and be positioned upon the mobile device when the mobile device is coupled to the body 1712.

In the embodiment shown in FIG. 17A, the fluid chamber 1714 forms the base wall 1716 and the side walls 1718 of the body 1712. The fluid chamber 1714 forms a single layer structure that extends over the base surface and side surfaces of the mobile device. The fluid chamber 1714 may have a larger size at the corners of the case 1710 to provide additional cushioning for the case 1710. The body 1712 may be a single piece.

In one embodiment, the fluid chamber 1714 may form a portion of base wall 1716 and/or at least one of the side walls 1718, which may include all of the side walls 1718. Connector portions may form the remaining portions of the body 1712.

The fluid within the fluid chamber 1714 may have less density than water to allow the case 1710 to float.

The fluid chamber 1714 may be made of a flexible material to allow these portions of the body 1712 to more easily fit over the mobile device. In one embodiment, the fluid chamber 1714 may be made of a flexible material such as an elastomer. The fluid chamber 1714 may also be made from a flexible material such as an elastomer. The elastomer may be a thermoplastic elastomer or the like. Other flexible materials or elastomers may be utilized as desired. In one embodiment, the fluid chamber 1714 may be made of a more rigid material such as a rigid thermoplastic polyurethane, polycarbonate, or the like. In one embodiment, all portions of the body 1712 may be made of the same material or materials having similar properties such as flexibility. In one embodiment, portions of the body 1712 may be made of different material or materials having different properties such as flexibility.

Figure 18B:
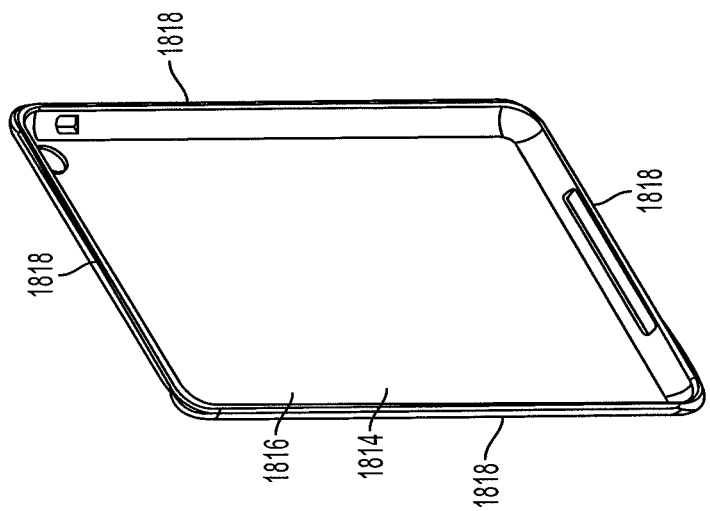
FIG. 18B illustrates a front perspective view of a case for a mobile device, according to an embodiment of the present disclosure.
Figure 18A:
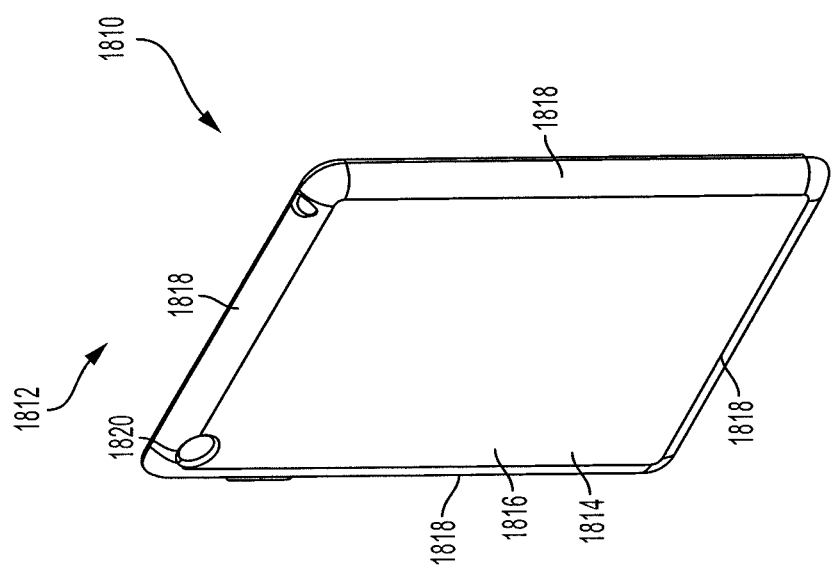
FIG. 18A illustrates a rear perspective view of a case for a mobile device, according to an embodiment of the present disclosure.

The embodiment shown in FIGS. 18A-18B is similar to the embodiment shown in FIGS. 17A-17B. The dimensions, however, of the case 1810 vary as the embodiment shown in FIGS. 18A-18B may be configured to couple to a "tablet" style mobile device, similar to the embodiment shown in FIGS. 14A-14B. The case 1810 may have dimensions of between about 10 and 7 inches in length, and have a width of between about 8 and 5 inches. The case 1810 preferably has a length between about 9.5 and 7.5 inches, and a width of between about 7.5 and 5 inches. In one embodiment, the dimensions of the case 1810 may be varied as desired. Any of the embodiments of cases shown or discussed in this application may be sized in the manner discussed in regard to the case 1810.

Figures 19A, 19B:
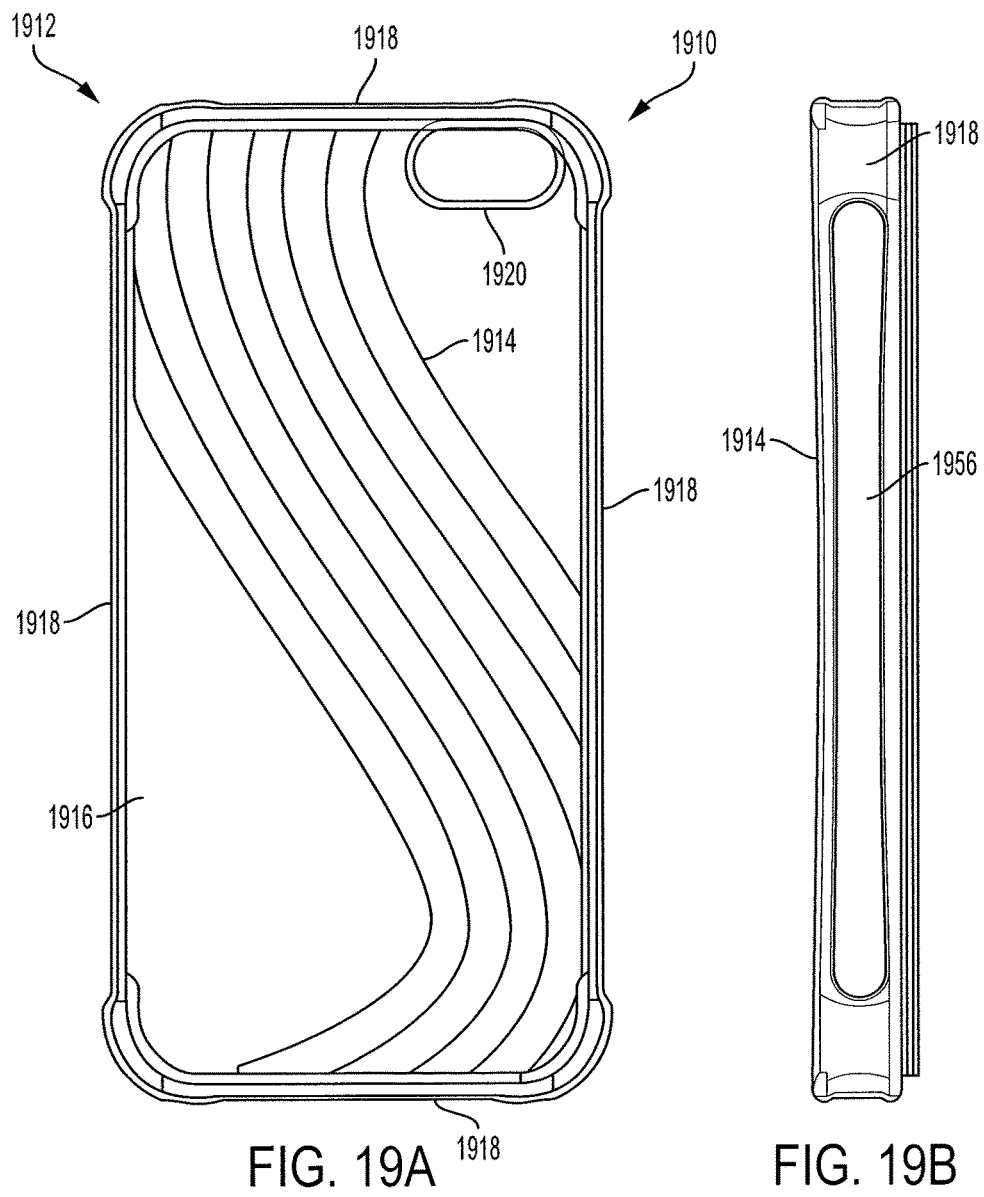
FIG. 19A illustrates a front view of a case for a mobile device, according to an embodiment of the present disclosure.
FIG. 19B illustrates a right side view of a case for a mobile device, according to an embodiment of the present disclosure.

FIG. 19A illustrates an embodiment of a case 1910 for a mobile device. The case includes a body 1912 that includes a fluid chamber 1914. The fluid chamber 1914 is configured to retain fluid therein and be positioned upon the mobile device when the mobile device is coupled to the body 1912.

In the embodiment shown in FIG. 19A, a fluid chamber 1914 forms a portion of the base wall 1916 and a fluid chamber 1914 forms the side walls 1918. The fluid chamber 1914 on the base wall 1916 forms a raised portion of the body 1912. The raised portion extends in a direction along the base wall 1916 from one end of the body 1912 to another end. The fluid chamber 1914 from the side walls 1918 may be sized larger at the corners to provide cushions for the mobile device.

Connector portions may join the fluid chamber 1914 on the base wall 1916 to the fluid chamber 1914 forming the side walls 1918. In one embodiment, any of the fluid chambers 1914 may form a portion of base wall 1916 and/or at least one of the side walls 1918, which may include all of the side walls 1918. Connector portions may form the remaining portions of the body 1912.

Figure 19C:
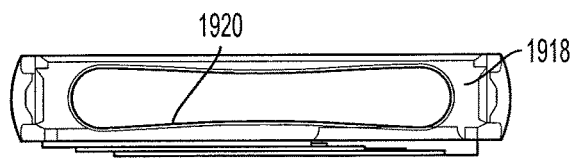
FIG. 19C illustrates a bottom view of a case for a mobile device, according to an embodiment of the present disclosure.
Figure 19D:
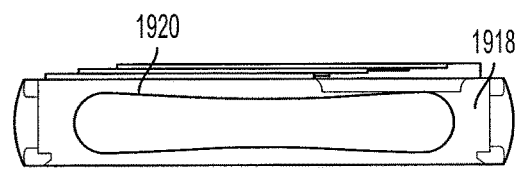
FIG. 19D illustrates a top view of a case for a mobile device, according to an embodiment of the present disclosure.

FIG. 19B illustrates a right side view of the case 1910. The side wall 1918 may include an opening 1956. The fluid chamber 1914 may form a tube that extends adjacent the opening 1956. FIG. 19C illustrates a bottom view of the case 1910. FIG. 19D illustrates a top view of the case 1910.

Figure 19E:
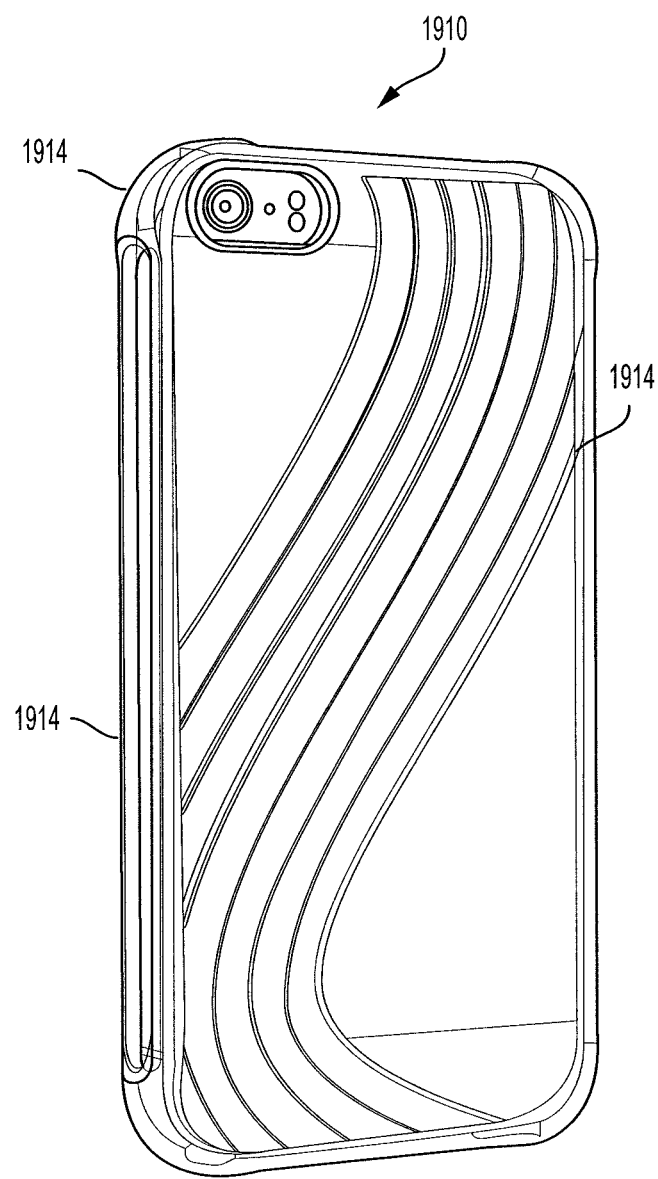
FIG. 19E illustrates a rear perspective view of a case for a mobile device, according to an embodiment of the present disclosure.

FIG. 19E illustrates a rear perspective view of the case 1910.

The fluid chamber 1914 and the remaining portions of the body 1912 may be made of a flexible material to allow these portions of the body 1912 to more easily fit over the mobile device. In one embodiment, the fluid chamber 1914 and remaining portions of the body 1912 may be made of a flexible material such as an elastomer. The elastomer may be a thermoplastic elastomer or the like. Other flexible materials or elastomers may be utilized as desired. In one embodiment, the fluid chamber 1914 and the remaining portions of the body 1912 may be made of a more rigid material such as a rigid thermoplastic polyurethane, polycarbonate, or the like. In one embodiment, all portions of the body 1912 may be made of the same material or materials having similar properties such as flexibility. In one embodiment, portions of the body 1912 may be made of different material or materials having different properties such as flexibility.

FIG. 20A illustrates an embodiment of a case 2010 for a mobile device. The case 2010 includes a body 2012 that includes a fluid chamber 2014. The fluid chamber 2014 is configured to retain fluid therein and be positioned upon the mobile device when the mobile device is coupled to the body 2012.

In the embodiment shown in FIG. 20A, the body 2012 includes a plurality of fluid chambers 2014. The base wall 2016 includes a plurality of fluid chambers 2014 and the side walls include a plurality of fluid chambers 2014. The fluid chambers 2014 on the base wall 2016 form a repeating pattern on the base wall 2016 that extends from one end of the body 2012 to the other end. The plurality of fluid chambers extend laterally and at an angle across the base wall 2016. The plurality of fluid chambers 2014 form a raised portion of the base wall 2016. The plurality of fluid chambers 2014 are in fluid isolation from each other. The fluid chambers 2014 on the side walls 2018 form repeating patterns of raised portions and are in fluid isolation from each other. The fluid chambers 2014 at the corners of the body 2012 form cushions. In one embodiment, solely the base wall 2016 or at least one of the side walls 2018 may include the plurality of fluid chambers 2014. In one embodiment, the base wall 2016 includes at least one of the plurality of fluid chambers 2014, and/or at least one of the plurality of side walls 2018 includes at least one of the plurality of fluid chambers 2014.

Connector portions form the remaining portions of the body 2012. The case 2010 may have a single body design. In one embodiment, the fluid chambers 2014 may be in fluid communication with one another.

FIG. 20B illustrates a left side view of the case 2010. FIG. 20C illustrates a bottom view of the case 2010. FIG. 20D illustrates a top view of the case 2010.

Figure 20E:
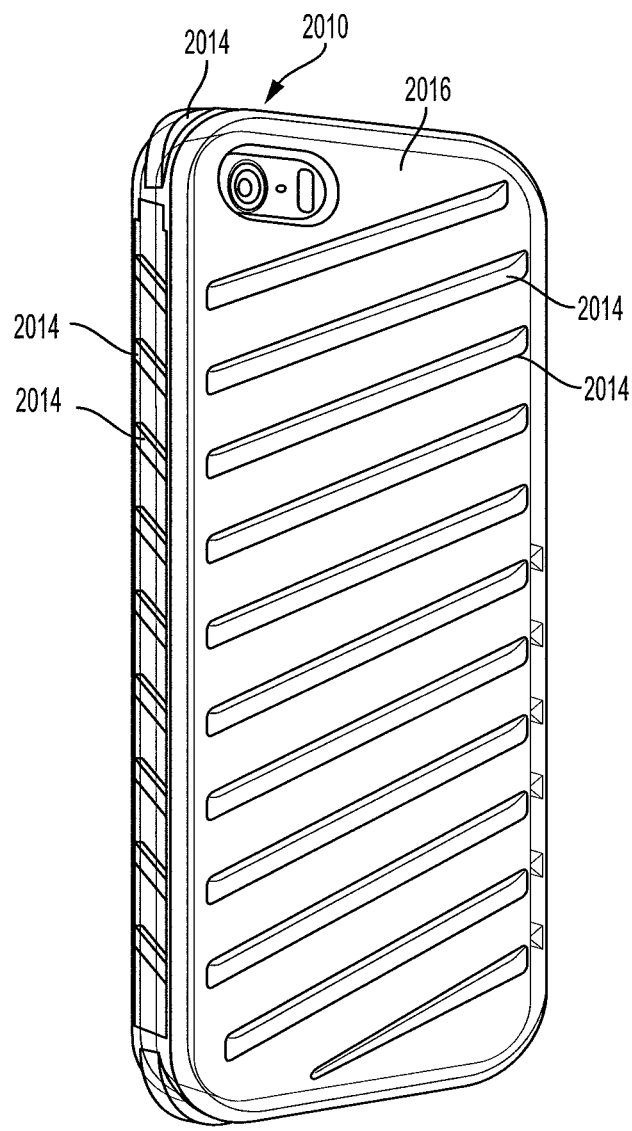
FIG. 20E illustrates a rear perspective view of a case for a mobile device, according to an embodiment of the present disclosure.

FIG. 20E illustrates a rear perspective view of the case 2110.

The fluid chamber 2014 and the remaining portions of the body 2012 may be made of a flexible material to allow these portions of the body 2012 to more easily fit over the mobile device. In one embodiment, the fluid chamber 2014 and remaining portions of the body 2012 may be made of a flexible material such as an elastomer. The elastomer may be a thermoplastic elastomer or the like. Other flexible materials or elastomers may be utilized as desired. In one embodiment, the fluid chamber 2014 and the remaining portions of the body 2012 may be made of a more rigid material such as a rigid thermoplastic polyurethane, polycarbonate, or the like. In one embodiment, all portions of the body 2012 may be made of the same material or materials having similar properties such as flexibility. In one embodiment, portions of the body 2012 may be made of different material or materials having different properties such as flexibility.

Figure 21A:
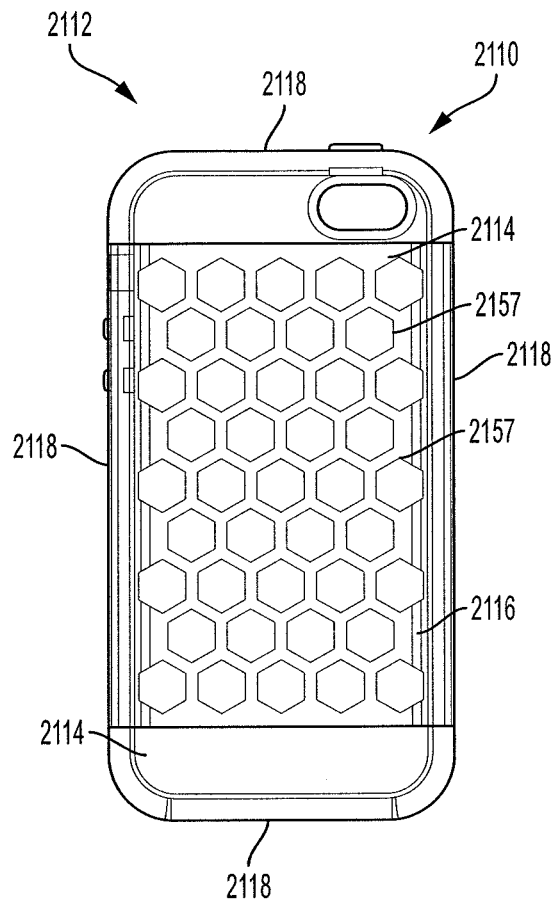
FIG. 21A illustrates a front view of a case for a mobile device, according to an embodiment of the present disclosure.

FIG. 21A illustrates an embodiment of a case 2110 for a mobile device. The case 2110 includes a body 2112 that includes a fluid chamber 2114. The fluid chamber 2114 is configured to retain fluid therein and be positioned upon the mobile device when the mobile device is coupled to the body 2112.

In the embodiment shown in FIG. 21A, the fluid chamber 2114 forms the base wall 2116 and the side walls 2118 of the case 2110. A plurality of supports 2157 in the form of columnar structures are positioned in the fluid chamber 2114. The supports 2157 may serve as spacers between the outer and inner walls defining the fluid chamber 2114. The supports 2157 may be spaced such that fluid may pass between the supports 2157.

Figure 21B:
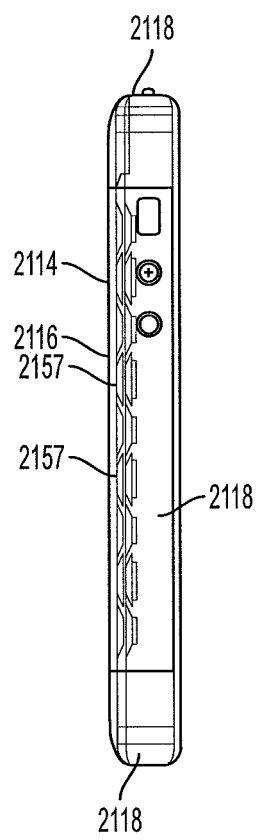
FIG. 21B illustrates a left side view of a case for a mobile device, according to an embodiment of the present disclosure.
Figure 21C:
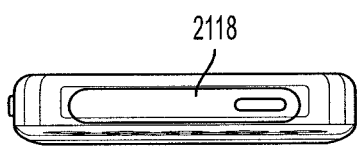
FIG. 21C illustrates a bottom view of a case for a mobile device, according to an embodiment of the present disclosure.
Figure 21D:
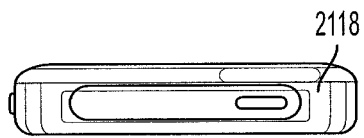
FIG. 21D illustrates a top view of a case for a mobile device, according to an embodiment of the present disclosure.
Figures 21E, 22A:
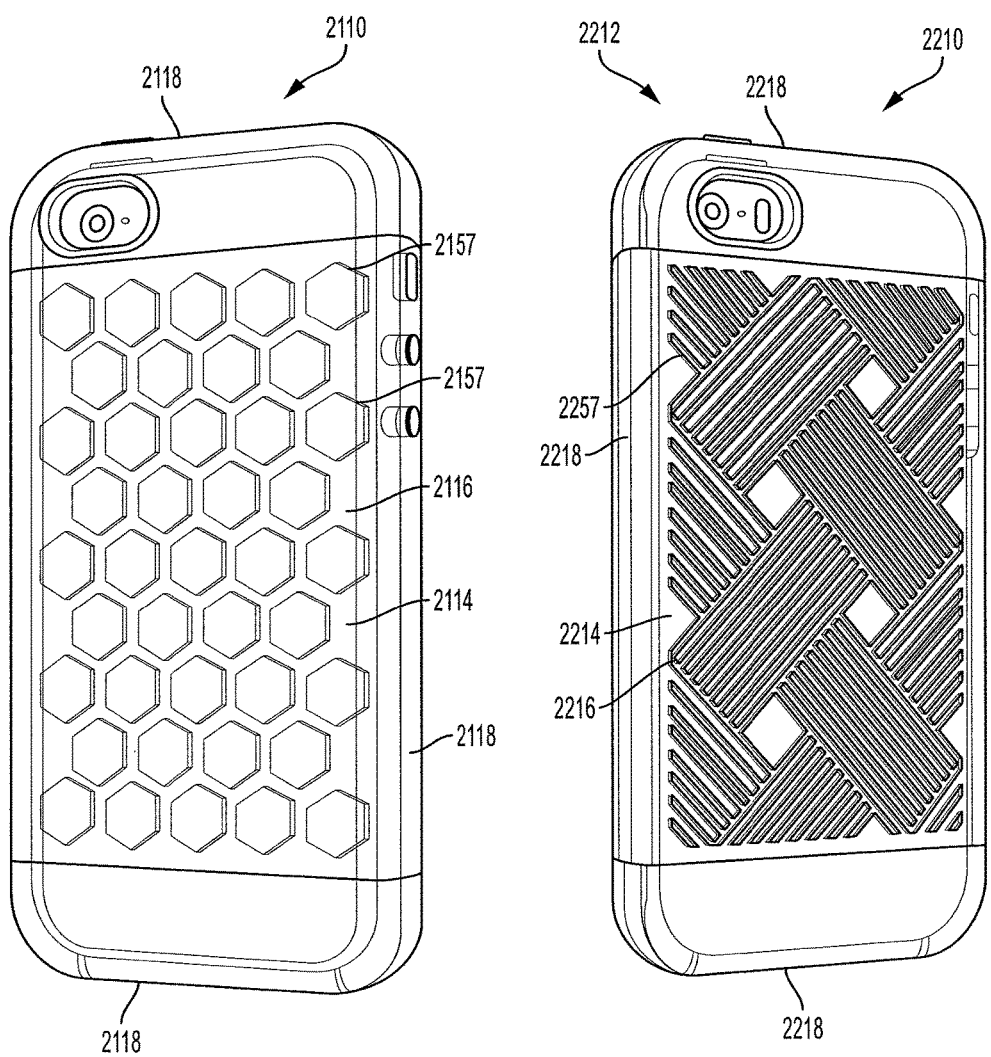
FIG. 21E illustrates a rear perspective view of a case for a mobile device, according to an embodiment of the present disclosure.
FIG. 22A illustrates a rear perspective view of a case for a mobile device, according to an embodiment of the present disclosure.

FIG. 21B illustrates a left side view of the case 2110. FIG. 21C illustrates a bottom view of the case 2110. FIG. 21D illustrates a top view of the case 2110. FIG. 21E illustrates a perspective view of the case 2110.

FIG. 22A illustrates an embodiment of a case 2210 for a mobile device. The case 2210 includes a body 2212 that includes a fluid chamber 2214. The fluid chamber 2214 is configured to retain fluid therein and be positioned upon the mobile device when the mobile device is coupled to the body 2212.

In the embodiment shown in FIG. 22A, the fluid chamber 2214 forms the base wall 2216 and the side walls 2218 of the case 2210. A plurality of supports 2257 in the form of ridges in a crossing pattern are positioned in the fluid chamber 2214. The supports 2257 may serve as spacers between the outer and inner walls defining the fluid chamber 2214. The supports 2257 may be spaced such that fluid may pass between the supports 2257.

The fluid chambers 2114, 2214 and the remaining portions of the bodies 2112, 2212 may be made of a flexible material to allow these portions of the bodies 2112, 2212 to more easily fit over the mobile device. In one embodiment, the fluid chambers 2114, 2214 and remaining portions of the bodies 2112, 2212 may be made of a flexible material such as an elastomer. The elastomer may be a thermoplastic elastomer or the like. Other flexible materials or elastomers may be utilized as desired. In one embodiment, the fluid chambers 2114, 2214 and the remaining portions of the bodies 2112, 2212 may be made of a more rigid material such as a rigid thermoplastic polyurethane, polycarbonate, or the like. In one embodiment, all portions of the bodies 2112, 2212 may be made of the same material or materials having similar properties such as flexibility. In one embodiment, portions of the bodies 2112, 2212 may be made of different material or materials having different properties such as flexibility.

Figures 23A, 23B:
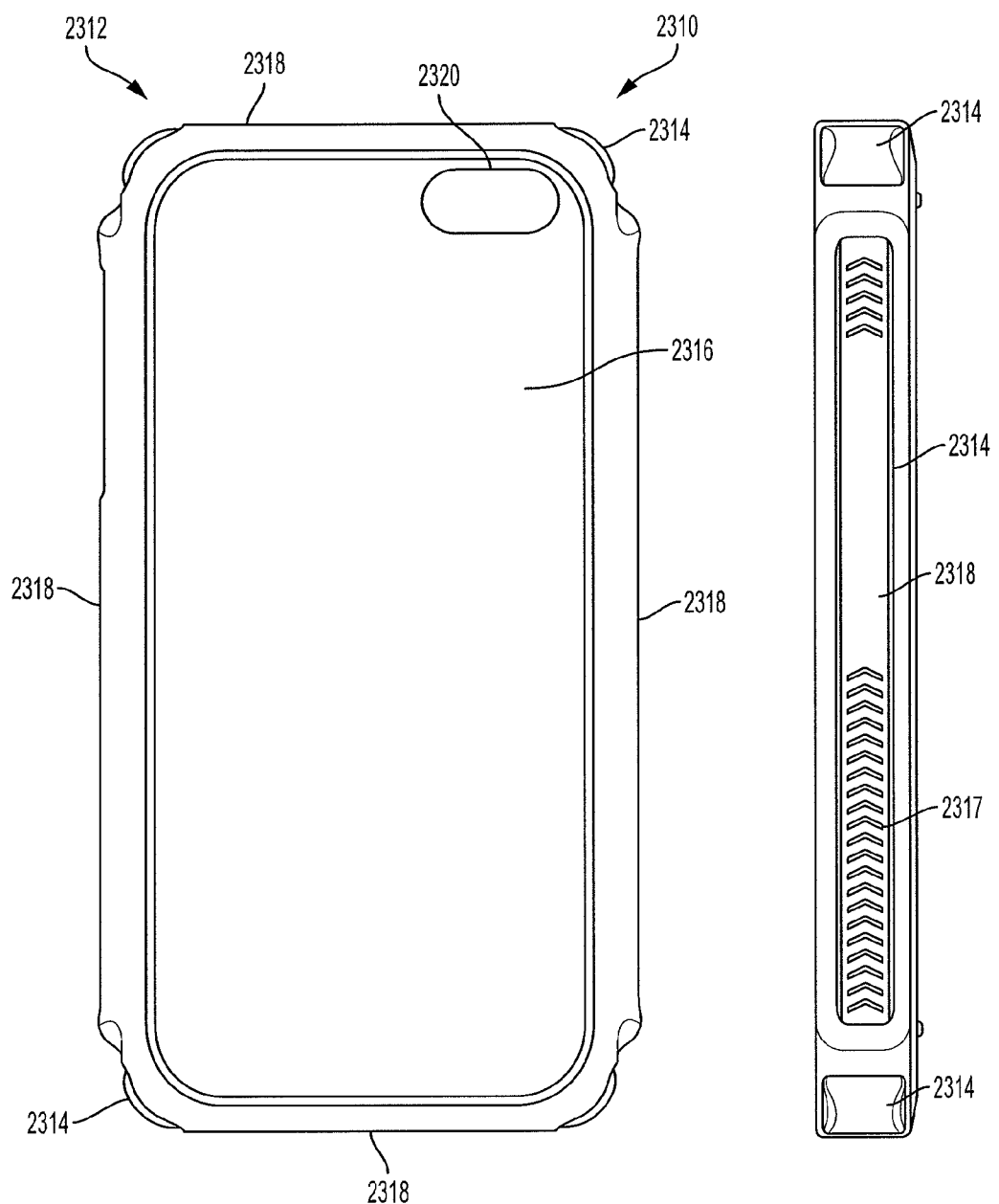
FIG. 23A illustrates a front view of a case for a mobile device, according to an embodiment of the present disclosure.
FIG. 23B illustrates a right side view of a case for a mobile device, according to an embodiment of the present disclosure.

FIG. 23A illustrates an embodiment of a case 2310 for a mobile device. The case 2310 includes a body 2312 that includes a fluid chamber 2314. The fluid chamber 2314 is configured to retain fluid therein and be positioned upon the mobile device when the mobile device is coupled to the body 2312.

In the embodiment shown in FIG. 23A, a plurality of fluid chambers 2314 form a portion of the side walls 2318. Fluid chambers 2314 are positioned at the corners of the case 2310 and along the length of the side walls 2318 of the case 2310. Connector portions connect the fluid chambers 2314. The fluid chambers 2314 are in fluid isolation from each other. In one embodiment, the fluid chambers 2314 may be in fluid communication with each other. In one embodiment, the fluid chambers 2314 may form the entirety of the side walls 2318 of the case 2310.

FIG. 23B illustrates a right side view of the case 2310, a fluid chamber 2314 extends along the length of the side wall 2318 of the case.

Figure 24A:
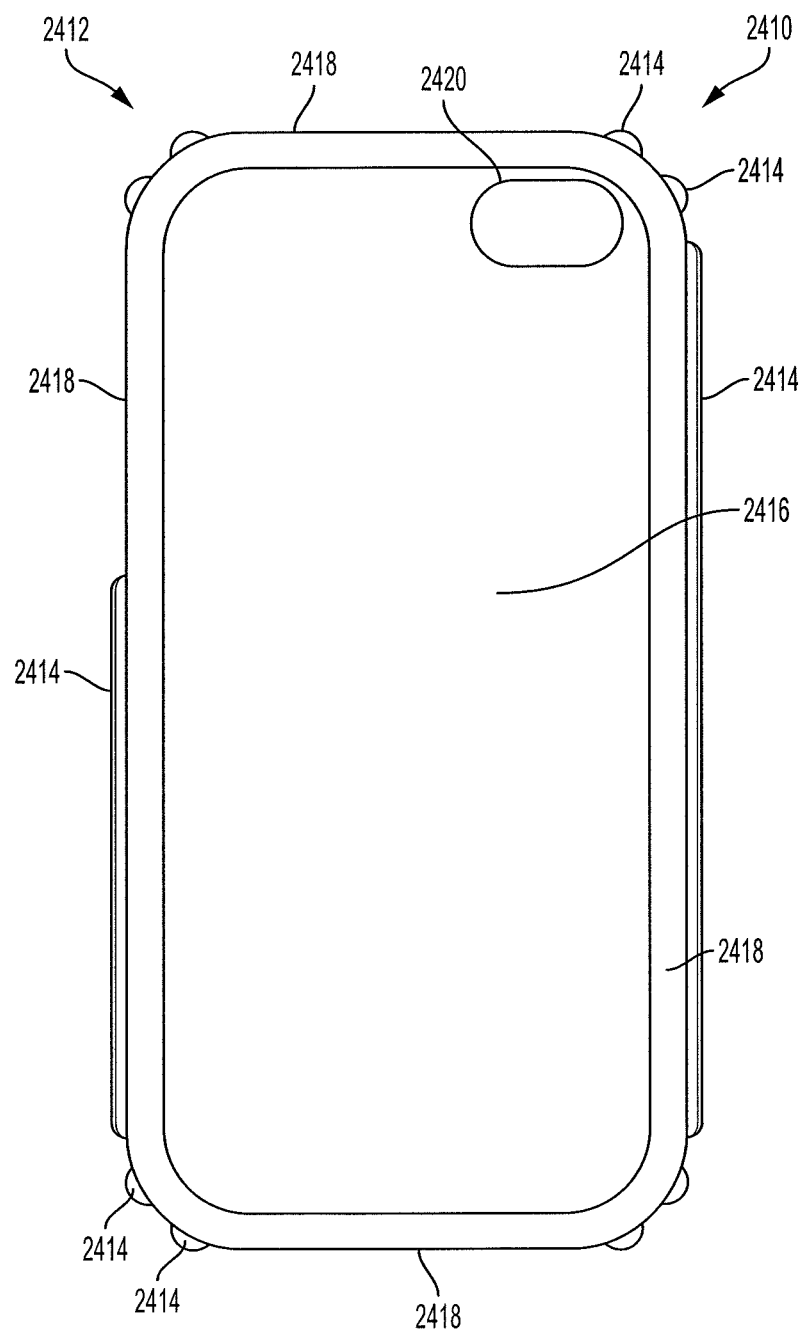
FIG. 24A illustrates a front view of a case for a mobile device, according to an embodiment of the present disclosure.

FIG. 24A illustrates an embodiment of a case 2410 for a mobile device. The case 2410 includes a body 2412 that includes a fluid chamber 2414. The fluid chamber 2414 is configured to retain fluid therein and be positioned upon the mobile device when the mobile device is coupled to the body 2412.

In the embodiment shown in FIG. 24A, the fluid chambers 2414 are configured similarly as in the embodiment shown in FIG. 24A, however, the fluid chambers 2414 at the corners form two separate corner bumpers. The fluid chambers forming the corner bumpers are in fluid isolation, however, in one embodiment the fluid chambers forming the corner bumpers may be in fluid communication.

The fluid chambers 2314, 2414 and the remaining portions of the bodies 2312, 2412 may be made of a flexible material to allow these portions of the bodies 2312, 2412 to more easily fit over the mobile device. In one embodiment, the fluid chambers 2314, 2414 and remaining portions of the bodies 2312, 2412 may be made of a flexible material such as an elastomer. The elastomer may be a thermoplastic elastomer or the like. Other flexible materials or elastomers may be utilized as desired. In one embodiment, the fluid chambers 2314, 2414 and the remaining portions of the bodies 2312, 2412 may be made of a more rigid material such as a rigid thermoplastic polyurethane, polycarbonate, or the like. In one embodiment, all portions of the bodies 2312, 2412 may be made of the same material or materials having similar properties such as flexibility. In one embodiment, portions of the bodies 2312, 2412 may be made of different material or materials having different properties such as flexibility.

FIG. 25A illustrates an embodiment of an armband 2560 for a mobile device. The armband 2560 includes a band 2562 that is configured to extend around at least a portion of a wearer's arm and be held to the wearer's arm. The band 2562 includes a fluid chamber 2564 that is configured to retain fluid therein. The armband 2560 includes a coupler 2566 that is configured to couple a mobile device to the band 2562.

The band 2562 is configured as a strap that extends around at least a portion of the wearer's arm. The ends of the band include connectors 2568, 2570 that are configured to connect the ends of the band. The connectors 2568, 2570 may join to each other to assist the band 2562 to be held to the wearer's arm, preferably above the wearer's elbow. In the embodiment shown in FIG. 25A, the connector 2568 includes a hook and loop device such as velcro. The connector 2570 includes a buckle ring the connector 2568 passes through to connect the ends of the band 2562. In one embodiment, the connectors 2568, 2570 may vary from the structure shown in FIG. 25A, the connectors 2568, 2570 may include a button, zipper, hook or other form of connector as desired.

The band 2562 includes two arms 2572, 2574 that each extend outward from the coupler 2566. The arms 2572, 2574 extend outward from the coupler 2566 to the respective ends of the band 2562. The arms 2572, 2574 may be made flexible to more easily allow the arms 2572, 2574 to extend over at least a portion of the wearer's arm. In one embodiment, the arms 2572, 2574 may be made rigid.

Both arms 2572, 2574 include the fluid chamber 2564. The fluid chamber 2564 extends longitudinally along the direction of the arms 2572, 2574. In one embodiment, only one of the arms 2572, 2574 may include the fluid chamber 2564. In one embodiment, the band 2562 may include a plurality of fluid chambers 2564, with each arm 2572, 2574 including at least one of the fluid chambers 2564.

The fluid chamber 2564 is configured to retain fluid which may be a gas, a liquid, a gel, or combinations thereof. The gas may be air or another form of gas. In other embodiments, other forms of fluids may be used within the fluid chamber 2564. The fluid chamber 2564 may be configured to cushion the wearer's arm from a force applied to the band 2562. In an embodiment in which the fluid is a gas, the force may be absorbed by the gas compressing in response to the force. The fluid chamber 2564 may beneficially be a compressible fluid chamber 2564 in an embodiment in which a gas, for example air, is used in the chamber 2564. The compression properties of the fluid chamber 2564 increase the ability of the fluid chamber 2564 to absorb the force. In addition, the compressible fluid chamber 2564 may increase the comfort for the armband 2560 upon the wearer's arm, and improve the fit of the armband 2560 to the wearer's arm. In an embodiment in which the fluid is a liquid or gel, the force may be absorbed by the force being transmitted through the liquid or gel. In other embodiments, the fluid chamber 2564 may cushion the force through another manner. In one embodiment, the fluid chamber 2564 may include flexible side walls. The flexible side walls may flex or have a shape that varies in response to the force to enhance the ability of the fluid chamber 2564 to cushion the wearer's arm from the force.

The fluid chamber 2564 may be configured to be sealed fluid tight such that no fluid may enter or escape the fluid chamber during use of the armband 2560. In one embodiment, the fluid chamber 2564 may be configured such that the seal may be broken by a user inserting fluid to or withdrawing fluid from the fluid chamber 2564. In one embodiment, the fluid chamber 2564 may be pre-filled with all or a portion of the fluid chamber 2564 filled with fluid. The pre-filled fluid chamber 2564 may be coupled to the wearer's arm. In one embodiment, the fluid chamber 2564 may be configured to be entirely or partially filled with a fluid after the fluid chamber 2564 is coupled to the mobile device. In such an embodiment, the fluid chamber 2564 may have increased flexibility to be positioned upon the wearer's arm in the manner desired, and is then later entirely or partially filled with the fluid.

In one embodiment, the fluid may be configured to have a density that is less than the density of water. The density of the fluid in the fluid chamber 2564 may assist the band 2562 to float if the band 2562 is dropped in water. The fluid chamber 2564 may be configured to retain a sufficient amount of fluid to allow the band 2562 and a mobile device coupled thereto to float upon water.

The band 2562 includes a pump 2577 configured to provide fluid to or withdraw fluid from the fluid chamber 2564 when activated.

The pump 2577 as shown in FIG. 25A includes a bladder that is pressed by a user to provide fluid to the fluid chamber 2564. The pump 2577 may draw fluid from outside of the fluid chamber 2564 and armband 2560 to be provided to the fluid chamber 2564. In an embodiment in which the fluid is air, the pump 2577 may draw air from outside of the armband 2560. The pump 2577 may include a valve that opens to allow fluid to enter the fluid chamber 2564 upon activation of the pump 2577. The valve may form a fluid tight seal of the fluid chamber 2564 when the valve is closed. The pump 2577 may be positioned on one of the arms 2572 as shown in FIG. 25A. In one embodiment, the pump 2577 may be positioned on any part of the band 2562, for example on the other arm 2574 or near the coupler 2566.

In one embodiment, the pump 2577 may include a different device than a bladder to be pressed. The pump 2577 may include a push button, a plunger, a rotary device, a diaphragm, or other device that operates as a pump. In one embodiment, the pump 2577 may be a fluid chamber 2564 configured to vary in size by being pressed, to draw fluid to or from a valve.

The fluid chamber 2564 may form a bladder that is positioned within a sleeve 2576 of the band 2562. The sleeve 2576 extends over the fluid chamber 2564. The fluid chamber 2564 separated from the sleeve 2576 is shown in FIG. 25B. The fluid chamber 2564 may include indentations 2578 in the surface of the fluid chamber 2564 that allow the fluid chamber 2564 to more easily bend. A surface of the fluid chamber 2564 on an opposite side of the fluid chamber 2564 may include protrusions 2580 that provide additional support for the fluid chamber 2564. The fluid chamber 2564 may be configured to extend over at least a portion of the wearer's arm.

The coupler 2566 comprises a housing that is configured to extend over at least one side of the mobile device to receive the mobile device. The housing may cover four sides of the mobile device to couple the mobile device to the band 2562. The housing may form a portion of the sleeve 2576. In one embodiment, the coupler 2566 may have a different structure than shown in FIG. 25A. For example, the coupler 2566 may be a tether, snap, quick connect device, latch, or other form of coupler that couples a mobile device to the band 2562.

FIG. 25C illustrates the armband 2560 with the pump 2577 covered by an indicator 2582. The indicator 2582 is in the form of a raised portion of the sleeve 2576 and indicates a location for a user to press to activate the pump 2577.

FIG. 25D illustrates a left perspective view of the fluid chamber 2564. The fluid chamber 2564 may include a release valve 2584 that is configured to allow fluid to be released from the fluid chamber 2564 when activated. The release valve 2584 may be positioned on the fluid chamber 2564. In one embodiment, the release valve 2584 may be positioned in a different location on the band 2562. The release valve 2584 may include a button that is pressed to open the release valve 2584. In one embodiment, the release valve 2584 may have a different structure than shown in FIG. 25D, for example, a plunger, pull tab, or other device for releasing fluid from a fluid chamber may be used.

FIG. 25E illustrates a left perspective view of the armband 2560 with the sleeve 2576 and coupler 2566 positioned over the fluid chamber 2564. FIG. 25F illustrates an indicator 2582 in the form of a raised portion of the sleeve 2576 that indicates a location for a user to press to activate the release valve 2584.

The fluid chamber 2564 may be configured to increase in size, or inflate, as fluid is provided to the fluid chamber 2564 from the pump 2577. In an embodiment in which the fluid chamber 2564 is configured to increase in size when the fluid chamber 2564 is provided with fluid, the fluid chamber 2564 may include flexible side walls. The flexible side walls may flex or have a shape that varies as fluid is provided to or withdrawn from the fluid chamber 2564.

The pump 2577 may be configured to provide fluid to or withdraw fluid from a single fluid chamber 2564 or a plurality of fluid chambers 2564. In one embodiment, the band 2562 may include a single fluid chamber 2564. In one embodiment, the band 2562 may include a plurality of fluid chambers 2564. In one embodiment, multiple pumps 2577 or release valves 2584 may be used in combination with a single fluid chamber 2564 or multiple fluid chambers 2564.

The pump 2577 may be activated after the armband 2560 has been coupled to the wearer's arm or before. In an embodiment in which the pump 2577 is activated after the mobile device has been coupled to the wearer's arm, the unpumped band 2562 may be more flexible prior to being coupled to the wearer's arm. The more flexible band 2562 may be more easily coupled to the wearer's arm. The fluid chamber 2564 may then be provided with fluid, which may increase the stiffness of the band 2562 and increase the ability of the band 2562 to cushion the wearer's arm. The fit of the band 2562 upon the wearer's arm may be beneficially varied upon activation of the pump.

The fluid chamber 2564 and the remaining portions of the band 2562 may be made of a flexible material to allow these portions of the band 2562 to more easily extend around a portion of the wearer's arm. In one embodiment, the fluid chamber 2564 and remaining portions of the band 2562 may be made of a flexible material such as an elastomer. The elastomer may be a thermoplastic elastomer or the like. Other flexible materials or elastomers may be utilized as desired. For example, a fabric or a flexible thermoplastic polyurethane may be utilized. In one embodiment, the fluid chamber 2564 and the remaining portions of the band 2562 may be made of a more rigid material such as a rigid thermoplastic polyurethane, polycarbonate, or the like. In one embodiment, all portions of the band 2562 may be made of the same material or materials having similar properties such as flexibility. In one embodiment, portions of the band 2562 may be made of different material or materials having different properties such as flexibility. In one embodiment, the connector 2568 may be made of a fabric material such as polyester.

Figure 26B:
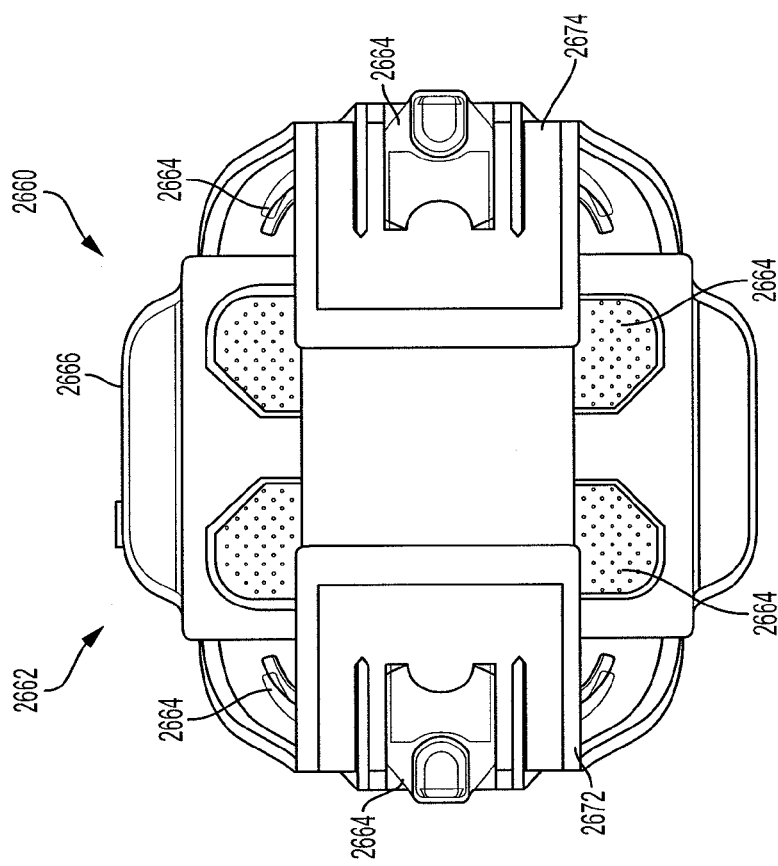
FIG. 26B illustrates a rear view of an armband for a mobile device, according to an embodiment of the present disclosure.
Figure 26A:
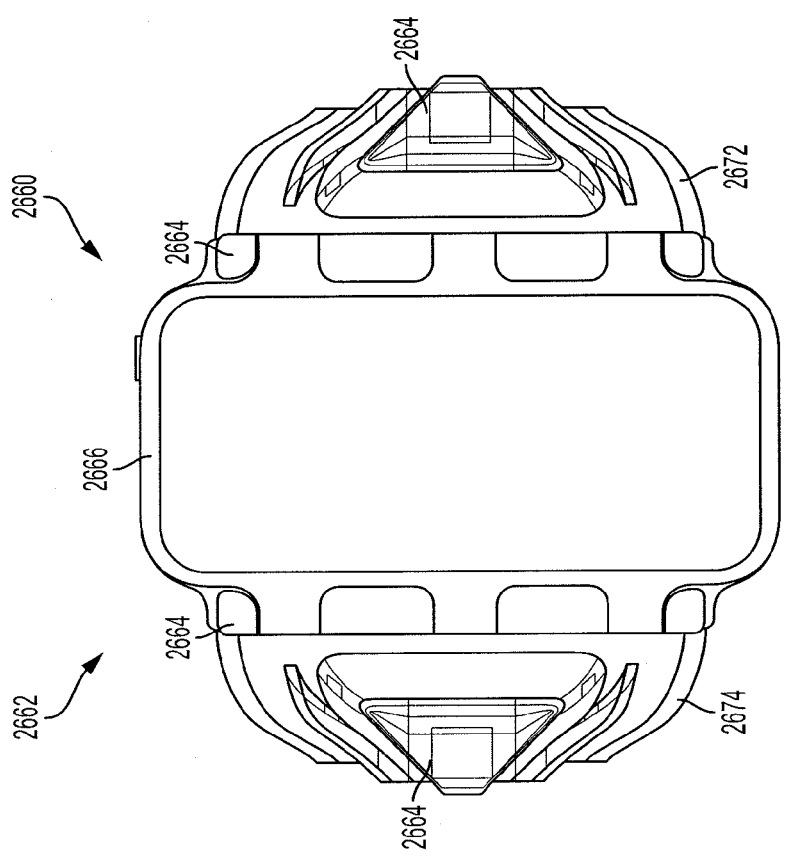
FIG. 26A illustrates a front view of an armband for a mobile device, according to an embodiment of the present disclosure.

FIG. 26A illustrates an embodiment of an armband 2660 for a mobile device. The armband 2660 includes a band 2662 that is configured to extend about at least a portion of a wearer's arm and be held to the wearer's arm.

The band 2662 includes a plurality of fluid chambers 2664 that are each configured to retain fluid therein. The armband 2660 includes a coupler 2666 that is configured to couple a mobile device to the band 2662.

The fluid chambers are positioned as a part of the band 2662. A fluid chamber 2664 is positioned on a side of an arm 2672 that faces opposite the wearer's arm. A fluid chamber 2664 is positioned on a side of an arm 2674 that faces opposite the wearer's arm. The fluid chambers 2664 on the arms 2672, 2674 extend in a direction longitudinally along the arms 2672, 2674. Fluid chambers 2664 similarly extend along the opposite sides of the arms 2672, 2674 that face towards the wearer's arm. The band 2662 includes fluid chambers 2664 extending along the coupler 2666. The fluid chambers 2664 extending along the coupler 2666 extend in a direction transverse to the direction of the arms 2672, 2674. As shown in FIG. 26A, the fluid chambers 2664 extending along the coupler 2666 have a substantially cylindrical shape. In one embodiment, the fluid chambers 2664 may have a different shape as desired.

As shown in FIG. 26A, the coupler 2666 comprises a housing that is configured to extend over at least one side of the mobile device to receive the mobile device. The housing may cover four sides of the mobile device to couple the mobile device to the band 2662. In one embodiment, the coupler 2666 may have a different structure than shown in FIG. 26A. For example, the coupler 2666 may be a tether, snap, quick connect device, latch, or other form of coupler that couples a mobile device to the band 2662.

FIG. 26B illustrates a rear view of the armband 2660. The portion of the band 2662 that is behind the coupler 2666 includes a fluid chamber 2664. The fluid chamber 2664 behind the coupler 2666 is configured to be positioned between the coupler 2666 and the wearer's arm when the armband 2660 is held to the wearer's arm. A perforated fabric may cover the fluid chamber 2664 that is positioned between the coupler 2666. The fluid chamber 2664 that is positioned behind the coupler 2666 may be glued and fixed into a recess in the coupler 2666.

The fluid chambers 2664 and the remaining portions of the band 2662 may be made of a flexible material to allow these portions of the band 2662 to more easily extend around a portion of the wearer's arm. In one embodiment, the fluid chamber 2664 and remaining portions of the band 2662 may be made of a flexible material such as an elastomer. The elastomer may be a thermoplastic elastomer or the like. Other flexible materials or elastomers may be utilized as desired. For example, a fabric or a flexible thermoplastic polyurethane may be utilized. In one embodiment, the fluid chamber 2664 and the remaining portions of the band 2662 may be made of a more rigid material such as a rigid thermoplastic polyurethane, polycarbonate, or the like. In one embodiment, all portions of the band 2662 may be made of the same material or materials having similar properties such as flexibility. In one embodiment, portions of the band 2662 may be made of different material or materials having different properties such as flexibility. In one embodiment, the arms 2672, 2674 may be made of a fabric material such as polyester.

Figure 27A:
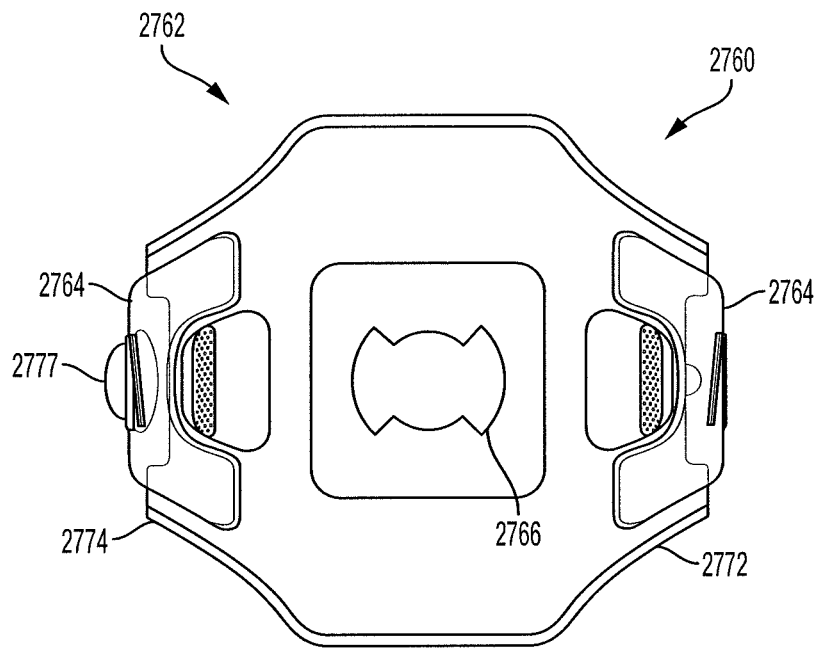
FIG. 27A illustrates a front view of an armband for a mobile device, according to an embodiment of the present disclosure.

FIG. 27A illustrates an embodiment of an armband 2760 for a mobile device. The armband 2760 includes a band 2762 that is configured to extend around at least a portion of a wearer's arm and be held to the wearer's arm. The armband 2760 includes a plurality of fluid chambers 2764 that are each configured to retain fluid therein. The armband 2760 includes a coupler 2766 that is configured to couple a mobile device to the band 2762.

The fluid chambers are positioned as a part of the band 2762. A fluid chamber 2764 is positioned on a side of an arm 2772 that faces opposite the wearer's arm. A fluid chamber 2764 is positioned on a side of an arm 2774 that faces opposite the wearer's arm. The fluid chambers 2764 on the arms 2772, 2774 extend in a direction longitudinally along the arms 2772, 2774. Fluid chambers 2764 similarly extend along the opposite sides of the arms 2772, 2774 that face towards the wearer's arm. FIG. 27D illustrates a rear view of the armband 2760. The portion of the band 2762 that is behind the coupler 2766 includes a fluid chamber 2764. The fluid chamber 2764 behind the coupler 2766 is configured to be positioned between the coupler 2766 and the wearer's arm when the armband 2760 is held to the wearer's arm. In one embodiment, the fluid chambers 2764 may have a different shape as desired. A perforated fabric may cover the fluid chamber 2764 that is positioned behind the coupler 2766.

The band 2762 includes a pump 2777 configured to provide fluid to or withdraw fluid from the fluid chamber 2764 when activated.

The pump 2777 as shown in FIG. 27A includes a bladder that is pressed by a user to provide fluid to the fluid chamber 2764. The pump 2777 may draw fluid from outside of the fluid chamber 2764 and armband 2760 to be provided to the fluid chamber 2764. In an embodiment in which the fluid is air, the pump 2777 may draw air from outside of the armband 2760. The pump 2777 may include a valve that opens to allow fluid to enter the fluid chamber 2764 upon activation of the pump 2777. The valve may form a fluid tight seal of the fluid chamber 2764 when the valve is closed. The pump 2777 may be positioned on one of the arms 2774 as shown in FIG. 27A. In one embodiment, the pump 2777 may be positioned on any part of the band 2762, for example on the other arm 2772 or near the coupler 2766.

In one embodiment, the pump 2777 may include a different device than a bladder to be pressed. The pump 2777 may include a push button, a plunger, a rotary device, a diaphragm, or other device that operates as a pump. In one embodiment, the pump 2777 may be a fluid chamber 2764 configured to vary in size by being pressed, to draw fluid to or from a valve.

Figure 27B:
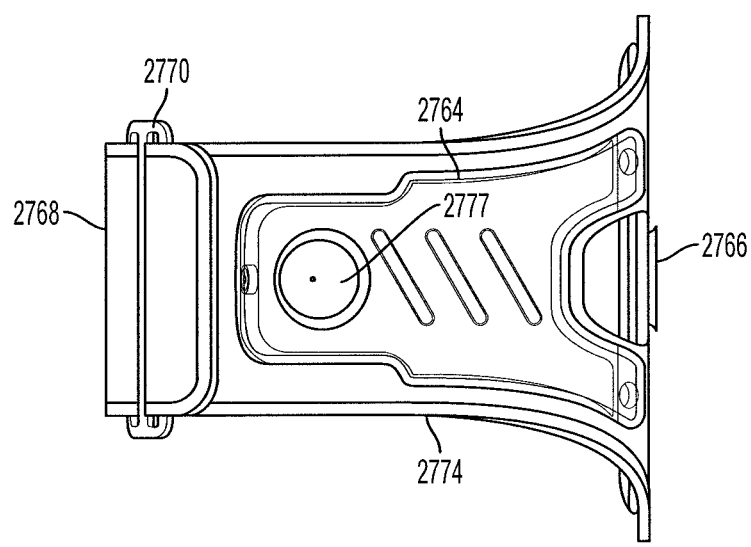
FIG. 27B illustrates a left side view of an armband for a mobile device, according to an embodiment of the present disclosure.
Figure 27C:
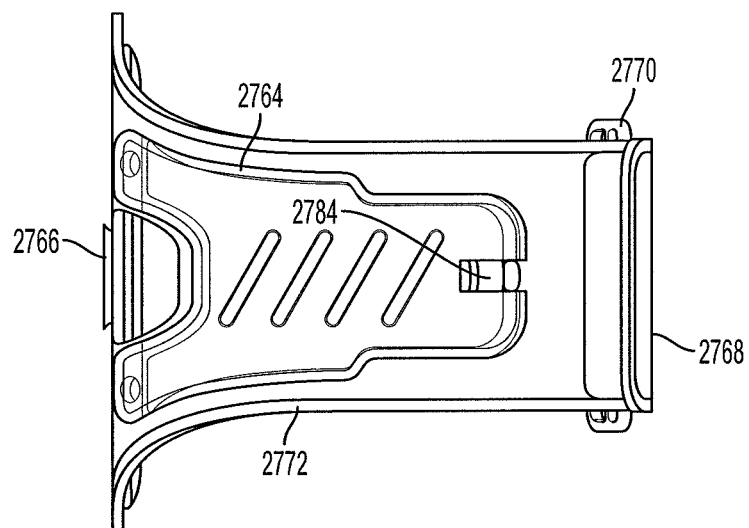
FIG. 27C illustrates a right side view of an armband for a mobile device, according to an embodiment of the present disclosure.
Figure 27D:
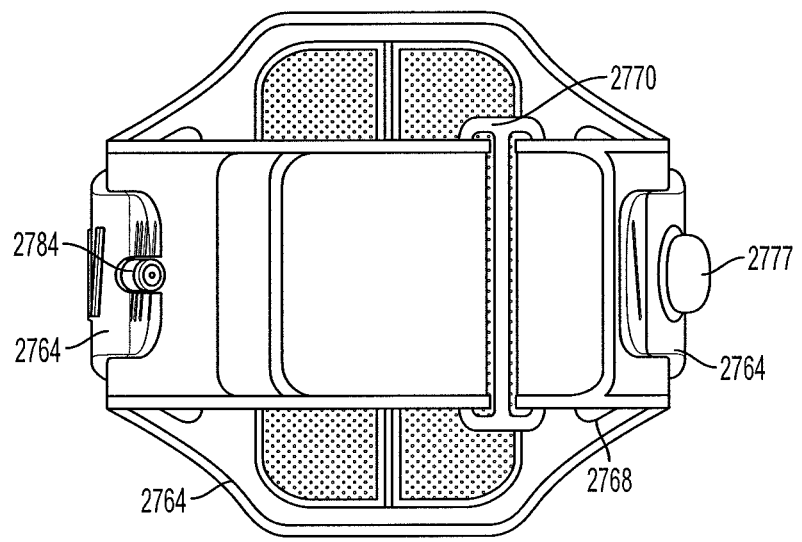
FIG. 27D illustrates a rear view of an armband for a mobile device, according to an embodiment of the present disclosure.
Figure 27E:
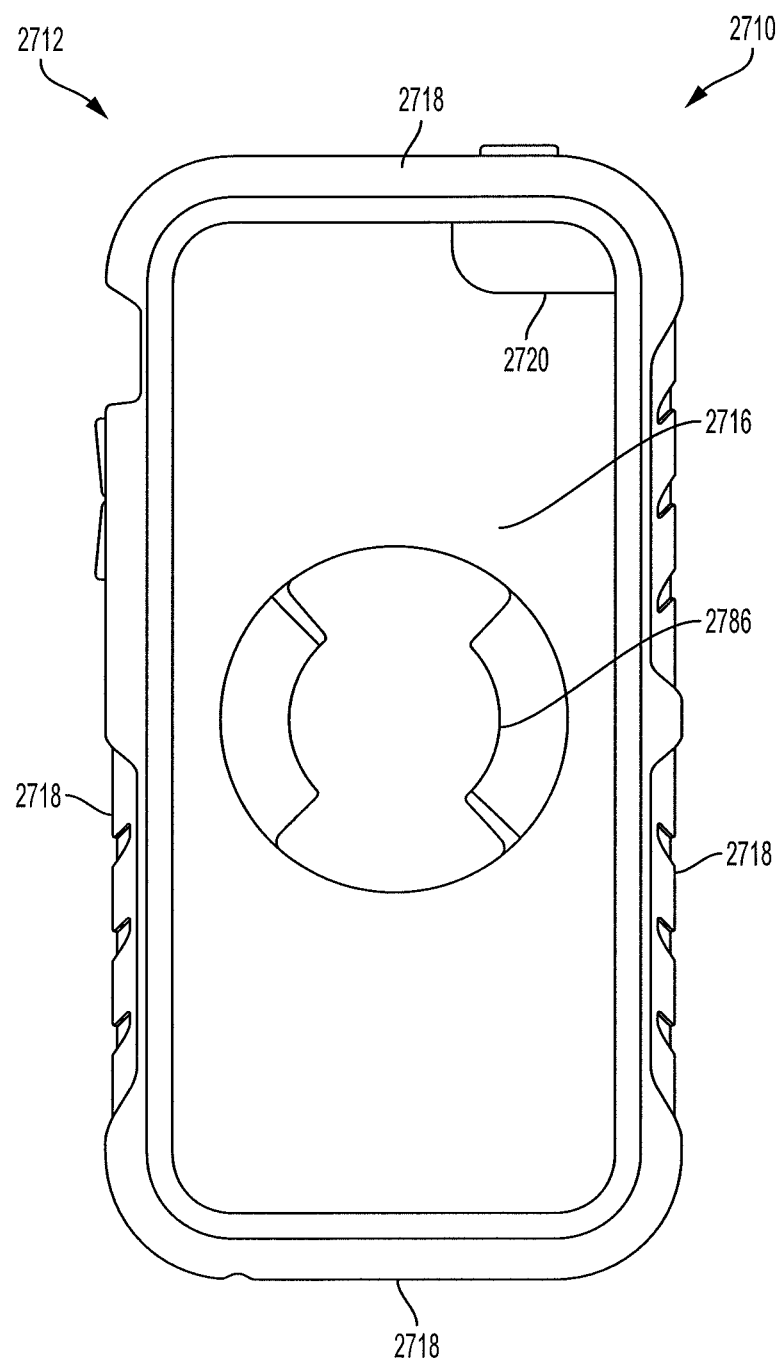
FIG. 27E illustrates a front view of a case for a mobile device, according to an embodiment of the present disclosure.

The coupler 2766 is in the form of a quick connect device configured to engage a case 2710 for a mobile device as shown in FIG. 27E. The quick connect device may be configured as a protrusion that a mating portion 2786 of the case 2710 is configured to engage. The protrusion may insert into the mating portion 2786 and rotate relative to the mating portion 2786 to couple the case 2710 to the protrusion. The case 2710 may be rotated in an opposite direction to remove the case 2710 from the band 2762. The case 2710 may be rotated by approximately ninety degrees to couple the case 2710 to the protrusion. In one embodiment, the quick connect device may have a different form than shown in FIG. 27A or 27E.

FIG. 27B illustrates a left side view of the armband 2710. FIG. 27C illustrates a right side view of the armband. The fluid chamber 2764 may include a release valve 2784 that is configured to allow fluid to be released from the fluid chamber 2764 when activated. The release valve 2784 may be positioned on the fluid chamber 2764. In one embodiment, the release valve 2784 may be positioned in a different location on the band 2762. The release valve 2784 may include a button that is pressed to open the release valve 2784. In one embodiment, the release valve 2784 may have a different structure than shown in FIG. 27C, for example, a plunger, pull tab, or other device for releasing fluid from a fluid chamber may be used.

FIG. 27D illustrates a rear view of the armband 2710.

The fluid chamber 2764 may be configured to increase in size, or inflate, as fluid is provided to the fluid chamber 2764 from the pump 2777. In an embodiment in which the fluid chamber 2764 is configured to increase in size when the fluid chamber 2764 is provided with fluid, the fluid chamber 2764 may include flexible side walls. The flexible side walls may flex or have a shape that varies as fluid is provided to or withdrawn from the fluid chamber 2764.

The pump 2777 may be configured to provide fluid to or withdraw fluid from a single fluid chamber 2764 or a plurality of fluid chambers 2764. In one embodiment, the band 2762 may include a single fluid chamber 2764. In one embodiment, the band 2762 may include a plurality of fluid chambers 2764. In one embodiment, multiple pumps 2777 or release valves 2784 may be used in combination with a single fluid chamber 2764 or multiple fluid chambers 2764.

The pump 2777 may be activated after the armband 2760 has been coupled to the wearer's arm or before. In an embodiment in which the pump 2777 is activated after the mobile device has been coupled to the wearer's arm, the unpumped band 2762 may be more flexible prior to being coupled to the wearer's arm. The more flexible band 2762 may be more easily coupled to the wearer's arm. The fluid chamber 2764 may then be provided with fluid, which may increase the stiffness of the band 2762 and increase the ability of the band 2762 to cushion the wearer's arm. The fit of the band 2762 upon the wearer's arm may be beneficially be varied upon activation of the pump.

FIG. 27E illustrates a front view of the case 2710 for use with the band 2762. The mating portion 2786 is in the form of an opening in the base wall 2716. In other embodiments the mating portion 2786 may be configured to have a different position or different form. In one embodiment, the case 2710 may include a fluid chamber in a manner discussed in regard to one of the embodiments shown in FIGS. 1A-24A or FIGS. 28A-29G.

Figure 27F:
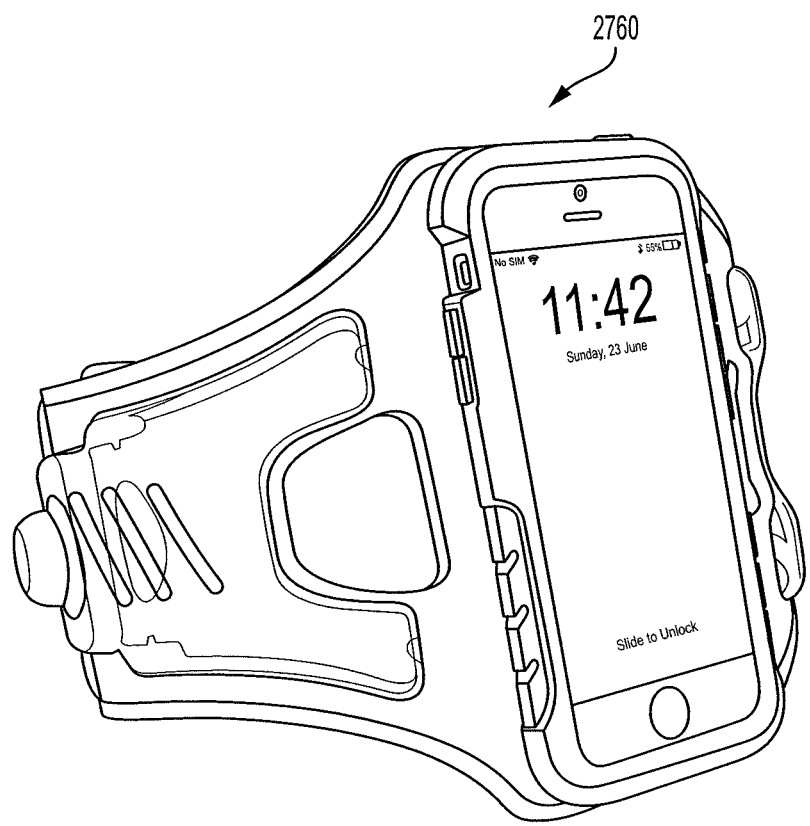
FIG. 27F illustrates a front perspective view of an armband for a mobile device, according to an embodiment of the present disclosure.

FIG. 27F illustrates a front perspective view of the armband 2760. The case 2710 is coupled to the band 2762.

The fluid chambers 2764 and the remaining portions of the band 2762 may be made of a flexible material to allow these portions of the band 2762 to more easily extend around a portion of the wearer's arm. In one embodiment, the fluid chamber 2764 and remaining portions of the band 2762 may be made of a flexible material such as an elastomer. The elastomer may be a thermoplastic elastomer or the like. Other flexible materials or elastomers may be utilized as desired. For example, a fabric or a flexible thermoplastic polyurethane may be utilized. In one embodiment, the fluid chamber 2764 and the remaining portions of the band 2762 may be made of a more rigid material such as a rigid thermoplastic polyurethane, polycarbonate, or the like. In one embodiment, all portions of the band 2762 may be made of the same material or materials having similar properties such as flexibility. In one embodiment, portions of the band 2762 may be made of different material or materials having different properties such as flexibility. In one embodiment, the arms 2772, 2774 may be made of a fabric material such as polyester.

Figure 28B:
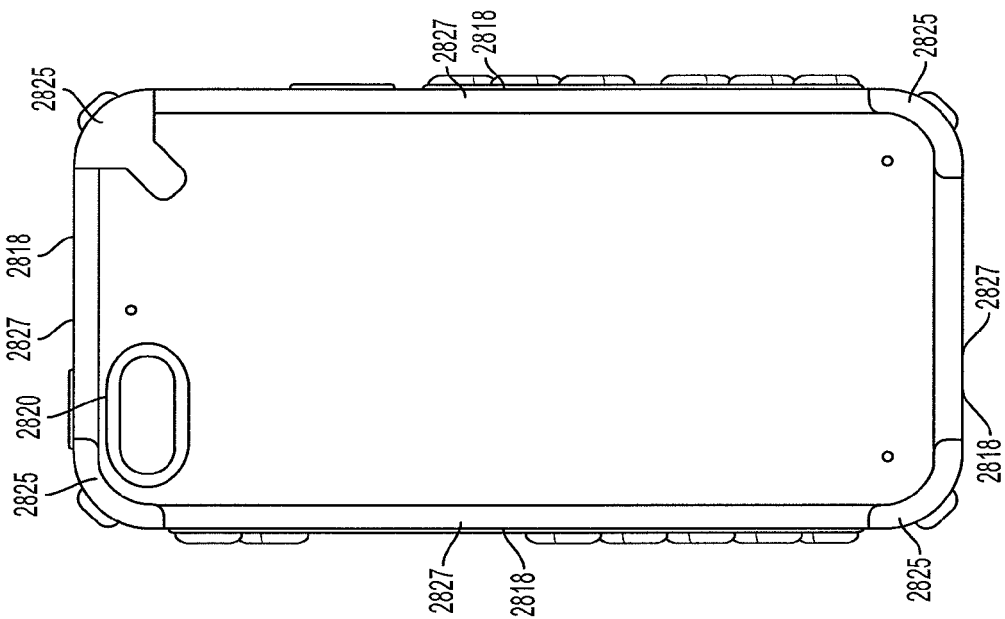
FIG. 28B illustrates a rear view of a case for a mobile device, according to an embodiment of the present disclosure.
Figure 28A:
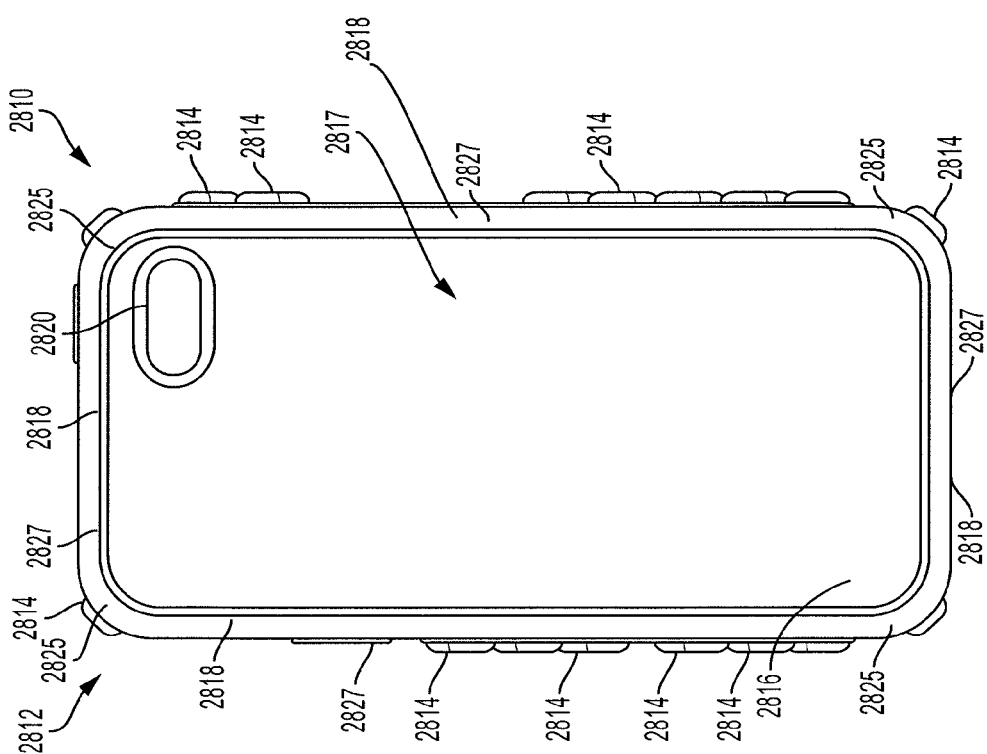
FIG. 28A illustrates a front view of a case for a mobile device, according to an embodiment of the present disclosure.

FIG. 28A illustrates an embodiment of a case 2810 for a mobile device. The case 2810 includes a body 2812 that includes a fluid chamber 2814. The fluid chamber 2814 is configured to retain fluid therein and be positioned upon the mobile device when the mobile device is coupled to the body 2812.

The body 2812 includes a base wall 2816 and a plurality of side walls 2818 that extend from the base wall 2816. The base wall 2816 is configured to cover a surface, or back surface, of a mobile device that may be coupled to the body 2812. The side walls 2818 are each configured to cover a respective side surface of the mobile device that may be coupled to the body 2812.

The side walls 2818 join to each other to form corners 2825 of the case 2810. As shown in FIG. 28A, the side walls 2818 may form four corners of the case 2810. In one embodiment, the side walls 2818 may form at least one or at least two corners of the case 2810. The side walls 2818 at the corners 2825 are configured to be positioned upon a respective corner surface of the mobile device. The corner surfaces are the portions of the mobile device marked by reference number 229 in FIG. 2C for example. The portions of the side walls 2818 between the corners 2825 are the side portions 2827 of the side walls 2818 and are configured to be positioned upon side surfaces of the mobile device, which are marked by reference number 231 in FIG. 2C for example.

The side walls 2818 may extend from the base wall 2816 such that the plurality of side walls 2818 and the base wall 2816 form a recess for receiving the mobile device. The mobile device is positioned in the recess 2817 for the mobile device to couple to the body 2812. The base wall 2816 and the side walls 2818 may define the shape of the recess. The base wall 2816 and side walls 2818 may be configured such that the body 2812 forms a form fit around the mobile device. The recess may substantially have the shape of the mobile device. The mobile device may couple to the body 2812 by merely being placed within the recess, or a small lip of the body 2812 may extend over a portion of the mobile device, or another form of attachment device may be used to couple the mobile device to the body 2812.

In the embodiment shown in FIG. 28A, a plurality of fluid chambers 2814 are included in the side walls 2818 between the corners 2825 of the case 2810. A plurality of fluid chambers 2814 are positioned on a left side wall 2818 between two corners 2825 of the case 2810, and a plurality of fluid chambers 2814 are positioned on a right side wall 2818 between two corners 2825 of the case 2810. Each of the plurality of fluid chambers 2814 are configured to be positioned upon a side surface (marked by reference number 231 in FIG. 2C for example) of a mobile device that is positioned between corner surfaces (marked by reference number 229 in FIG. 2C for example) of the mobile device. Each fluid chamber 2814 is configured to retain fluid therein. The fluid may be a gas, a liquid, a gel, or combinations thereof. The gas may be air or another form of gas. In other embodiments, other forms of fluids may be used within the fluid chamber 2814. In one embodiment, the fluid may be configured to have a density that is less than the density of water. The density of fluid in the fluid chamber 2814 may assist the body 2812 to float if the body 2812 is dropped in water. The plurality of fluid chambers 2814 may be configured to retain a sufficient amount of fluid to allow the body 2812 and attached mobile device to float upon water.

The fluid chambers 2814 on the side portions 2827 of the side walls 2818 form a repeating pattern of fluid chambers 2814 positioned in sequence on the side wall 2818. These fluid chambers 2814 are not positioned at the corners 2825 of the case 2810. These fluid chambers 2814 form a raised portion of the respective side wall 2818, and have an angled parallelogram shape. The case 2810 as shown in FIG. 28A has a rectangular shape with a length greater than a width of the case 2810. The fluid chambers 2814 are positioned on the opposing longer side walls 2818 to form a grip structure for a user's hand to grip. The fluid chambers 2814 may be configured to cushion the mobile device from a force applied to the body 2812. The fluid chambers 2814 may also be configured to provide a cushion for the user's hand when the hand grips the body 2812. The fluid chambers 2814 may include flexible side walls. The flexible side walls may flex or have a shape that varies in response to a force applied to the body 2812 to enhance the ability of the fluid chambers 2814 to cushion the mobile device from the force. In one embodiment, the fluid chambers 2814 on the side portion 2827 may extend inward towards the recess 2817 to contact the mobile device.

In the embodiment shown in FIG. 28A, fluid chambers 2814 are also positioned at the corners 2825 of the case to serve as corner cushions for the case 2810. The fluid chambers 2814 at the side portions 2827 of the side walls 2818 serve as side cushions for the case 2810.

FIG. 28B illustrates a rear view of the case 2810. FIG. 28C illustrates a left side view of the case 2810. The fluid chambers 2814 at the side portion 2827 of the side wall 2818 are in line and protrude outward from the outer surface of the side wall 2818 that faces opposite the mobile device when the mobile device is received in the recess 2817. The fluid chambers 2814 on the left side wall 2818 cover at least 30% of the total length of the left side wall 2818 from the uppermost end of the case 2810 to the lowermost end of the case 2810 shown in FIG. 28C. In one embodiment, the fluid chambers 2814 on the left side wall 2818 may cover a lesser or greater amount of the left side wall 2818. FIG. 28D illustrates a right side view of the case 2810. The fluid chambers 2814 at the side portion 2827 of the side wall 2818 are in line and protrude outward from the outer surface of the side wall 2818 that faces opposite the mobile device when the mobile device is received in the recess 2817. The fluid chambers 2814 on the right side wall 2818 cover at least 35% of the total length of the right side wall 2818 from the uppermost end of the case 2810 to the lowermost end of the case 2810 shown in FIG. 28D. In one embodiment, the fluid chambers 2814 on the right side wall 2818 may cover a lesser or greater amount of the right side wall 2818. FIG. 28E illustrates a bottom view of the case 2810. FIG. 28F illustrates a top view of the case 2810.

Figure 28G:
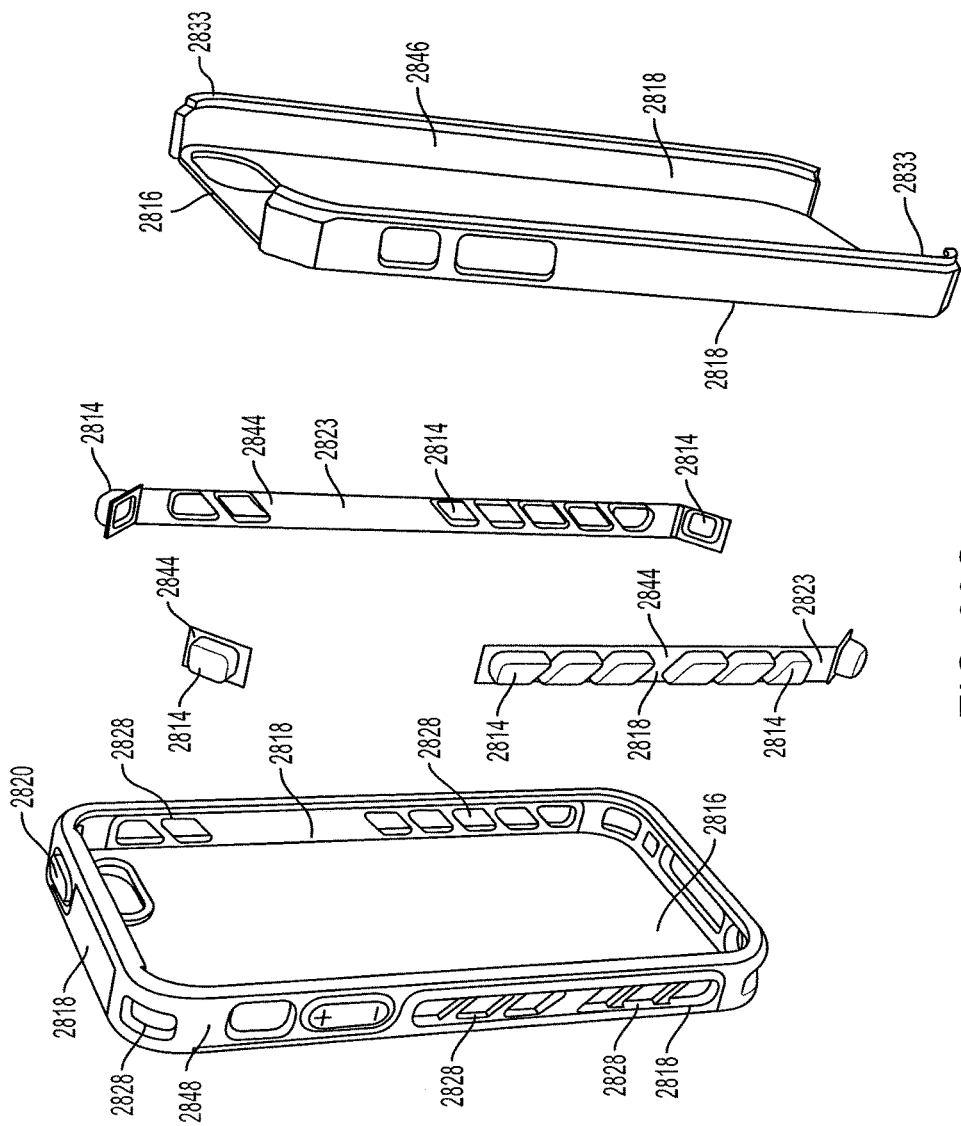
FIG. 28G illustrates a side perspective view of a case for a mobile device, according to an embodiment of the present disclosure.

FIG. 28G illustrates a side perspective view of the case 2810 with components separate. The case 2810 includes an outer layer 2848 of the base wall 2816 and the side walls 2818. The outer layer 2848 includes an exterior surface configured to face away from the recess 2817 when the mobile device is received in the recess 2817. The outer layer 2848 includes openings 2828 for the fluid chambers 2814 to extend through. The openings 2828 may have a substantially similar size as the size of the fluid chambers 2814. The outer layer 2848 of the base wall 2816 may be integral with the outer layer 2848 of the side walls 2818.

The fluid chambers 2814 may be connected with connector portions 2823 that extend between the fluid chambers 2814. The connector portions 2823 join the fluid chambers 2814 to each other, yet are not configured to retain fluid. The fluid chambers 2814 may be in fluid isolation from each other. The fluid chambers 2814 may be sealed fluid-tight such that no fluid may enter or escape the fluid chambers 2814 during use of the case 2810. The connector portions 2823 may form a strip that extends along the outer layer 2848 of the side walls 2818. In one embodiment, the fluid chambers 2814 may be configured to be in fluid communication with each other.

The case 2810 includes an inner layer 2846 of the base wall 2816 and the side walls 2818. The inner layer 2846 includes an interior surface configured to face towards the mobile device when the recess 2817 receives the mobile device. When the case 2810 is assembled, the connector portions 2823 form an intermediate layer of the case 2810 positioned between the inner layer 2846 and outer layer 2848 with the fluid chambers 2814 extending through respective openings in the outer layer 2848. The inner layer 2846 may hold the fluid chambers 2814 in position by pressing substantially flat side surfaces of the inner layer 2846 against the connector portions 2823 and the fluid chambers 2814. A flange 2833 may extend around the edge of the inner layer 2846 that engages the outer edge of the outer layer 2848 to hold the inner layer 2846 in place. The inner layer 2846 of the base wall 2816 may be integral with the inner layer 2846 of the side walls 2818.

In one embodiment, the inner layer 2846 and fluid chambers 2814 may be configured to be separable as shown in FIG. 28G. The components of the case 2810 may be held together by a mechanical attachment or other methods of separably coupling the components. In one embodiment, any component of the case 2810 may be integrally coupled to any other component of the case 2810.

The body 2812 as shown in FIGS. 28A-28G has a substantially rectangular shape. The substantially rectangular shape may conform to the shape of the mobile device to be coupled to the body 2812. The recess 2817 of the body 2812 may have a substantially rectangular shape to conform to the shape of the mobile device. In one embodiment, the body 2812 may have a different shape that conforms to the shape of the mobile device to be coupled to the body, for example an oval or oblong shape, or another shape, as desired.

Referring to FIG. 28G, the fluid cushions 2814 and portions of the intermediate layer 2844 may be made of a flexible material. The inner layer 2846 and outer layer 2848 may be made of a more rigid material to add support to the body 2812.

In one embodiment, the portions of the outer layer 2848 forming the corners of the case 2810 may be made of a flexible material, and the portions of the outer layer 2848 forming the base wall 2816 may be made of a rigid material. The flexible and rigid portions of the outer layer 2848 in one embodiment may be dual injection molded together. The flexible material of the fluid chambers 2814, intermediate layer 2844 and outer layer 2848 may be an elastomer. The elastomer may be a thermoplastic elastomer or the like. Other flexible materials such as another elastomer or a flexible thermoplastic polyurethane may be utilized as desired. The rigid material of the inner layer 2846 or outer layer 2848 may be a rigid thermoplastic polyurethane, polycarbonate, or the like. In one embodiment, any portion of the fluid chambers 2814, outer layers 2848, intermediate layer 2844, and inner layer 2846 may be made of the same material, or materials having a similar degree of flexibility.

FIG. 29A illustrates an embodiment of a case 2910 for a mobile device. The case 2910 includes a body 2912 that includes a fluid chamber 2914. The fluid chamber 2914 is configured to retain fluid therein and be positioned upon the mobile device when the mobile device is coupled to the body 2912.

The body 2912 includes a base wall 2916 and a plurality of side walls 2918 that extend from the base wall 2916. The base wall 2916 is configured to cover a surface, or back surface, of a mobile device that may be coupled to the body 2912. The side walls 2918 are each configured to cover a respective side surface of the mobile device that may be coupled to the body 2912.

The side walls 2918 join to each other to form corners 2925 of the case 2910. As shown in FIG. 29A, the side walls 2918 may form four corners of the case 2910. In one embodiment, the side walls 2918 may form at least one or at least two corners of the case 2910. The side walls 2918 at the corners 2925 are configured to be positioned upon a respective corner surface of the mobile device. The corner surfaces are the portions of the mobile device marked by reference number 229 in FIG. 2C for example. The portions of the side walls 2918 between the corners 2925 are the side portions 2927 of the side walls 2918 and are configured to be positioned upon side surfaces of the mobile device, which are marked by reference number 231 in FIG. 2C for example.

The side walls 2918 may extend from the base wall 2916 such that the plurality of side walls 2918 and the base wall 2916 form a recess for receiving the mobile device. The mobile device is positioned in the recess 2917 (marked in FIG. 29G for example) for the mobile device to couple to the body 2912. The base wall 2916 and the side walls 2918 may define the shape of the recess. The base wall 2916 and side walls 2918 may be configured such that the body 2912 forms a form fit around the mobile device. The recess may substantially have the shape of the mobile device. The mobile device may couple to the body 2912 by merely being placed within the recess, or a small lip of the body 2912 may extend over a portion of the mobile device, or another form of attachment device may be used to couple the mobile device to the body 2912.

In the embodiment shown in FIG. 29A, a fluid chamber 2914 is included as a portion of the side wall 2918. One fluid chamber 2914 is on a left side wall 2918 and another fluid chamber 2914 is on a right side wall 2918. The fluid chambers 2914 are positioned in an opening in the respective side wall 2918, with the remaining portion of the side wall surrounding the fluid chamber 2914. These fluid chambers 2914 are in line with the rest of the side walls 2918 such that the fluid chambers 2914 and side walls form a single layer structure of the side walls 2918. Each fluid chamber 2914 is positioned between the corners 2925 of the case 2910. The fluid chambers 2914 are not positioned at the corners 2925 of the case 2910. Each fluid chamber 2914 is configured to be positioned upon a side surface (marked by reference number 231 in FIG. 2C for example) of a mobile device that is positioned between corner surfaces (marked by reference number 229 in FIG. 2C for example) of the mobile device. Each fluid chamber 2914 is configured to retain fluid therein. The fluid may be a gas, a liquid, a gel, or combinations thereof. The gas may be air or another form of gas. In other embodiments, other forms of fluids may be used within the fluid chamber 2914. In one embodiment, the fluid may be configured to have a density that is less than the density of water. The density of fluid in the fluid chamber 2914 may assist the body 2912 to float if the body 2912 is dropped in water. The plurality of fluid chambers 2914 may be configured to retain a sufficient amount of fluid to allow the body 2912 and attached mobile device to float upon water.

The fluid chambers 2914 on the respective left and right side wall 2918 side portions 2927 form a raised portion of the respective side walls 2918. The case 2910 as shown in FIG. 29A has a rectangular shape with a length greater than a width of the case 2910. The fluid chambers 2914 are positioned on the opposing longer side walls 2918 to form a grip structure for a user's hand to grip. The fluid chambers 2914 extend longitudinally along a length of the respective side wall 2918 between respective corners 2925. The fluid chambers 2914 may be configured to cushion the mobile device from a force applied to the body 2912. The fluid chambers 2914 may also be configured to provide a cushion for the user's hand when the hand grips the body 2912. The fluid chambers 2914 may include flexible side walls. The flexible side walls may flex or have a shape that varies in response to a force applied to the body 2912 to enhance the ability of the fluid chambers 2914 to cushion the mobile device from the force. The fluid chambers 2914 at the side portions 2927 of the side wall 2918 serve as side cushions for the case 2910. In one embodiment, the fluid chambers 2914 on the side portions 2927 may extend inward towards the recess 2917 to contact the mobile device.

FIG. 29B illustrates a rear view of the case 2910. FIG. 29C illustrates a left side view of the case 2910. The fluid chamber 2914 at the side portion 2927 of the side wall 2918 protrudes outward form the outer surface of the side wall 2918 that faces opposite the mobile device when the mobile device is received in the recess 2917. The fluid chambers 2914 on the left side wall 2918 cover at least 40% of the total length of the left side wall 2918 from the uppermost end of the case 2910 to the lowermost end of the case 2910 shown in FIG. 29C. In one embodiment, the fluid chambers 2914 on the left side wall 2918 may cover a lesser or greater amount of the left side wall 2918. FIG. 29D illustrates a right side view of the case 2910. The fluid chamber 2914 at the side portion 2927 of the side wall 2918 protrudes outward from the outer surface of the side wall 2918 that faces opposite the mobile device when the mobile device is received in the recess 2917. The fluid chambers 2914 on the right side wall 2918 cover at least 70% of the total length of the right side wall 2918 from the uppermost end of the case 2910 to the lowermost end of the case 2910 shown in FIG. 29D. In one embodiment, the fluid chambers 2914 on the right side wall 2918 may cover a lesser or greater amount of the right side wall 2918.

FIG. 29E illustrates a bottom view of the case 2910. FIG. 29F illustrates a top view of the case 2910.

Figure 29G:
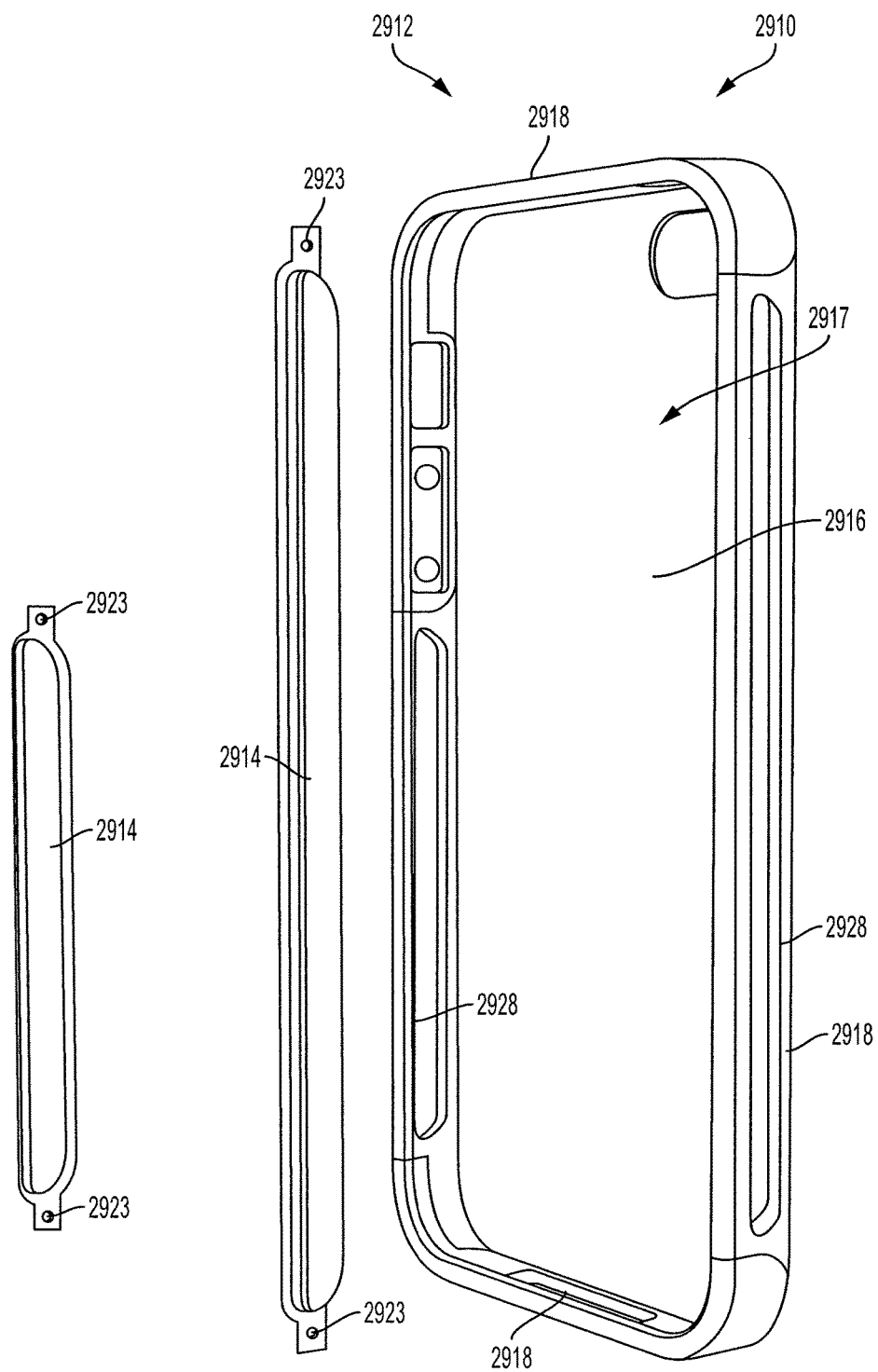
FIG. 29G illustrates a side perspective view of a case for a mobile device, according to an embodiment of the present disclosure.

FIG. 29G illustrates a side perspective view of the case 2910 with components separate. Connector portions 2923 extend from the fluid chambers 2914 and may form an inner layer of the side walls 2918 that coupled the respective fluid chamber 2914 to the respective side wall 2918. The openings 2928 in the side walls 2918 that the fluid chamber 2914 extend through may have a substantially similar size as the size of the respective fluid chamber 2914. The fluid chambers 2914 may be in fluid isolation from each other. In one embodiment, the fluid chambers 2914 may be configured to be in fluid communication with each other.

In one embodiment, the fluid chambers 2914 and the remaining portions of the body 2912 may be configured to be separable as shown in FIG. 29G. The components of the case 2910 may be held together by a mechanical attachment or other methods of separably coupling the components. In one embodiment, any component of the case 2910 may be integrally coupled to any other component of the case 2910.

The body 2912 as shown in FIGS. 29A-29G has a substantially rectangular shape. The substantially rectangular shape may conform to the shape of the mobile device to be coupled to the body 2912. The recess 2917 of the body 2912 may have a substantially rectangular shape to conform to the shape of the mobile device. In one embodiment, the body 2912 may have a different shape that conforms to the shape of the mobile device to be coupled to the body, for example an oval or oblong shape, or another shape, as desired.

The fluid cushions 2914 and connector portions 2923 may be made of a flexible material. The remaining portions of the body 2912 may be made of a more rigid material to add support to the body 2912. In one embodiment, the portions of the side walls 2918 forming the corners of the case 2910 may be made of a flexible material, and the base wall 2916 may be made of a rigid material. The rigid and flexible portions of the body 2912 in one embodiment may be dual injection molded together. The flexible material of the fluid cushions 2914, connector portions 2923 and remaining portions of the body 2912 may be an elastomer. The elastomer may be thermoplastic elastomer or the like. Other flexible materials such as another elastomer or a flexible thermoplastic polyurethane may be utilized as desired. The rigid material of the body 2912 may be a rigid thermoplastic polyurethane, polycarbonate, or the like. In one embodiment, any portion of the body 2912 may be made of the same material, or materials having a similar degree of flexibility.

The elements of any of the embodiments of cases in this application may be interchanged with one another or included with one another to produce a desired result. For example, a pump or release valve as shown or described in regard to the embodiment shown in FIGS. 13A-13B may be included in any of the embodiments of cases shown or described in this application.

The embodiments of cases for mobile devices shown in FIGS. 1A-24A and FIGS. 28A-29G, may be beneficially configured to cushion a mobile device from a force that may be applied to the mobile device case. In an embodiment in which the mobile device case may be filled with fluid after it has been coupled to the mobile device, the filling of fluid may beneficially allow the mobile device case to fit better upon on the mobile device. In an embodiment in which the fluid is less dense than water, the presence of the fluid in the mobile device case may allow the mobile device case to float if dropped upon water.

Figure 30B:
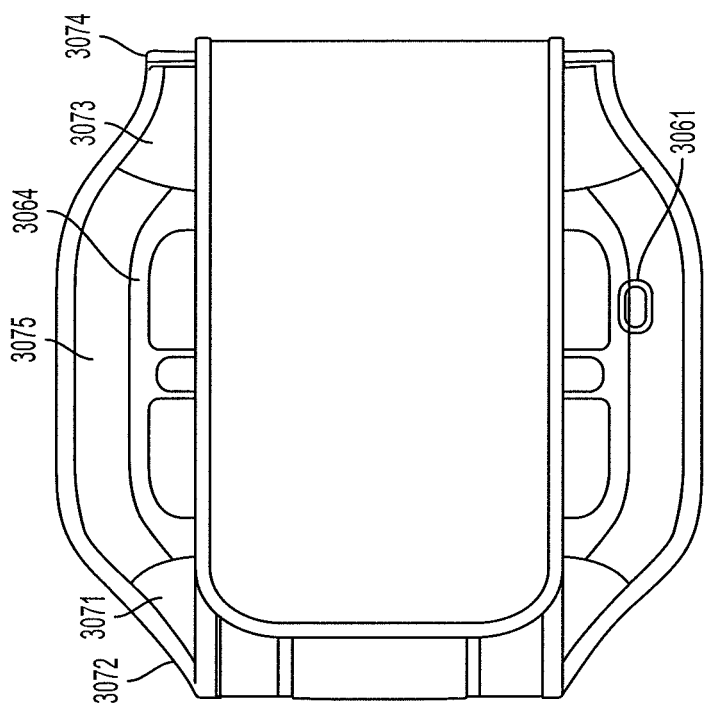
FIG. 30B illustrates a rear view of an armband for a mobile device, according to an embodiment of the present disclosure.
Figure 30A:
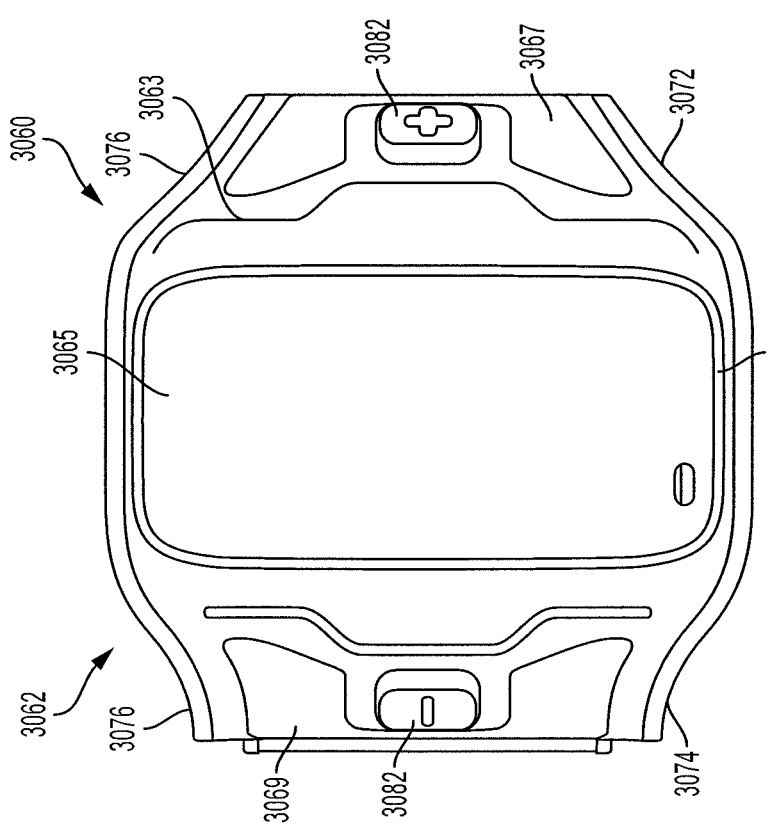
FIG. 30A illustrates a front view of an armband for a mobile device, according to an embodiment of the present disclosure.

FIG. 30A illustrates an embodiment of an armband 3060 for a mobile device. The armband 3060 includes a band 3062 that is configured to extend around at least a portion of a wearer's arm and be held to the wearer's arm. The band 3062 includes a fluid chamber 3064 (visible in FIG. 30B) that is configured to retain fluid therein. The armband 3060 includes a coupler 3066 that is configured to couple a mobile device to the band 3062.

The band 3062 is configured as a strap that extends around at least a portion of the wearer's arm. The ends of the band include connectors 3068, 3070 (marked in FIG. 30C for example) that are configured to connect the ends of the band. The connectors 3068, 3070 may join to each other to assist the band 3062 to be held to the wearer's arm, preferably above the wearer's elbow. In the embodiment shown in FIG. 30C, the connector 3068 includes a hook and loop device such as velcro. The connector 3070 includes a buckle ring the connector 3068 passes through to connect the ends of the band 3062. In one embodiment, the connectors 3068, 3070 may vary from the structure shown in FIG. 30C, the connectors 3068, 3070 may include a button, zipper, hook or other form of connector as desired.

The band 3062 includes two arms 3072, 3074 that are each coupled to and extend outward from the coupler 3066. The arms 3072, 3074 extend outward from the coupler 3066 to the respective ends of the band 3062. The arms 3072, 3074 may be made flexible to more easily allow the arms 3072, 3074 to extend around at least a portion of the wearer's arm. In one embodiment, the arms 3072, 3074 may be made rigid.

In the embodiment shown in FIG. 30A, the arms 3072, 3074 include a respective exterior surface 3067, 3069 that is configured to face away from the wearer's arm when the armband 3060 is held to the wearer's arm. The arms 3072, 3074 include respective interior surfaces 3071, 3073 (visible in FIG. 30B) that are configured to face towards the wearer's arm when the armband 3060 is held to the wearer's arm. FIG. 30B illustrates an opening 3061 in the interior surface 3075 of the coupler 3066 for a component of the mobile device 3030 such as a headphone jack or cord to pass through.

The fluid chamber 3064 is configured to be positioned between the respective exterior surface 3067, 3069 and the interior surface 3071, 3073 to form an intermediate layer between the respective surfaces 3067, 3069, 3071, 3073. The ends of the fluid chamber 3064 may be inserted through respective slots 3090 (visible in FIG. 30C) in the first arm 3072 and second arm 3074 to couple to the respective arms 3072, 3074. The fluid chamber 3064 is positioned between the exterior surface 3067, 3069 and the wearer's arm when the armband 3060 is held to the wearer's arm. The fluid chamber 3064 extends longitudinally along the direction of the arms 3072, 3074. The arms 3072, 3074 may form sleeves 3076 extending over the fluid chamber 3064 that the fluid chamber 3064 couples to. In one embodiment, the sleeves 3076 may be elastic to allow the respective sleeve 3076 to flex or have a shape that varies to allow the fluid chamber 3064 to be inserted into the respective sleeve 3076. The fluid chamber 3064 may be removably coupled to the respective sleeves 3076. In one embodiment, the fluid chamber 3064 may be integrally coupled to the respective sleeves 3076.

Referring back to FIG. 30A, the coupler 3066 comprises a housing that is configured to extend over at least one side of the mobile device to receive the mobile device. The housing may cover four sides of the mobile device to couple the mobile device to the band 3062. The coupler 3066 may include an exterior surface 3065 that is configured to face away from the wearer's arm when the armband 3060 is held to the wearer's arm. The coupler 3066 may include an interior surface 3075 (visible in FIG. 30B) that is configured to face towards the wearer's arm. The coupler 3066 may include a slot 3063 along a side of the coupler 3066 for the mobile device 3030 to be inserted through for the coupler 3066 to receive the mobile device 3030. The slot 3063 may close to form a zip seal of the mobile device 3030. The mobile device 3030 may be held between the exterior surface 3065 and interior surface 3075 of the coupler after being inserted through the slot 3063. The exterior surface 3065 may comprise a transparent or translucent material to allow the screen of the mobile device 3030 to be visible when coupled to the coupler 3066. In one embodiment, the coupler 3066 may have a different structure than shown in FIG. 30A. For example, the coupler 3066 may be a tether, snap, quick connect device, latch, or other form of coupler that couples a mobile device to the band 3062.

Figure 30D:
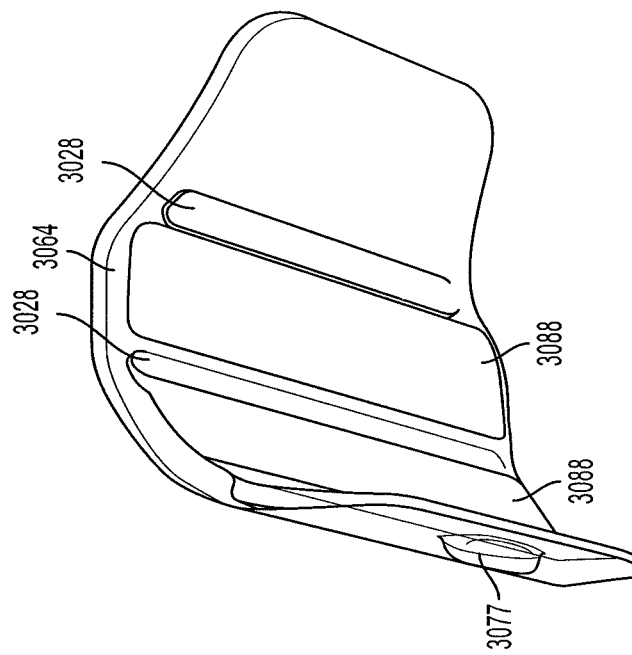
FIG. 30D illustrates a rear perspective view of a fluid chamber for use with an armband for a mobile device, according to an embodiment of the present disclosure.
Figure 30C:
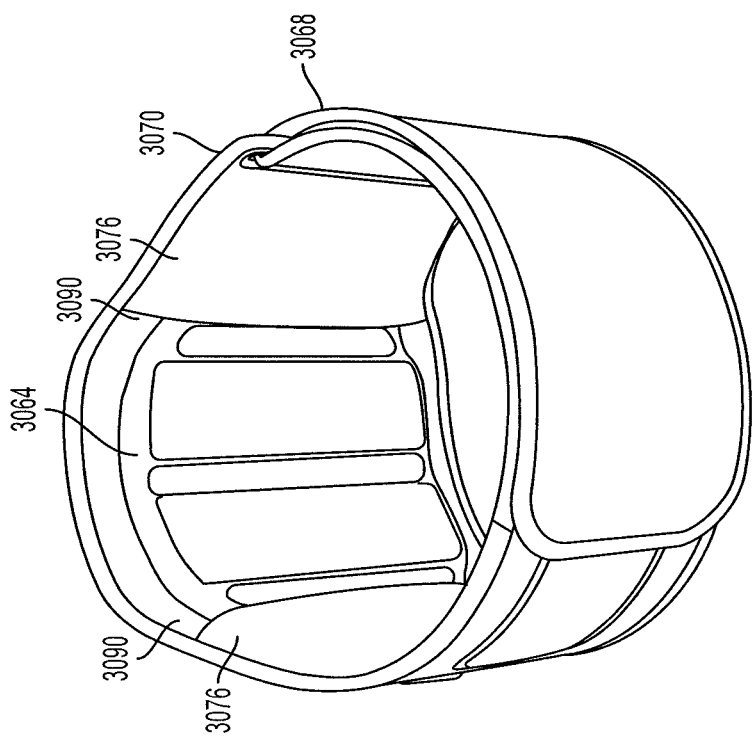
FIG. 30C illustrates a rear perspective view of an armband for a mobile device, according to an embodiment of the present disclosure.

Referring to FIG. 30C, the fluid chamber 3064 is positioned between the coupler 3066 and the wearer's arm when the armband 3060 is held to the wearer's arm.

FIG. 30D illustrates the fluid chamber 3064 separate from the coupler 3066. Fabric 3088 may be applied to the interior surface of the fluid chamber 3064 to provide a cushion for the wearer's arm against the armband 3060 during use.

The fluid chamber 3064 is configured to retain fluid which may be a gas, a liquid, a gel, or combinations thereof. The gas may be air or another form of gas. In other embodiments, other forms of fluids may be used within the fluid chamber 3064. The fluid chamber 3064 may be configured to cushion the wearer's arm from a force applied to the band 3062. In an embodiment in which the fluid is a gas, the force may be absorbed by the gas compressing in response to the force. The fluid chamber 3064 may beneficially be a compressible fluid chamber 3064 in an embodiment in which a gas, for example air, is used in the chamber 3064. The compression properties of the fluid chamber 3064 increase the ability of the fluid chamber 3064 to absorb the force. In addition, the compressible fluid chamber 3064 may increase the comfort for the armband 3060 upon the wearer's arm, and improve the fit of the armband 3060 to the wearer's arm. In an embodiment in which the fluid is a liquid or gel, the force may be absorbed by the force being transmitted through the liquid or gel. In other embodiments, the fluid chamber 3064 may cushion the force through another manner. In one embodiment, the fluid chamber 3064 may include flexible side walls. The flexible side walls may flex or have a shape that varies in response to the force to enhance the ability of the fluid chamber 3064 to cushion the wearer's arm from the force.

The fluid chamber 3064 may be configured to be sealed fluid-tight such that no fluid may enter or escape the fluid chamber during use of the armband 3060. In one embodiment, the fluid chamber 3064 may be configured such that the seal may be broken by a user inserting fluid to or withdrawing fluid from the fluid chamber 3064. In one embodiment, the fluid chamber 3064 may be pre-filled with all or a portion of the fluid chamber 3064 filled with fluid. The pre-filled fluid chamber 3064 may be coupled to the wearer's arm. In one embodiment, the fluid chamber 3064 may be configured to be entirely or partially filled with a fluid after the fluid chamber 3064 is coupled to the mobile device. In such an embodiment, the fluid chamber 3064 may have increased flexibility to be positioned upon the wearer's arm in the manner desired, and is then later entirely or partially filed with the fluid.

In one embodiment, the fluid may be configured to have a density that is less than the density of water. The density of the fluid in the fluid chamber 3064 may assist the band 3062 to float if the band 3062 is dropped in water. The fluid chamber 3064 may be configured to retain a sufficient amount of fluid to allow the band 3062 and a mobile device coupled thereto to float upon water.

The fluid chamber 3064 may include a pump 3077 configured to provide fluid to or withdraw fluid from the fluid chamber 3064 when activated. The pump 3077 may have a structure similar to the pump 2577 shown in FIG. 25B for example. The pump 3077 may include a bladder that is pressed by a user to provide fluid to the fluid chamber 3064. In an embodiment in which the fluid is air, the pump 3077 may draw air from outside of the armband 3060. The pump 3077 may include a valve that opens to allow fluid to enter the fluid chamber 3064 upon activation of the pump 3077. The valve may form a fluid tight seal of the fluid chamber 3064 when the valve is closed. In one embodiment, the pump 3077 may be positioned on any part of the band 3062, for example on another arm 3074 or near the coupler 3066.

In one embodiment, the pump 3077 may include a different device than a bladder to be pressed. The pump 3077 may include a push button, a plunger, a rotary device, a diaphragm, or other device that operates as a pump. In one embodiment, the pump 3077 may be a fluid chamber 3064 configured to vary in size by being pressed, to draw fluid to or from a valve.

The fluid chamber 3064 may include a release valve. The release valve may include a structure similar to the release valve 2584 shown in FIG. 25D for example. The release valve may be positioned on an opposite side of the fluid chamber than the pump. The release valve may be configured to allow fluid to be released from the fluid chamber 3064 when activated. In one embodiment, the release valve may be positioned in a different location on the band 3062. The release valve may include a button that is pressed to open the release valve. In one embodiment, the release valve may have a different structure, for example, a plunger, pull tab, or other device for releasing fluid from a fluid chamber may be used.

The fluid chamber 3064 may include areas for the pump 3077 and release valve near the ends of the fluid chamber 3064 that may be inserted into the sleeves 3076 of the respective arms 3072, 3074. The fluid chamber 3064 may include indentations 3078 in the surface of the fluid chamber 3064 that allow the fluid chamber 3064 to more easily bend. The fluid chamber 3064 may be configured to extend over at least a portion of the wearer's arm.

The fluid chamber 3064 may be configured to increase in size, or inflate, as fluid is provided to the fluid chamber 3064 from the pump 3077. In an embodiment in which the fluid chamber 3064 is configured to increase in size when the fluid chamber 3064 is provided with fluid, the fluid chamber 3064 may include flexible side walls. The flexible side walls may flex or have a shape that varies as fluid is provided to or withdrawn from the fluid chamber 3064.

The pump 3077 may be configured to provide fluid to or withdraw fluid from a single fluid chamber 3064 or a plurality of fluid chambers 3064. In one embodiment, the band 3062 may include a single fluid chamber 3064. In one embodiment, the band 3062 may include a plurality of fluid chambers 3064. In one embodiment, multiple pumps 3077 or release valves may be used in combination with a single fluid chamber 3064 or multiple fluid chambers 3064.

The pump 3077 may be activated after the armband 3060 has been coupled to the wearer's arm or before. In an embodiment in which the pump 3077 is activated after the mobile device has been coupled to the wearer's arm, the unpumped band 3062 may be more flexible prior to being coupled to the wearer's arm. The more flexible band 3062 may be more easily coupled to the wearer's arm. The fluid chamber 3064 may then be provided with fluid, which may increase the stiffness of the band 3062 and increase the ability of the band 3062 to cushion the wearer's arm. The fit of the band 3062 upon the wearer's arm may be beneficially be varied upon activation of the pump.

Referring to FIG. 30A, an indicator 3082 marks a location on the arm 3072 to be pressed to activate the pump 3077. An indicator 3082 marks a location on the arm 3074 to be pressed to activate the release valve. The respective exterior surfaces 3067, 3069 of the arms 3072, 3074 may be made of a perforated fabric, to allow the fluid chamber 3064 to be partially visible.

The fluid chamber 3064 and the remaining portions of the band 3062 may be made of a flexible material to allow these portion of the band 3062 to more easily extend around a portion of the wearer's arm. In one embodiment, the fluid chamber 3064 and remaining portions of the band 3062 may be made of a flexible material such as an elastomer. The elastomer may be a thermoplastic elastomer or the like. Other flexible materials or elastomers may be utilized as desired. For example, a fabric or a flexible thermoplastic polyurethane may be utilized. In one embodiment, the remaining portions of the band 3062 may be made of a flexible material such as a polyester fabric. In one embodiment, the fluid chamber 3064 and the remaining portions of the band 3062 may be made of a more rigid material such as a rigid thermoplastic polyurethane, polycarbonate, or the like. In one embodiment, all portions of the band 3062 may be made of the same material or materials having similar properties such as flexibility. In one embodiment, portions of the band 3062 may be made of different material or materials having different properties such as flexibility.

The embodiments of armbands shown in FIGS. 25A-27F and FIGS. 30A-30D may be beneficially configured to cushion a wearer's arm from a force that may be applied to the armband. In an embodiment in which the armband may be filled with fluid after it has been held to a wearer's arm, the filling of fluid may beneficially allow the armband to better fit on the wearer's arm. In an embodiment in which the fluid is less dense than water, the presence of the fluid in the armband may allow the armband to float if dropped upon water.

The elements of any of the embodiments of armbands in this application may be interchanged with one another or included with one another to produce a desired result. For example, a pump or release valve as shown or described in regard to the embodiment shown in FIGS. 25A-25F, or FIGS. 27A-27F or FIGS. 30A-30D may be included in any of the embodiments of armbands shown or described in this application.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present invention, which is defined solely by the claims. Accordingly, the present invention is not limited to that precisely as shown and described.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An armband for a mobile device comprising:
    a band including
        a first arm extending in a first longitudinal direction and having a first sleeve with an opening therein and a first end,
        a second arm extending in a second longitudinal direction opposite the first longitudinal direction and having a second sleeve with an opening therein and a second end, the first end configured to connect with the second end to wrap around a wearer's arm,
        an outer surface, and
        an inner surface configured to contact the wearer's arm;
    a fluid chamber having a first end and a second end, the fluid chamber removably coupled to the band by insertion of the first end of the fluid chamber in the first longitudinal direction into the opening of the first sleeve and insertion of the second end of the fluid chamber in the second longitudinal direction into the opening of the second sleeve and positioned such that at least a portion of the fluid chamber is positioned between the inner surface and the outer surface, the fluid chamber configured to retain a fluid;
    a first valve located on the first arm of the band, coupled to the fluid chamber, and configured to add an additional amount of fluid to the fluid retained in the fluid chamber when the first valve is engaged by a force exerted on the first valve;

a second valve located on the second arm of the band, coupled to the fluid chamber, and configured to release a portion of the fluid retained in the fluid chamber when the second valve is engaged by a force exerted on the second valve; and a coupler configured to couple the mobile device to the band.

2. The armband of claim 1, wherein the fluid chamber has flexible side walls.

3. The armband of claim 1, wherein the fluid chamber is configured to cushion the wearer's arm from a force applied to the band.

4. The armband of claim 1, wherein the fluid has a density that is less than the density of water.

5. The armband of claim 1, wherein the first valve is a part of a pump.

6. The armband of claim 1, wherein the second valve is a release valve.

7. The armband of claim 1, wherein the first arm and the second arm extend outward from the coupler.

8. The armband of claim 7, wherein the fluid chamber extends longitudinally along the first arm and the second arm.

9. The armband of claim 1, wherein the coupler is a quick connect device configured to engage a mobile device case.

10. An armband for a mobile device comprising:

a housing configured to receive the mobile device, the housing having a first side and a second side;

a first arm extending longitudinally from the first side of the housing, having a first sleeve with a slot, and configured to extend around at least a portion of a wearer's arm;

a second arm extending longitudinally from the second side of the housing, having a second sleeve with a slot, and configured to extend around at least a portion of the wearer's arm;

a fluid chamber having a first end and a second end and being configured to retain a fluid, and removably couple to the housing by insertion of the first end of the fluid chamber longitudinally into the slot of the first arm and insertion of the second end of the fluid chamber longitudinally into the slot of the second arm and be positioned such that the fluid chamber is positioned between the housing and the wearer's arm when the armband is held to the wearer's arm;

a first valve located on the first arm, coupled to the fluid chamber, and configured to add an additional amount of fluid to the fluid retained in the fluid chamber; and a second valve located on the second arm of the band, coupled to the fluid chamber, and configured to release a portion of the fluid retained in the fluid chamber.

11. The armband of claim 10, wherein:

the first arm includes an exterior surface configured to face away from the wearer's arm when the armband is held to the wearer's arm, the fluid chamber configured to be positioned such that the fluid chamber is positioned between the exterior surface and the wearer's arm when the armband is held to the wearer's arm; and the second arm includes an exterior surface configured to face away from the wearer's arm when the armband is held to the wearer's arm, the fluid chamber configured to be positioned such that the fluid chamber is positioned between the exterior surface of the second arm and the wearer's arm when the armband is held to the wearer's arm.

12. The armband of claim 10, wherein the housing includes a slot for the mobile device to be inserted through for the housing to receive the mobile device.

13. A method comprising:

coupling a fluid chamber having a first end and a second end to an armband including a first arm having a first sleeve with an opening and a second arm having a second sleeve with an opening, the coupling including inserting the first end of the fluid chamber longitudinally into the opening of the first sleeve of the armband and inserting the second end of the fluid chamber longitudinally into the opening of the second sleeve of the armband;

coupling an armband to a wearer's arm, the armband having:

a fluid chamber coupled to the armband and configured to retain a fluid;

a first valve located on a first arm of the armband, coupled to the fluid chamber, and configured to add an additional amount of fluid to the fluid retained in the fluid chamber;

a second valve located on the second arm of the band, coupled to the fluid chamber, and configured to release a portion of the fluid retained in the fluid chamber;

a coupler configured to couple a mobile device to the armband; and operating the actuator.

14. The armband of claim 10, wherein the first valve is a part of a pump.

15. The armband of claim 10, wherein the second valve is a release valve.

16. The method of claim 13, wherein the first valve is a part of a pump.

17. The method of claim 13, wherein the second valve is a release valve.

18. The method of claim 13, wherein the fluid chamber is removably coupled to the armband.

* * * * *